United States Patent
Jhang et al.

(10) Patent No.: US 10,466,443 B2
(45) Date of Patent: Nov. 5, 2019

(54) OPTICAL IMAGING LENS

(71) Applicant: Genius Electronic Optical Co., Ltd., Taichung (TW)

(72) Inventors: Jia-Sin Jhang, Taichung (TW); Yanxuan Yin, Fujian (CN)

(73) Assignee: GENIUS ELECTRONIC OPTICAL (XIAMEN) CO., LTD., Xiamen, Fujian (CN)

(*) Notice: Subject to any disclaimer, the term of this patent is extended or adjusted under 35 U.S.C. 154(b) by 0 days.

(21) Appl. No.: 15/144,833

(22) Filed: May 3, 2016

(65) Prior Publication Data
US 2017/0269329 A1    Sep. 21, 2017

(30) Foreign Application Priority Data

Mar. 18, 2016 (CN) .......................... 2016 1 0157261

(51) Int. Cl.
| *G02B 13/00* | (2006.01) |
| *G02B 9/38* | (2006.01) |
| *G02B 9/60* | (2006.01) |
| *G02B 9/56* | (2006.01) |

(52) U.S. Cl.
CPC ............ *G02B 13/004* (2013.01); *G02B 9/38* (2013.01); *G02B 9/60* (2013.01); *G02B 13/0045* (2013.01); *G02B 9/56* (2013.01)

(58) Field of Classification Search
CPC .......... G02B 13/004; G02B 9/38; G02B 9/56
USPC .......................................................... 359/715
See application file for complete search history.

(56) References Cited

U.S. PATENT DOCUMENTS

| 2014/0184900 A1* | 7/2014 | Huang ................ G02B 13/004 348/373 |
| 2015/0029601 A1* | 1/2015 | Dror ........................ G02B 9/60 359/764 |
| 2015/0116569 A1* | 4/2015 | Mercado ............ H04N 5/23212 348/335 |
| 2017/0090154 A1* | 3/2017 | Hsieh ........................ G02B 9/34 |

* cited by examiner

*Primary Examiner* — Wen Huang
(74) *Attorney, Agent, or Firm* — JCIPRNET

(57) ABSTRACT

An optical imaging lens includes first, second, third, and fourth lens elements arranged in order from an object side to an image side along an optical axis. Each lens element has an object-side surface and an image-side surface. The first lens element has positive refracting power. The object-side surface of the first lens element has a convex portion in a vicinity of the optical axis and a convex portion in a vicinity of a periphery. The second lens element has negative refracting power. The object-side surface of the third lens element has a concave portion in a vicinity of a periphery. The image-side surface of the fourth lens element has a convex portion in a vicinity of a periphery.

19 Claims, 55 Drawing Sheets

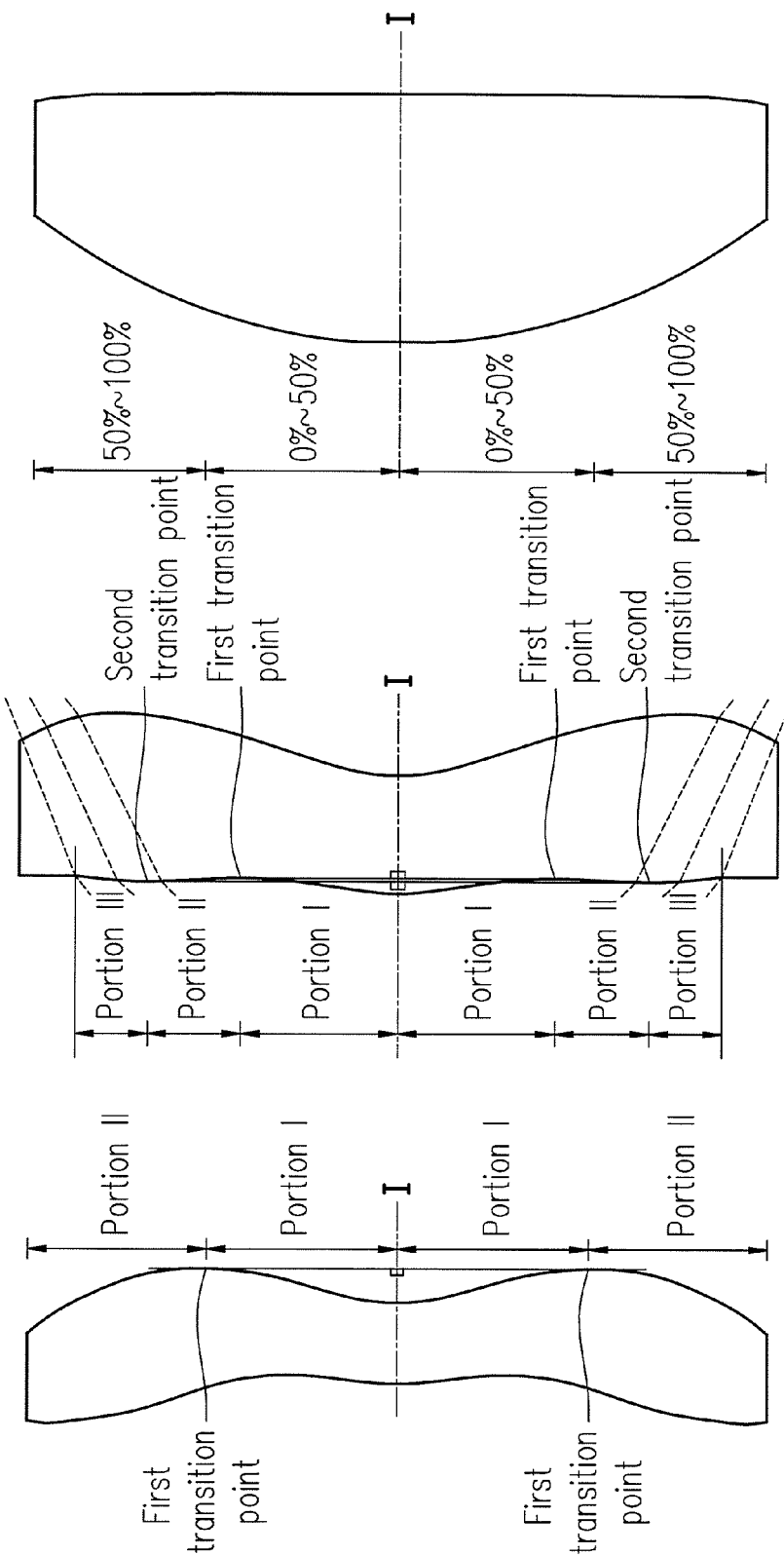

| first embodiment | | | | | | |
|---|---|---|---|---|---|---|
| EFL= 7.069 mm, HFOV= 18.59°, TTL= 6.380 mm, $F_{NO}$= 2.384 | | | | | | |
| lens element | surface | radius of curvature (mm) | thickness (mm) | refractive index | dispersion coefficient | focal length (mm) |
| object | | infinity | infinity | | | |
| aperture | | infinity | -0.700 | | | |
| first lens element 3 | object-side surface 31 | 2.071 | 0.928 | 1.545 | 55.987 | 3.427 |
| | image-side surface 32 | 4.909 | 0.260 | | | |
| second lens element 4 | object-side surface 41 | 33.081 | 0.230 | 1.661 | 20.401 | -6.092 |
| | image-side surface 42 | 6.085 | 2.415 | | | |
| third lens element 5 | object-side surface 51 | 3.018 | 0.279 | 1.545 | 55.987 | -4.956 |
| | image-side surface 52 | 11.702 | 0.286 | | | |
| fourth lens element 6 | object-side surface 61 | 0.941 | 0.735 | 1.661 | 20.401 | 12.453 |
| | image-side surface 62 | 10.510 | 0.400 | | | |
| filter 9 | object-side surface 91 | infinity | 0.210 | 1.517 | 64.167 | |
| | image-side surface 92 | infinity | 0.637 | | | |
| | image plane 100 | infinity | 0.000 | | | |

FIG. 8

| surface | K | $a_2$ | $a_4$ | $a_6$ | $a_8$ |
|---|---|---|---|---|---|
| 31 | -6.4797E-01 | 2.7661E-02 | 8.1069E-03 | 1.5056E-02 | -1.9622E-02 |
| 32 | -3.5485E+00 | -9.9344E-02 | 1.1149E-02 | 4.8391E-03 | -2.0626E-03 |
| 41 | 5.3640E+02 | -8.1760E-02 | 1.0262E-01 | -3.3664E-02 | -1.5851E-02 |
| 42 | -1.7363E+01 | -2.6330E-02 | 1.1943E-01 | 2.5162E-02 | -1.2420E-01 |
| 51 | -4.8412E+01 | -1.3156E-01 | -2.1737E-02 | -1.4288E-01 | 1.0110E-01 |
| 52 | -2.9363E+03 | 1.7754E-01 | -1.3570E-01 | 2.0462E-02 | -3.7990E-03 |
| 61 | -2.0282E+00 | -4.1932E-01 | 8.7376E-02 | -2.7956E-02 | 4.5324E-03 |
| 62 | 1.9342E+01 | 7.8768E-03 | -6.1411E-02 | 2.0963E-02 | -3.5566E-03 |
| surface | $a_{10}$ | $a_{12}$ | $a_{14}$ | $a_{16}$ | |
| 31 | 1.9837E-02 | -1.1600E-02 | 3.7407E-03 | -5.0110E-04 | |
| 32 | -1.1121E-03 | 1.4908E-03 | -6.1609E-04 | 7.6455E-05 | |
| 41 | 4.5847E-02 | -3.9520E-02 | 1.5659E-02 | -2.4116E-03 | |
| 42 | 1.7167E-01 | -1.0295E-01 | 2.2807E-02 | 1.4696E-03 | |
| 51 | -2.4755E-02 | -1.8441E-02 | 1.2922E-02 | -2.1886E-03 | |
| 52 | -4.5595E-04 | 2.4357E-04 | 1.2529E-04 | -3.2144E-05 | |
| 61 | 3.2847E-04 | -2.5164E-04 | 4.0635E-05 | -2.8820E-06 | |
| 62 | 5.9795E-05 | 3.9160E-05 | 1.5040E-06 | -9.2576E-07 | |

FIG. 9

| second embodiment ||||||
|---|---|---|---|---|---|
| EFL= 7.244 mm, HFOV= 18.307°, TTL= 7.190 mm, $F_{NO}$= 2.402 ||||||
|  | surface | radius of curvature (mm) | thickness (mm) | refractive index | dispersion coefficient | focal length (mm) |
| object |  | infinity | infinity |  |  |  |
| aperture2 |  | infinity | -0.539 |  |  |  |
| first lens element 3 | object-side surface 31 | 2.281 | 0.880 | 1.545 | 55.987 | 3.808 |
|  | image-side surface 32 | -20.374 | 0.050 |  |  |  |
| second lens element4 | object-side surface 41 | 36.348 | 0.240 | 1.642 | 22.409 | -7.262 |
|  | image-side surface 42 | 4.152 | 2.018 |  |  |  |
| third lens element 5 | object-side surface 51 | 2.762 | 0.280 | 1.535 | 55.690 | -14.768 |
|  | image-side surface 52 | 1.976 | 1.553 |  |  |  |
| fourth lens element 6 | object-side surface 61 | 3.172 | 0.824 | 1.642 | 22.409 | -222.780 |
|  | image-side surface 62 | 2.787 | 0.600 |  |  |  |
| filter 9 | object-side surface 91 | infinity | 0.210 | 1.517 | 64.167 |  |
|  | image-side surface 92 | infinity | 0.537 |  |  |  |
|  | image plane 100 | infinity | 0.000 |  |  |  |

FIG. 12

| surface | K | $a_2$ | $a_4$ | $a_6$ | $a_8$ |
|---|---|---|---|---|---|
| object-side surface 31 | -6.4797E-01 | 2.7661E-02 | 8.1069E-03 | 1.5056E-02 | -1.9622E-02 |
| image-side surface 32 | -3.5485E+00 | -9.9344E-02 | 1.1149E-02 | 4.8391E-03 | -2.0626E-03 |
| object-side surface 41 | 5.3640E+02 | -8.1760E-02 | 1.0262E-01 | -3.3664E-02 | -1.5851E-02 |
| image-side surface 42 | -1.7363E+01 | -2.6330E-02 | 1.1943E-01 | 2.5162E-02 | -1.2420E-01 |
| object-side surface 51 | -4.8412E+01 | -1.3156E-01 | -2.1737E-02 | -1.4288E-01 | 1.0110E-01 |
| image-side surface 52 | -2.9363E+03 | 1.7754E-01 | -1.3570E-01 | 2.0462E-02 | -3.7990E-03 |
| object-side surface 61 | -2.0282E+00 | -4.1932E-01 | 8.7376E-02 | -2.7956E-02 | 4.5324E-03 |
| image-side surface 62 | 1.9342E+01 | 7.8768E-03 | -6.1411E-02 | 2.0963E-02 | -3.5566E-03 |
| surface | $a_{10}$ | $a_{12}$ | $a_{14}$ | $a_{16}$ | |
| object-side surface 31 | 1.9837E-02 | -1.1600E-02 | 3.7407E-03 | -5.0110E-04 | |
| image-side surface 32 | -1.1121E-03 | 1.4908E-03 | -6.1609E-04 | 7.6455E-05 | |
| object-side surface 41 | 4.5847E-02 | -3.9520E-02 | 1.5659E-02 | -2.4116E-03 | |
| image-side surface 42 | 1.7167E-01 | -1.0295E-01 | 2.2807E-02 | 1.4696E-03 | |
| object-side surface 51 | -2.4755E-02 | -1.8441E-02 | 1.2922E-02 | -2.1886E-03 | |
| image-side surface 52 | -4.5595E-04 | 2.4357E-04 | 1.2529E-04 | -3.2144E-05 | |
| object-side surface 61 | 3.2847E-04 | -2.5164E-04 | 4.0635E-05 | -2.8820E-06 | |
| image-side surface62 | 5.9795E-05 | 3.9160E-05 | 1.5040E-06 | -9.2576E-07 | |

FIG. 13

| | third embodiment | | | | | |
|---|---|---|---|---|---|---|
| | EFL= 7.201 mm, HFOV= 18.422°, TTL= 7.197 mm, $F_{NO}$= 2.444 | | | | | |
| | surface | radius of curvature (mm) | thickness (mm) | refractive index | dispersion coefficient | focal length (mm) |
| object | | infinity | infinity | | | |
| aperture2 | | infinity | -0.544 | | | |
| first lens element 3 | object-side surface 31 | 2.199 | 0.828 | 1.545 | 55.987 | 3.783 |
| | image-side surface 32 | -29.765 | 0.203 | | | |
| second lens element4 | object-side surface 41 | 5.378 | 0.331 | 1.642 | 22.488 | -5.894 |
| | image-side surface 42 | 2.177 | 2.597 | | | |
| third lens element 5 | object-side surface 51 | 4.413 | 0.644 | 1.535 | 55.690 | -9.587 |
| | image-side surface 52 | 2.254 | 0.433 | | | |
| fourth lens element 6 | object-side surface 61 | 3.969 | 1.091 | 1.642 | 22.488 | 21.387 |
| | image-side surface 62 | 4.963 | 0.400 | | | |
| filter 9 | object-side surface 91 | infinity | 0.210 | 1.517 | 64.167 | |
| | image-side surface 92 | infinity | 0.461 | | | |
| | image plane 100 | infinity | 0.000 | | | |

FIG. 16

| surface | K | $a_2$ | $a_4$ | $a_6$ | $a_8$ |
|---|---|---|---|---|---|
| object-side surface 31 | 0.0000E+00 | 0.0000E+00 | -2.1259E-04 | 4.4306E-04 | -7.0606E-04 |
| image-side surface 32 | 0.0000E+00 | 0.0000E+00 | 1.2527E-02 | -7.2227E-03 | 2.6215E-03 |
| object-side surface 41 | 0.0000E+00 | 0.0000E+00 | -1.3360E-02 | -1.6199E-03 | 5.4079E-03 |
| image-side surface 42 | 0.0000E+00 | 0.0000E+00 | -2.0767E-02 | 1.0359E-02 | 2.1547E-03 |
| object-side surface 51 | 0.0000E+00 | 0.0000E+00 | -4.6268E-02 | -2.4318E-04 | -1.0391E-04 |
| image-side surface 52 | 0.0000E+00 | 0.0000E+00 | -7.9838E-02 | 1.6668E-02 | -4.6603E-03 |
| object-side surface 61 | 0.0000E+00 | 0.0000E+00 | -4.9504E-02 | 1.1039E-02 | -1.0695E-04 |
| image-side surface 62 | 0.0000E+00 | 0.0000E+00 | -4.7116E-02 | 8.0590E-03 | -9.0375E-04 |
| surface | $a_{10}$ | $a_{12}$ | $a_{14}$ | $a_{16}$ | |
| object-side surface 31 | 7.8358E-05 | 0.0000E+00 | 0.0000E+00 | 0.0000E+00 | |
| image-side surface 32 | -3.3558E-04 | 0.0000E+00 | 0.0000E+00 | 0.0000E+00 | |
| object-side surface 41 | -1.1650E-03 | 0.0000E+00 | 0.0000E+00 | 0.0000E+00 | |
| image-side surface 42 | 5.2340E-04 | 0.0000E+00 | 0.0000E+00 | 0.0000E+00 | |
| object-side surface 51 | -3.8537E-04 | 5.3723E-06 | 0.0000E+00 | 0.0000E+00 | |
| image-side surface 52 | 3.6459E-04 | -1.2926E-05 | 0.0000E+00 | 0.0000E+00 | |
| object-side surface61 | -5.4378E-04 | 6.5263E-05 | 0.0000E+00 | 0.0000E+00 | |
| image-side surface 62 | 3.7052E-05 | -4.4413E-08 | 0.0000E+00 | 0.0000E+00 | |

FIG. 17

| | fourth embodiment | | | | | |
|---|---|---|---|---|---|---|
| | EFL= 7.069mm, HFOV= 18.738°, TTL= 6.662 mm, $F_{NO}$= 2.390 | | | | | |
| | surface | radius of curvature (mm) | thickness (mm) | refractive index | dispersion coefficient | focal length(mm) |
| object | | infinity | infinity | | | |
| aperture2 | | infinity | -0.664 | | | |
| first lens element 3 | object-side surface 31 | 1.889 | 1.088 | 1.545 | 55.987 | 3.508 |
| | image-side surface 32 | -201.176 | 0.088 | | | |
| second lens element4 | object-side surface 41 | 4.433 | 0.230 | 1.642 | 22.409 | -5.619 |
| | image-side surface 42 | 1.998 | 2.530 | | | |
| third lens element 5 | object-side surface 51 | -11.821 | 0.979 | 1.642 | 22.409 | 8.845 |
| | image-side surface 52 | -4.374 | 0.168 | | | |
| fourth lens element 6 | object-side surface 61 | -2.160 | 0.439 | 1.535 | 55.690 | -4.720 |
| | image-side surface 62 | -15.020 | 0.400 | | | |
| filter 9 | object-side surface 91 | infinity | 0.210 | 1.517 | 64.167 | |
| | image-side surface 92 | infinity | 0.530 | | | |
| | image plane 100 | infinity | 0.000 | | | |

FIG. 20

| surface | K | $a_2$ | $a_4$ | $a_6$ | $a_8$ |
|---|---|---|---|---|---|
| object-side surface 31 | -3.2365E-03 | -2.3876E-03 | -4.5454E-03 | 4.2342E-03 | -2.7818E-03 |
| image-side surface 32 | -1.5642E+02 | 4.1575E-03 | 1.4198E-02 | -1.8636E-02 | 9.1365E-03 |
| object-side surface 41 | 3.4078E-01 | -1.6046E-03 | -5.8512E-03 | -3.2426E-02 | 2.8599E-02 |
| image-side surface 42 | 1.5678E-01 | 3.4638E-03 | -9.2556E-03 | 3.1319E-03 | 7.2922E-03 |
| object-side surface 51 | -1.3250E+02 | 1.9477E-02 | -2.3244E-02 | -1.6647E-02 | 4.6252E-03 |
| image-side surface 52 | -2.5245E+00 | 6.0664E-03 | 1.1326E-03 | 3.0480E-03 | -1.3239E-02 |
| object-side surface 61 | -4.7006E-02 | 2.4925E-02 | -1.6492E-02 | 6.1954E-02 | -3.8901E-02 |
| image-side surface 62 | -1.4673E+02 | 2.4701E-02 | -5.7752E-02 | 2.7090E-02 | -5.2900E-03 |
| surface | $a_{10}$ | $a_{12}$ | $a_{14}$ | $a_{16}$ | |
| object-side surface 31 | 2.3707E-04 | 7.1554E-05 | 6.9179E-06 | -1.0293E-05 | |
| image-side surface 32 | -1.2381E-03 | 1.5169E-06 | -2.3494E-05 | -4.9670E-06 | |
| object-side surface 41 | -6.3568E-03 | 7.2733E-05 | 9.5829E-05 | -6.5749E-05 | |
| image-side surface 42 | 7.2192E-03 | -2.3150E-04 | -9.9183E-04 | 5.3539E-04 | |
| object-side surface 51 | -2.1356E-03 | 5.2020E-04 | 8.0176E-05 | -3.0545E-05 | |
| image-side surface 52 | 3.5342E-03 | -1.4360E-05 | -1.6867E-05 | -7.1358E-06 | |
| object-side surface 61 | 1.0142E-02 | -8.9310E-04 | -5.1552E-06 | 1.2790E-07 | |
| image-side surface 62 | 1.8513E-05 | 7.6168E-05 | -1.1686E-06 | -6.0999E-07 | |

FIG. 21

| fifth embodiment ||||||
|---|---|---|---|---|---|
| EFL= 6.625mm, HFOV= 19.905 °, TTL= 6.429 mm, $F_{NO}$= 2.394 ||||||
|  | surface | radius of curvature (mm) | thickness (mm) | refractive index | dispersion coefficient | focal length (mm) |
| object |  | infinity | infinity |  |  |  |
| aperture2 |  | infinity | -0.548 |  |  |  |
| first lens element 3 | object-side surface 31 | 1.943 | 1.006 | 1.545 | 55.987 | 3.169 |
|  | image-side surface 32 | -12.976 | 0.180 |  |  |  |
| second lens element 4 | object-side surface 41 | 9.329 | 0.239 | 1.642 | 22.409 | -4.795 |
|  | image-side surface 42 | 2.305 | 2.149 |  |  |  |
| third lens element 5 | object-side surface 51 | -48.294 | 0.875 | 1.642 | 22.409 | 7.914 |
|  | image-side surface 52 | -4.665 | 0.158 |  |  |  |
| fourth lens element 6 | object-side surface 61 | -2.492 | 0.811 | 1.535 | 55.690 | -4.370 |
|  | image-side surface 62 | 44.376 | 0.400 |  |  |  |
| filter 9 | object-side surface 91 | infinity | 0.210 | 1.517 | 64.167 |  |
|  | image-side surface 92 | infinity | 0.401 |  |  |  |
|  | image plane 100 | infinity | 0.000 |  |  |  |

FIG. 24

| surface | K | $a_2$ | $a_4$ | $a_6$ | $a_8$ |
|---|---|---|---|---|---|
| object-side surface 31 | 0.0000E+00 | 0.0000E+00 | -1.8424E-03 | 1.5864E-03 | -1.7048E-03 |
| image-side surface 32 | 0.0000E+00 | 0.0000E+00 | 2.5655E-02 | -2.1194E-02 | 9.3293E-03 |
| object-side surface 41 | 0.0000E+00 | 0.0000E+00 | -5.9546E-04 | -2.6447E-02 | 2.7082E-02 |
| image-side surface 42 | 0.0000E+00 | 0.0000E+00 | -1.0814E-02 | 2.4943E-03 | 1.5261E-02 |
| object-side surface 51 | 0.0000E+00 | 0.0000E+00 | -2.3857E-02 | -1.8710E-02 | 1.7794E-03 |
| image-side surface 52 | 0.0000E+00 | 0.0000E+00 | -1.5403E-02 | 1.1604E-02 | -1.3998E-02 |
| object-side surface 61 | 0.0000E+00 | 0.0000E+00 | -3.5046E-02 | 6.4938E-02 | -3.8562E-02 |
| image-side surface 62 | 0.0000E+00 | 0.0000E+00 | -4.5156E-02 | 1.6493E-02 | -3.7912E-03 |
| surface | $a_{10}$ | $a_{12}$ | $a_{14}$ | $a_{16}$ | |
| object-side surface 31 | 1.3059E-04 | 0.0000E+00 | 0.0000E+00 | 0.0000E+00 | |
| image-side surface 32 | -1.4090E-03 | 0.0000E+00 | 0.0000E+00 | 0.0000E+00 | |
| object-side surface 41 | -6.2788E-03 | 0.0000E+00 | 0.0000E+00 | 0.0000E+00 | |
| image-side surface 42 | 1.0121E-03 | 0.0000E+00 | 0.0000E+00 | 0.0000E+00 | |
| object-side surface 51 | -1.0805E-03 | 0.0000E+00 | 0.0000E+00 | 0.0000E+00 | |
| image-side surface 52 | 2.7649E-03 | 0.0000E+00 | 0.0000E+00 | 0.0000E+00 | |
| object-side surface 61 | 9.1971E-03 | -7.2071E-04 | 0.0000E+00 | 0.0000E+00 | |
| image-side surface 62 | 3.3895E-04 | -1.1488E-05 | 0.0000E+00 | 0.0000E+00 | |

FIG. 25

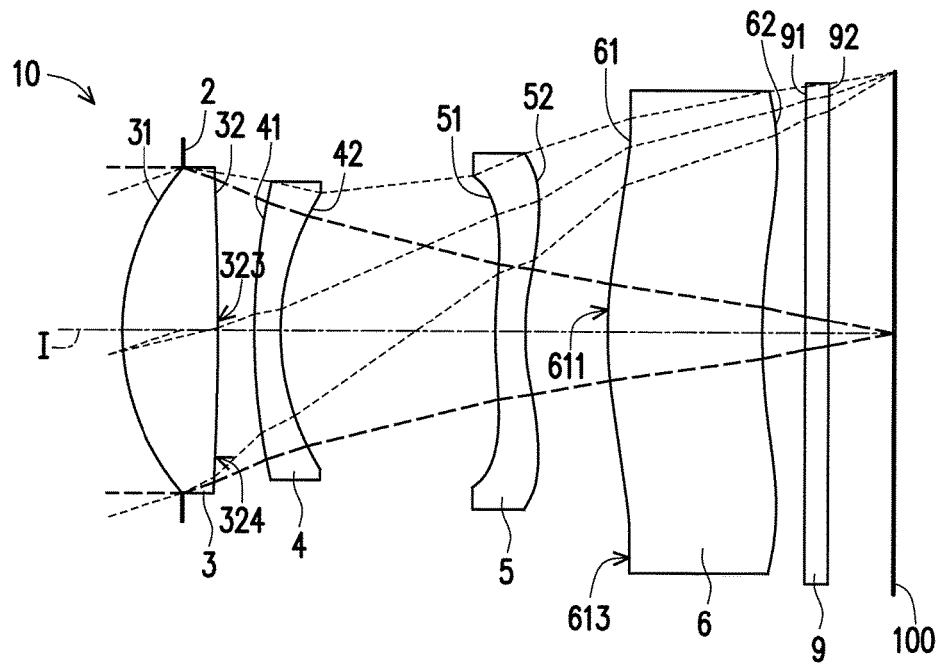
FIG. 26
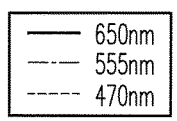
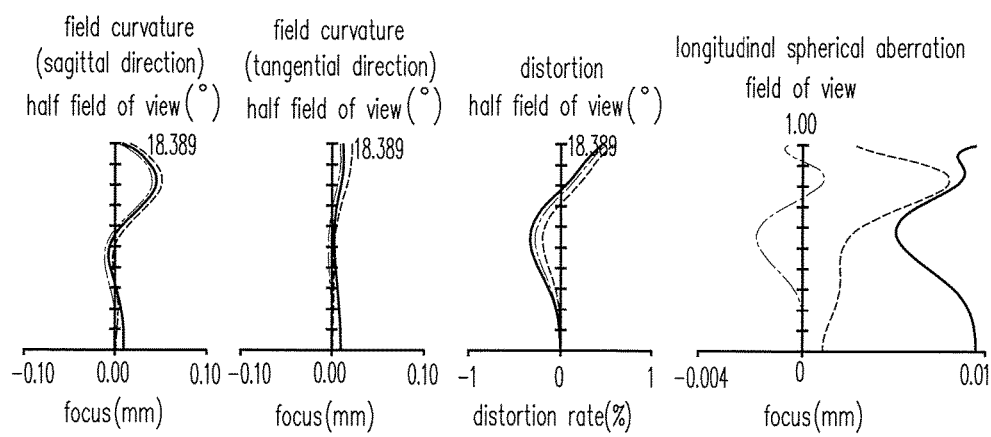
FIG. 27A  FIG. 27B  FIG. 27C  FIG. 27D

| sixth embodiment ||||||
|---|---|---|---|---|---|
| EFL= 7.183mm, HFOV= 18.388°, TTL= 7.152mm, $F_{NO}$ = 2.403 ||||||
| | surface | radius of curvature (mm) | thickness (mm) | refractive index | dispersion coefficient | focal length (mm) |
| object | | infinity | infinity | | | |
| aperture 2 | | infinity | -0.534 | | | |
| first lens element 3 | object-side surface 31 | 2.237 | 0.876 | 1.545 | 55.987 | 3.856 |
| | image-side surface 32 | -31.096 | 0.336 | | | |
| second lens element 4 | object-side surface 41 | 4.922 | 0.239 | 1.661 | 20.401 | -6.354 |
| | image-side surface 42 | 2.232 | 2.001 | | | |
| third lens element 5 | object-side surface 51 | 4.464 | 0.279 | 1.545 | 55.987 | -10.154 |
| | image-side surface 52 | 2.419 | 0.761 | | | |
| fourth lens element 6 | object-side surface 61 | 3.830 | 1.439 | 1.661 | 20.401 | 28.958 |
| | image-side surface 62 | 4.060 | 0.400 | | | |
| filter 9 | object-side surface 91 | infinity | 0.210 | 1.517 | 64.167 | |
| | image-side surface 92 | infinity | 0.611 | | | |
| | image plane 100 | infinity | 0.000 | | | |

FIG. 28

| surface | K | $a_2$ | $a_4$ | $a_6$ | $a_8$ |
|---|---|---|---|---|---|
| object-side surface 31 | 0.0000E+00 | 0.0000E+00 | -2.2857E-03 | -5.7617E-04 | -3.0211E-04 |
| image-side surface 32 | 0.0000E+00 | 0.0000E+00 | 1.0058E-04 | 5.7908E-04 | 1.8346E-05 |
| object-side surface 41 | 0.0000E+00 | 0.0000E+00 | -4.3435E-02 | 2.2604E-02 | -3.2242E-03 |
| image-side surface 42 | 0.0000E+00 | 0.0000E+00 | -4.5411E-02 | 2.4542E-02 | -2.4329E-03 |
| object-side surface 51 | 0.0000E+00 | 0.0000E+00 | -1.1664E-01 | 2.0786E-02 | 1.9525E-04 |
| image-side surface 52 | 0.0000E+00 | 0.0000E+00 | -1.5361E-01 | 5.8231E-02 | -1.7606E-02 |
| object-side surface 61 | 0.0000E+00 | 0.0000E+00 | -4.9248E-02 | 1.6289E-02 | -3.9187E-03 |
| image-side surface 62 | 0.0000E+00 | 0.0000E+00 | -5.0383E-02 | 1.3254E-02 | -2.8816E-03 |
| surface | $a_{10}$ | $a_{12}$ | $a_{14}$ | $a_{16}$ | |
| object-side surface 31 | 0.0000E+00 | 0.0000E+00 | 0.0000E+00 | 0.0000E+00 | |
| image-side surface 32 | 0.0000E+00 | 0.0000E+00 | 0.0000E+00 | 0.0000E+00 | |
| object-side surface 41 | 0.0000E+00 | 0.0000E+00 | 0.0000E+00 | 0.0000E+00 | |
| image-side surface 42 | 0.0000E+00 | 0.0000E+00 | 0.0000E+00 | 0.0000E+00 | |
| object-side surface 51 | -3.1723E-03 | 0.0000E+00 | 0.0000E+00 | 0.0000E+00 | |
| image-side surface 52 | 1.8164E-03 | 0.0000E+00 | 0.0000E+00 | 0.0000E+00 | |
| object-side surface 61 | 5.1180E-04 | -3.2052E-05 | 0.0000E+00 | 0.0000E+00 | |
| image-side surface 62 | 3.3992E-04 | -1.7279E-05 | 0.0000E+00 | 0.0000E+00 | |

FIG. 29

| seventh embodiment |||||||
|---|---|---|---|---|---|---|
| EFL= 7.223mm, HFOV= 18.296°, TTL= 7.191 mm, $F_{NO}$ = 2.395 |||||||
| | surface | radius of curvature (mm) | thickness (mm) | refractive index | dispersion coefficient | focal length (mm) |
| object | | infinity | infinity | | | |
| aperture 2 | | infinity | -0.518 | | | |
| first lens element 3 | object-side surface 31 | 2.339 | 0.890 | 1.545 | 55.987 | 3.786 |
| | image-side surface 32 | -15.443 | 0.050 | | | |
| second lens element 4 | object-side surface 41 | -80.405 | 0.239 | 1.661 | 20.401 | -10.588 |
| | image-side surface 42 | 7.743 | 2.364 | | | |
| third lens element 5 | object-side surface 51 | -5.413 | 0.280 | 1.545 | 55.987 | -8.471 |
| | image-side surface 52 | 32.444 | 0.078 | | | |
| fourth lens element 6 | object-side surface 61 | 45.226 | 2.230 | 1.661 | 20.401 | -17.763 |
| | image-side surface 62 | 9.196 | 0.400 | | | |
| filter 9 | object-side surface 91 | infinity | 0.210 | 1.517 | 64.167 | |
| | image-side surface 92 | infinity | 0.450 | | | |
| | image plane 100 | infinity | 0.000 | | | |

FIG. 32

| surface | K | $a_2$ | $a_4$ | $a_6$ | $a_8$ |
|---|---|---|---|---|---|
| object-side surface 31 | 0.0000E+00 | 0.0000E+00 | -2.4322E-03 | -1.8490E-04 | -3.5991E-05 |
| image-side surface 32 | 0.0000E+00 | 0.0000E+00 | 2.0389E-03 | 4.8286E-04 | -2.1340E-04 |
| object-side surface 41 | 0.0000E+00 | 0.0000E+00 | -8.4120E-04 | -9.5912E-05 | -1.8520E-04 |
| image-side surface 42 | 0.0000E+00 | 0.0000E+00 | -3.8856E-04 | -9.7755E-04 | 9.7803E-05 |
| object-side surface 51 | 0.0000E+00 | 0.0000E+00 | -2.1440E-02 | -3.0229E-02 | -5.1653E-04 |
| image-side surface 52 | 0.0000E+00 | 0.0000E+00 | -4.5943E-02 | -2.2958E-02 | 6.0061E-03 |
| object-side surface 61 | 0.0000E+00 | 0.0000E+00 | -5.8703E-02 | -2.3833E-03 | 5.3524E-03 |
| image-side surface 62 | -4.1008E+01 | 0.0000E+00 | -2.2149E-02 | 2.2511E-03 | -2.2409E-04 |
| surface | $a_{10}$ | $a_{12}$ | $a_{14}$ | $a_{16}$ | |
| object-side surface 31 | 0.0000E+00 | 0.0000E+00 | 0.0000E+00 | 0.0000E+00 | |
| image-side surface 32 | 0.0000E+00 | 0.0000E+00 | 0.0000E+00 | 0.0000E+00 | |
| object-side surface 41 | 0.0000E+00 | 0.0000E+00 | 0.0000E+00 | 0.0000E+00 | |
| image-side surface 42 | 0.0000E+00 | 0.0000E+00 | 0.0000E+00 | 0.0000E+00 | |
| object-side surface 51 | 0.0000E+00 | 0.0000E+00 | 0.0000E+00 | 0.0000E+00 | |
| image-side surface 52 | 0.0000E+00 | 0.0000E+00 | 0.0000E+00 | 0.0000E+00 | |
| object-side surface 61 | -1.2360E-03 | 0.0000E+00 | 0.0000E+00 | 0.0000E+00 | |
| image-side surface 62 | 4.4369E-06 | 0.0000E+00 | 0.0000E+00 | 0.0000E+00 | |

FIG. 33

| | eighth embodiment | | | | | |
|---|---|---|---|---|---|---|
| | EFL= 7.198 mm, HFOV= 18.421°, TTL= 7.190 mm, $F_{NO}$= 2.397 | | | | | |
| | surface | radius of curvature (mm) | thickness (mm) | refractive index | dispersion coefficient | focal length (mm) |
| object | | infinity | infinity | | | |
| aperture 2 | | infinity | -0.423 | | | |
| first lens element 3 | object-side surface 31 | 2.751 | 0.842 | 1.545 | 55.987 | 3.724 |
| | image-side surface 32 | -6.968 | 0.142 | | | |
| second lens element 4 | object-side surface 41 | -3.148 | 0.333 | 1.642 | 22.409 | -8.129 |
| | image-side surface 42 | -8.164 | 3.055 | | | |
| third lens element 5 | object-side surface 51 | -11.910 | 0.662 | 1.545 | 55.987 | 11.381 |
| | image-side surface 52 | -4.165 | 0.573 | | | |
| fourth lens element 6 | object-side surface 61 | -2.666 | 0.568 | 1.545 | 55.987 | -4.164 |
| | image-side surface 62 | 16.674 | 0.400 | | | |
| filter 9 | object-side surface 91 | infinity | 0.210 | 1.517 | 64.167 | |
| | image-side surface 92 | infinity | 0.406 | | | |
| | image plane 100 | infinity | 0.000 | | | |

FIG. 36

| surface | K | $a_2$ | $a_4$ | $a_6$ | $a_8$ |
|---|---|---|---|---|---|
| object-side surface 31 | 0.0000E+00 | 0.0000E+00 | -4.6609E-03 | 2.5878E-03 | -1.2267E-03 |
| image-side surface 32 | 0.0000E+00 | 0.0000E+00 | -5.9137E-03 | 1.3797E-02 | -3.6072E-03 |
| object-side surface 41 | 0.0000E+00 | 0.0000E+00 | 4.0849E-02 | 2.2363E-03 | -3.2242E-03 |
| image-side surface 42 | 0.0000E+00 | 0.0000E+00 | 3.7268E-02 | -4.3025E-03 | -2.4082E-03 |
| object-side surface 51 | 0.0000E+00 | 0.0000E+00 | -3.2803E-02 | -7.3428E-03 | -4.6579E-03 |
| image-side surface 52 | 0.0000E+00 | 0.0000E+00 | -2.5144E-02 | -1.0224E-02 | 2.7336E-03 |
| object-side surface 61 | 0.0000E+00 | 0.0000E+00 | -6.6585E-02 | 1.5734E-02 | 5.3157E-03 |
| image-side surface 62 | 0.0000E+00 | 0.0000E+00 | -7.5673E-02 | 2.4102E-02 | -4.6814E-03 |
| surface | $a_{10}$ | $a_{12}$ | $a_{14}$ | $a_{16}$ | |
| object-side surface 31 | 3.3626E-04 | 0.0000E+00 | 0.0000E+00 | 0.0000E+00 | |
| image-side surface 32 | 8.9080E-05 | 0.0000E+00 | 0.0000E+00 | 0.0000E+00 | |
| object-side surface 41 | 2.2687E-04 | 0.0000E+00 | 0.0000E+00 | 0.0000E+00 | |
| image-side surface 42 | 6.5908E-04 | 0.0000E+00 | 0.0000E+00 | 0.0000E+00 | |
| object-side surface 51 | 1.5540E-03 | 0.0000E+00 | 0.0000E+00 | 0.0000E+00 | |
| image-side surface 52 | 2.0131E-04 | 0.0000E+00 | 0.0000E+00 | 0.0000E+00 | |
| object-side surface 61 | -2.0333E-03 | 1.4574E-04 | 0.0000E+00 | 0.0000E+00 | |
| image-side surface 62 | 4.6955E-04 | -2.5733E-05 | 0.0000E+00 | 0.0000E+00 | |

FIG. 37

| ninth embodiment | | | | | | |
|---|---|---|---|---|---|---|
| EFL= 6.862mm, HFOV= 19.252°, TTL= 6.722 mm, $F_{NO}$ = 2.611 | | | | | | |
| | surface | radius of curvature (mm) | thickness (mm) | refractive index | dispersion coefficient | focal length (mm) |
| object | | infinity | infinity | | | |
| first lens element 3 | object-side surface 31 | 1.890 | 1.052 | 1.545 | 55.987 | 3.285 |
| | image-side surface 32 | -28.569 | 0.149 | | | |
| aperture 2 | | infinity | 0.042 | | | |
| second lens element 4 | object-side surface 41 | -93.620 | 0.239 | 1.642 | 22.409 | -4.868 |
| | image-side surface 42 | 3.264 | 2.110 | | | |
| third lens element 5 | object-side surface 51 | 8.342 | 0.280 | 1.535 | 55.690 | -7.976 |
| | image-side surface 52 | 2.795 | 0.371 | | | |
| fourth lens element 6 | object-side surface 61 | 4.363 | 1.375 | 1.642 | 22.409 | 19.648 |
| | image-side surface 62 | 5.819 | 0.400 | | | |
| filter 9 | object-side surface 91 | infinity | 0.210 | 1.517 | 64.167 | |
| | image-side surface 92 | infinity | 0.495 | | | |
| | image plane 100 | infinity | 0.000 | | | |

FIG. 40

| surface | K | $a_2$ | $a_4$ | $a_6$ | $a_8$ |
|---|---|---|---|---|---|
| object-side surface 31 | 0.0000E+00 | 0.0000E+00 | -9.2170E-04 | 7.1753E-04 | -9.2289E-04 |
| image-side surface 32 | 0.0000E+00 | 0.0000E+00 | 3.5507E-02 | -2.4606E-02 | 1.1660E-02 |
| object-side surface 41 | 0.0000E+00 | 0.0000E+00 | 9.3989E-02 | -8.2774E-02 | 4.8254E-02 |
| image-side surface 42 | 0.0000E+00 | 0.0000E+00 | 9.3357E-02 | -5.0733E-02 | 3.6068E-02 |
| object-side surface 51 | 0.0000E+00 | 0.0000E+00 | -9.7584E-02 | 2.4887E-03 | 1.1040E-03 |
| image-side surface 52 | 0.0000E+00 | 0.0000E+00 | -1.0846E-01 | 1.6627E-02 | -3.1507E-03 |
| object-side surface 61 | 0.0000E+00 | 0.0000E+00 | -2.6889E-02 | 6.1418E-03 | -1.5110E-03 |
| image-side surface 22 | 0.0000E+00 | 0.0000E+00 | -2.9204E-02 | 5.0556E-03 | -6.1150E-04 |
| surface | $a_{10}$ | $a_{12}$ | $a_{14}$ | $a_{16}$ | |
| object-side surface 31 | 2.6471E-04 | 0.0000E+00 | 0.0000E+00 | 0.0000E+00 | |
| image-side surface 32 | -2.1646E-03 | 0.0000E+00 | 0.0000E+00 | 0.0000E+00 | |
| object-side surface 41 | -1.1744E-02 | 0.0000E+00 | 0.0000E+00 | 0.0000E+00 | |
| image-side surface 42 | -2.9444E-03 | 0.0000E+00 | 0.0000E+00 | 0.0000E+00 | |
| object-side surface 51 | -1.2932E-03 | 0.0000E+00 | 0.0000E+00 | 0.0000E+00 | |
| image-side surface 52 | 9.8961E-05 | 0.0000E+00 | 0.0000E+00 | 0.0000E+00 | |
| object-side surface 61 | 2.1937E-04 | -1.7641E-05 | 0.0000E+00 | 0.0000E+00 | |
| image-side surface 22 | 3.3434E-05 | -1.9131E-06 | 0.0000E+00 | 0.0000E+00 | |

FIG. 41

| tenth embodiment ||||||
|---|---|---|---|---|---|
| EFL= 7.235 mm, HFOV= 22.611°, TTL= 7.191mm, $F_{NO}$ = 2.032 ||||||
| lens element | surface | radius of curvature (mm) | thickness (mm) | refractive index | dispersion coefficient | focal length (mm) |
| object | | infinity | infinity | | | |
| aperture | | infinity | -0.805 | | | |
| first lens element 3 | object-side surface 31 | 2.372 | 1.282 | 1.545 | 55.987 | 3.727 |
| | image-side surface 32 | -11.637 | 0.051 | | | |
| second lens element 4 | object-side surface 41 | 3.220 | 0.262 | 1.642 | 22.409 | -5.421 |
| | image-side surface 42 | 1.625 | 2.186 | | | |
| third lens element 5 | object-side surface 51 | 16.200 | 0.361 | 1.535 | 55.690 | 11.897 |
| | image-side surface 52 | -10.453 | 0.693 | | | |
| fifth lens element 7 | object-side surface 71 | -30.662 | 0.329 | 1.545 | 55.987 | -4.761 |
| | image-side surface 72 | 2.853 | 0.301 | | | |
| fourth lens element 6 | object-side surface 61 | 4.774 | 0.682 | 1.661 | 20.401 | 18.797 |
| | image-side surface 62 | 7.274 | 0.380 | | | |
| filter 9 | object-side surface 91 | infinity | 0.210 | 1.517 | 64.167 | |
| | image-side surface 92 | infinity | 0.455 | | | |
| | image plane 100 | infinity | 0.000 | | | |

FIG. 44

| surface | K | $a_2$ | $a_4$ | $a_6$ | $a_8$ |
|---|---|---|---|---|---|
| object-side surface 31 | 0.0000E+00 | 0.0000E+00 | 3.4166E-04 | 1.1759E-03 | -9.3990E-04 |
| image-side surface 32 | 0.0000E+00 | 0.0000E+00 | 2.6277E-02 | -1.3788E-02 | 5.9556E-03 |
| object-side surface 41 | 0.0000E+00 | 0.0000E+00 | -9.4836E-02 | 4.4374E-02 | -1.5585E-02 |
| image-side surface 42 | 0.0000E+00 | 0.0000E+00 | -1.4788E-01 | 7.1452E-02 | -3.4395E-02 |
| object-side surface 51 | 0.0000E+00 | 0.0000E+00 | -2.9716E-02 | 7.9887E-04 | -4.7163E-03 |
| image-side surface 52 | 0.0000E+00 | 0.0000E+00 | -2.2466E-02 | 6.7783E-03 | -5.2489E-03 |
| object-side surface 71 | 1.2341E+02 | 0.0000E+00 | -6.8789E-02 | 2.0322E-02 | -5.0800E-04 |
| image-side surface 72 | 0.0000E+00 | 0.0000E+00 | -7.2869E-02 | 1.5076E-02 | -2.3794E-03 |
| object-side surface 61 | 1.9371E+00 | 0.0000E+00 | -3.0079E-02 | 2.0903E-03 | -6.6559E-04 |
| image-side surface 62 | 0.0000E+00 | 0.0000E+00 | -4.1452E-02 | 8.6300E-03 | -1.9578E-03 |
| surface | $a_{10}$ | $a_{12}$ | $a_{14}$ | $a_{16}$ | |
| object-side surface 31 | 3.2466E-04 | -3.8648E-05 | 0.0000E+00 | 0.0000E+00 | |
| image-side surface 32 | -1.4535E-03 | 1.4298E-04 | 0.0000E+00 | 0.0000E+00 | |
| object-side surface 41 | 4.1533E-03 | -8.3670E-04 | 9.4804E-05 | 0.0000E+00 | |
| image-side surface 42 | 1.0420E-02 | -1.9909E-03 | 9.2022E-05 | 0.0000E+00 | |
| object-side surface 51 | 1.1215E-03 | -1.3284E-04 | 0.0000E+00 | 0.0000E+00 | |
| image-side surface 52 | 1.6669E-03 | -1.3540E-04 | 0.0000E+00 | 0.0000E+00 | |
| object-side surface 71 | -5.8389E-04 | 9.5651E-05 | -4.7073E-06 | 0.0000E+00 | |
| image-side surface 72 | 1.2077E-04 | 1.1186E-05 | -1.4563E-06 | 0.0000E+00 | |
| object-side surface 61 | 4.7899E-05 | 3.4519E-06 | -2.8120E-07 | -2.9383E-08 | |
| image-side surface 62 | 1.9521E-04 | 5.3168E-06 | -2.6794E-06 | 1.6325E-07 | |

FIG. 45

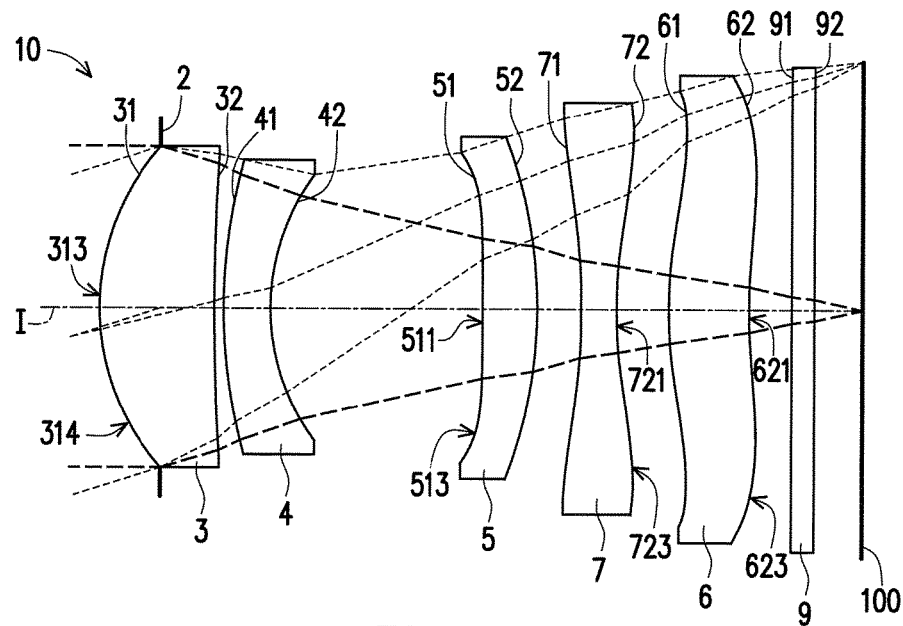
FIG. 46
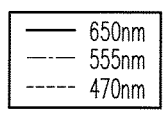
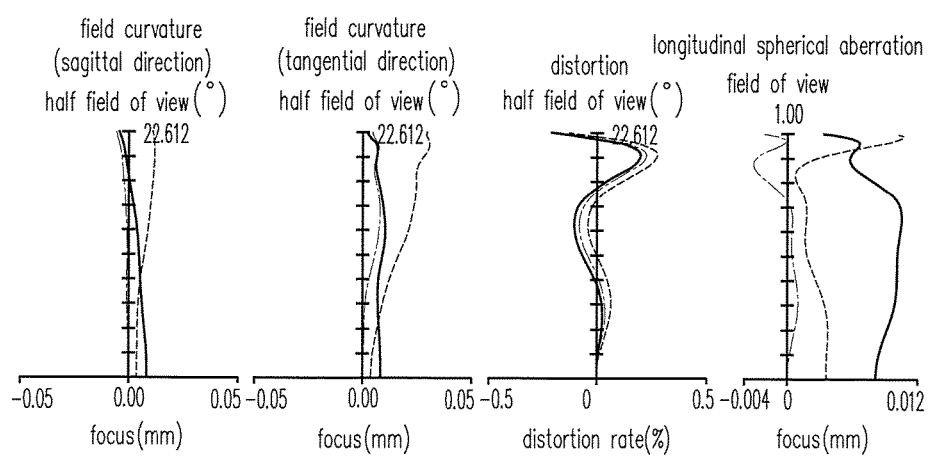
FIG. 47A  FIG. 47B  FIG. 47C  FIG. 47D

| eleventh embodiment ||||||
|---|---|---|---|---|---|
| EFL= 7.216 mm, HFOV= 22.61°, TTL= 7.190 mm, $F_{NO}$ = 2.399 ||||||
| lens element | surface | radius of curvature (mm) | thickness(mm) | refractive index | dispersion coefficient | focal length (mm) |
| object | | infinity | infinity | | | |
| aperture | | infinity | -0.568 | | | |
| first lens element 3 | object-side surface 31 | 2.251 | 1.108 | 1.545 | 55.987 | 3.921 |
| | image-side surface 32 | -36.400 | 0.050 | | | |
| second lens element 4 | object-side surface 41 | 3.639 | 0.439 | 1.661 | 20.401 | -5.825 |
| | image-side surface 42 | 1.787 | 2.010 | | | |
| third lens element 5 | object-side surface 51 | 139.809 | 0.511 | 1.535 | 55.690 | 9.420 |
| | image-side surface 52 | -5.237 | 0.421 | | | |
| fifth lens element 7 | object-side surface 71 | -5.984 | 0.330 | 1.545 | 55.987 | -4.589 |
| | image-side surface 72 | 4.399 | 0.492 | | | |
| fourth lens element 6 | object-side surface 61 | 3.902 | 0.753 | 1.661 | 20.401 | 17.478 |
| | image-side surface 62 | 5.415 | 0.400 | | | |
| filter 9 | object-side surface 91 | infinity | 0.210 | 1.517 | 64.167 | |
| | image-side surface 92 | infinity | 0.466 | | | |
| | image plane 100 | infinity | 0.000 | | | |

FIG. 48

| surface | K | $a_2$ | $a_4$ | $a_6$ | $a_8$ |
|---|---|---|---|---|---|
| object-side surface 31 | 0.0000E+00 | 0.0000E+00 | -1.4648E-04 | 1.7377E-03 | -1.6751E-03 |
| image-side surface 32 | 0.0000E+00 | 0.0000E+00 | 1.9069E-02 | -7.6332E-03 | 3.4708E-03 |
| object-side surface 41 | 0.0000E+00 | 0.0000E+00 | -2.5041E-02 | 3.3165E-03 | 2.9299E-03 |
| image-side surface 42 | 0.0000E+00 | 0.0000E+00 | -5.3460E-02 | 1.9871E-02 | -1.1576E-02 |
| object-side surface 51 | 0.0000E+00 | 0.0000E+00 | -4.1325E-02 | 3.4823E-04 | -3.2500E-05 |
| image-side surface 52 | 0.0000E+00 | 0.0000E+00 | -2.1360E-02 | 9.4895E-03 | -1.2445E-03 |
| object-side surface 71 | 1.7459E+00 | 0.0000E+00 | 5.7768E-04 | 5.2354E-03 | -4.8575E-04 |
| image-side surface 72 | 0.0000E+00 | 0.0000E+00 | -2.6935E-02 | 2.9315E-03 | -4.9495E-04 |
| object-side surface 61 | -6.2469E+00 | 0.0000E+00 | -2.6367E-02 | 4.8919E-03 | -6.7927E-04 |
| image-side surface 62 | 0.0000E+00 | 0.0000E+00 | -3.9533E-02 | 5.2099E-03 | -5.9214E-04 |
| surface | $a_{10}$ | $a_{12}$ | $a_{14}$ | $a_{16}$ | |
| object-side surface 31 | 8.2721E-04 | -1.5000E-04 | 0.0000E+00 | 0.0000E+00 | |
| image-side surface 32 | -1.0827E-03 | 7.8792E-05 | 0.0000E+00 | 0.0000E+00 | |
| object-side surface 41 | -2.6193E-03 | 5.9751E-04 | -3.5591E-05 | 0.0000E+00 | |
| image-side surface 42 | 9.5170E-03 | -5.4712E-03 | 1.4247E-03 | 0.0000E+00 | |
| object-side surface 51 | -6.2558E-04 | -7.2515E-06 | 0.0000E+00 | 0.0000E+00 | |
| image-side surface 52 | -1.7985E-04 | 5.4483E-05 | 0.0000E+00 | 0.0000E+00 | |
| object-side surface 71 | -8.4672E-05 | 1.7864E-05 | -1.0778E-06 | 0.0000E+00 | |
| image-side surface 72 | -1.4737E-05 | 1.2646E-05 | -1.1606E-06 | 0.0000E+00 | |
| object-side surface 61 | -1.1871E-05 | -1.6618E-07 | 2.4243E-07 | 4.6671E-08 | |
| image-side surface 62 | 9.3308E-06 | 1.3865E-06 | -6.3333E-08 | 1.3584E-08 | |

FIG. 49

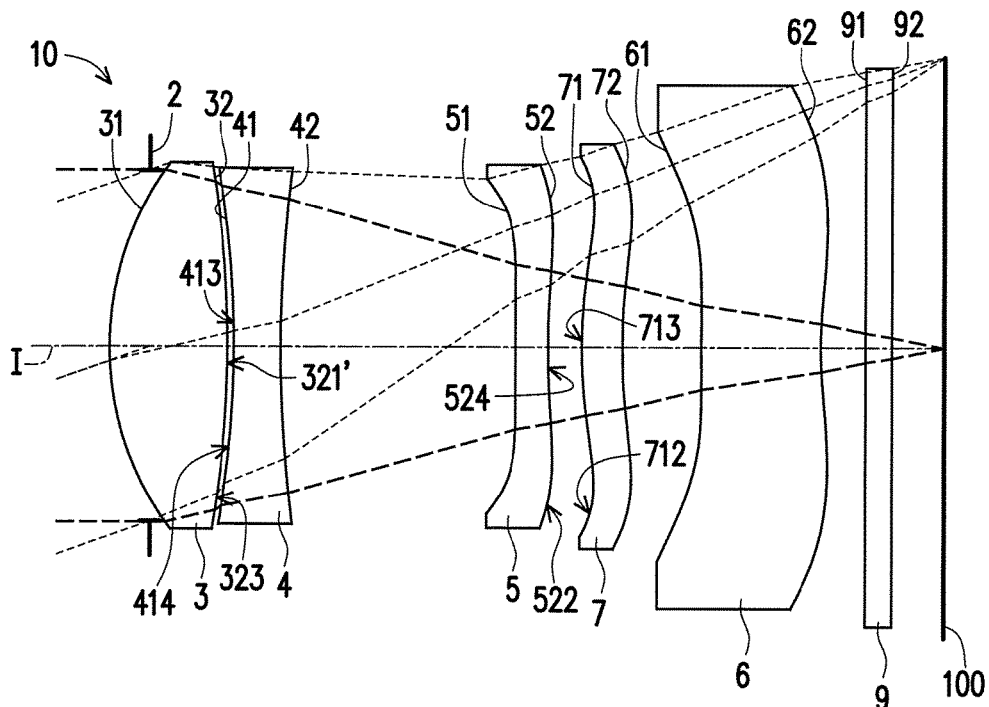
FIG. 50
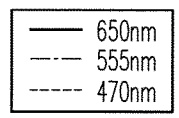
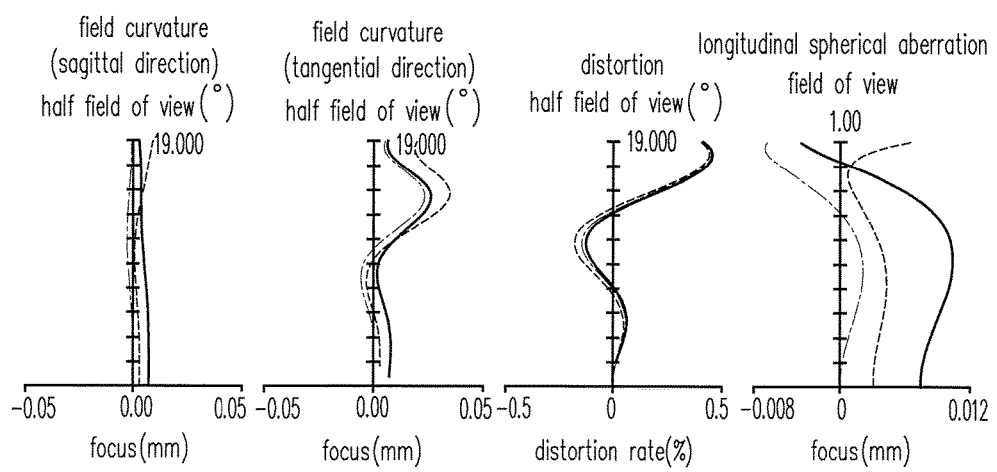
FIG. 51A  FIG. 51B  FIG. 51C  FIG. 51D

| twelfth embodiment |||||||
|---|---|---|---|---|---|---|
| EFL= 7.227 mm, HFOV= 22.634°, TTL= 7.190mm, $F_{NO}$= 2.397 |||||||
| lens element | surface | radius of curvature (mm) | thickness (mm) | refractive index | dispersion coefficient | focal length (mm) |
| object | | infinity | infinity | | | |
| aperture | | infinity | -0.353 | | | |
| first lens element 3 | object-side surface 31 | 2.544 | 1.028 | 1.545 | 55.987 | 3.618 |
| | image-side surface 32 | -7.592 | 0.047 | | | |
| second lens element 4 | object-side surface 41 | -12.030 | 0.409 | 1.642 | 22.409 | -7.176 |
| | image-side surface 42 | 7.669 | 2.013 | | | |
| third lens element 5 | object-side surface 51 | 39.421 | 0.279 | 1.545 | 55.987 | -15.685 |
| | image-side surface 52 | 7.021 | 0.287 | | | |
| fifth lens element 7 | object-side surface 71 | 3.947 | 0.352 | 1.642 | 22.409 | 38.357 |
| | image-side surface 72 | 4.529 | 0.674 | | | |
| fourth lens element 6 | object-side surface 61 | 122.242 | 1.045 | 1.545 | 55.987 | -9.615 |
| | image-side surface 62 | 5.021 | 0.377 | | | |
| filter 9 | object-side surface 91 | infinity | 0.210 | 1.517 | 64.167 | |
| | image-side surface 92 | infinity | 0.469 | | | |
| | image plane 100 | infinity | 0.000 | | | |

FIG. 52

| surface | K | $a_2$ | $a_4$ | $a_6$ | $a_8$ |
|---|---|---|---|---|---|
| object-side surface 31 | 0.0000E+00 | 0.0000E+00 | -1.9274E-03 | 2.2394E-04 | -3.5302E-05 |
| image-side surface 32 | 0.0000E+00 | 0.0000E+00 | 6.8881E-03 | -3.1178E-04 | -3.9566E-04 |
| object-side surface 41 | 0.0000E+00 | 0.0000E+00 | -4.8121E-03 | 7.8723E-04 | -4.6233E-04 |
| image-side surface 42 | 0.0000E+00 | 0.0000E+00 | -1.2223E-02 | 9.1529E-04 | -1.0826E-04 |
| object-side surface 51 | 0.0000E+00 | 0.0000E+00 | -4.3129E-02 | -1.2804E-02 | 5.4875E-04 |
| image-side surface 52 | 0.0000E+00 | 0.0000E+00 | -2.2578E-02 | -2.2315E-02 | 5.9899E-03 |
| object-side surface 71 | 0.0000E+00 | 0.0000E+00 | -1.5060E-02 | -2.4129E-02 | 3.7761E-03 |
| image-side surface 72 | 0.0000E+00 | 0.0000E+00 | -3.3855E-02 | -1.2044E-02 | 2.5221E-03 |
| object-side surface 61 | 0.0000E+00 | 0.0000E+00 | -7.1395E-02 | 1.3123E-02 | -4.1646E-04 |
| image-side surface 62 | 0.0000E+00 | 0.0000E+00 | -6.7991E-02 | 1.3364E-02 | -1.5570E-03 |
| surface | $a_{10}$ | $a_{12}$ | $a_{14}$ | $a_{16}$ | |
| object-side surface 31 | 0.0000E+00 | 0.0000E+00 | 0.0000E+00 | 0.0000E+00 | |
| image-side surface 32 | 0.0000E+00 | 0.0000E+00 | 0.0000E+00 | 0.0000E+00 | |
| object-side surface 41 | 0.0000E+00 | 0.0000E+00 | 0.0000E+00 | 0.0000E+00 | |
| image-side surface 42 | 0.0000E+00 | 0.0000E+00 | 0.0000E+00 | 0.0000E+00 | |
| object-side surface 51 | 0.0000E+00 | 0.0000E+00 | 0.0000E+00 | 0.0000E+00 | |
| image-side surface 52 | 0.0000E+00 | 0.0000E+00 | 0.0000E+00 | 0.0000E+00 | |
| object-side surface 71 | 0.0000E+00 | 0.0000E+00 | 0.0000E+00 | 0.0000E+00 | |
| image-side surface 72 | 0.0000E+00 | 0.0000E+00 | 0.0000E+00 | 0.0000E+00 | |
| object-side surface 61 | -2.8851E-05 | 0.0000E+00 | 0.0000E+00 | 0.0000E+00 | |
| image-side surface 62 | 6.7332E-05 | 0.0000E+00 | 0.0000E+00 | 0.0000E+00 | |

FIG. 53

| thirteenth embodiment ||||||
|---|---|---|---|---|---|
| EFL= 7.202mm, HFOV= 22.632°, TTL= 7.190mm, $F_{NO}$= 2.397 ||||||
| lens element | surface | radius of curvature (mm) | thickness (mm) | refractive index | dispersion coefficient | focal length (mm) |
| object | | infinity | infinity | | | |
| aperture | | infinity | -0.460 | | | |
| first lens element 3 | object-side surface 31 | 2.591 | 0.826 | 1.545 | 55.987 | 3.961 |
| | image-side surface 32 | -11.653 | 0.047 | | | |
| second lens element4 | object-side surface 41 | 21.239 | 0.329 | 1.661 | 20.401 | -8.491 |
| | image-side surface 42 | 4.440 | 2.394 | | | |
| third lens element 5 | object-side surface 51 | 188.092 | 0.279 | 1.545 | 55.987 | -19.321 |
| | image-side surface 52 | 9.988 | 0.295 | | | |
| fifth lens element 7 | object-side surface 71 | 2.902 | 0.381 | 1.661 | 20.401 | 90.795 |
| | image-side surface 72 | 2.888 | 0.643 | | | |
| fourth lens element 6 | object-side surface 61 | 14.955 | 0.946 | 1.545 | 55.987 | -12.481 |
| | image-side surface 62 | 4.579 | 0.377 | | | |
| filter 9 | object-side surface 91 | infinity | 0.198 | 1.517 | 64.167 | |
| | image-side surface 92 | infinity | 0.475 | | | |
| | image plane 100 | infinity | 0.000 | | | |

FIG. 56

| surface | K | $a_2$ | $a_4$ | $a_6$ | $a_8$ |
|---|---|---|---|---|---|
| object-side surface 31 | 0.0000E+00 | 0.0000E+00 | -1.6899E-03 | 9.1886E-04 | -2.4931E-04 |
| image-side surface 32 | 0.0000E+00 | 0.0000E+00 | 1.3107E-02 | -5.1923E-03 | 7.9775E-04 |
| object-side surface 41 | 0.0000E+00 | 0.0000E+00 | -8.1070E-03 | -2.6791E-03 | 9.2501E-04 |
| image-side surface 42 | 0.0000E+00 | 0.0000E+00 | -2.0471E-02 | 2.4702E-03 | 1.3643E-04 |
| object-side surface 51 | 0.0000E+00 | 0.0000E+00 | -1.4403E-02 | -2.4541E-02 | 3.3512E-03 |
| image-side surface 52 | 0.0000E+00 | 0.0000E+00 | 4.4549E-03 | -3.2726E-02 | 7.2191E-03 |
| object-side surface 71 | 0.0000E+00 | 0.0000E+00 | -1.3842E-02 | -1.3414E-02 | 1.5076E-03 |
| image-side surface 72 | 0.0000E+00 | 0.0000E+00 | -3.2669E-02 | -6.3069E-03 | 9.0289E-04 |
| object-side surface 61 | 0.0000E+00 | 0.0000E+00 | -6.7242E-02 | 3.1102E-03 | 1.6262E-03 |
| image-side surface 62 | 0.0000E+00 | 0.0000E+00 | -6.7391E-02 | 8.2607E-03 | -5.2855E-04 |
| surface | $a_{10}$ | $a_{12}$ | $a_{14}$ | $a_{16}$ | |
| object-side surface 31 | 0.0000E+00 | 0.0000E+00 | 0.0000E+00 | 0.0000E+00 | |
| image-side surface 32 | 0.0000E+00 | 0.0000E+00 | 0.0000E+00 | 0.0000E+00 | |
| object-side surface 41 | 0.0000E+00 | 0.0000E+00 | 0.0000E+00 | 0.0000E+00 | |
| image-side surface 42 | 0.0000E+00 | 0.0000E+00 | 0.0000E+00 | 0.0000E+00 | |
| object-side surface 51 | 0.0000E+00 | 0.0000E+00 | 0.0000E+00 | 0.0000E+00 | |
| image-side surface 52 | 0.0000E+00 | 0.0000E+00 | 0.0000E+00 | 0.0000E+00 | |
| object-side surface 71 | 0.0000E+00 | 0.0000E+00 | 0.0000E+00 | 0.0000E+00 | |
| image-side surface 72 | 0.0000E+00 | 0.0000E+00 | 0.0000E+00 | 0.0000E+00 | |
| object-side surface 61 | -1.4661E-04 | 0.0000E+00 | 0.0000E+00 | 0.0000E+00 | |
| image-side surface 62 | 4.1687E-06 | 0.0000E+00 | 0.0000E+00 | 0.0000E+00 | |

FIG. 57

| fourteenth embodiment ||||||
|---|---|---|---|---|---|
| EFL= 7.231mm, HFOV= 22.488°, TTL= 7.190mm, $F_{NO}$= 2.401 ||||||
| lens element | surface | radius of curvature (mm) | thickness (mm) | refractive index | dispersion coefficient | focal length (mm) |
| object | | infinity | infinity | | | |
| aperture | | infinity | -0.451 | | | |
| first lens element 3 | object-side surface 31 | 2.641 | 0.822 | 1.545 | 55.987 | 3.986 |
| | image-side surface 32 | -11.040 | 0.047 | | | |
| second lens element 4 | object-side surface 41 | -122.583 | 0.239 | 1.661 | 20.401 | -8.906 |
| | image-side surface 42 | 6.241 | 2.830 | | | |
| third lens element 5 | object-side surface 51 | -4.472 | 0.279 | 1.545 | 55.987 | -28.569 |
| | image-side surface 52 | -6.405 | 0.092 | | | |
| fifth lens element 7 | object-side surface 71 | 3.083 | 0.445 | 1.661 | 20.401 | 92.141 |
| | image-side surface 72 | 3.058 | 0.708 | | | |
| fourth lens element 6 | object-side surface 61 | 64.108 | 0.690 | 1.545 | 55.987 | -9.550 |
| | image-side surface 62 | 4.806 | 0.377 | | | |
| filter 9 | object-side surface 91 | infinity | 0.198 | 1.517 | 64.167 | |
| | image-side surface 92 | infinity | 0.464 | | | |
| | image plane 100 | infinity | 0.000 | | | |

FIG. 60

| surface | K | $a_2$ | $a_4$ | $a_6$ | $a_8$ |
|---|---|---|---|---|---|
| object-side surface 31 | 0.0000E+00 | 0.0000E+00 | -1.9834E-03 | 5.0817E-04 | -7.9477E-05 |
| image-side surface 32 | 0.0000E+00 | 0.0000E+00 | 1.4209E-02 | -5.2624E-03 | 7.2841E-04 |
| object-side surface 41 | 0.0000E+00 | 0.0000E+00 | 5.1694E-03 | -5.7469E-03 | 1.0764E-03 |
| image-side surface 42 | 0.0000E+00 | 0.0000E+00 | -5.5742E-03 | -1.2710E-03 | 5.5667E-04 |
| object-side surface 51 | 0.0000E+00 | 0.0000E+00 | 5.8907E-02 | -4.4908E-02 | 5.3953E-03 |
| image-side surface 52 | 0.0000E+00 | 0.0000E+00 | 8.6908E-02 | -5.6995E-02 | 9.2850E-03 |
| object-side surface 71 | 0.0000E+00 | 0.0000E+00 | -1.4738E-02 | -1.2769E-02 | 1.3511E-03 |
| image-side surface72 | 0.0000E+00 | 0.0000E+00 | -3.5097E-02 | -4.5707E-03 | 6.7404E-04 |
| object-side surface 61 | 0.0000E+00 | 0.0000E+00 | -6.0034E-02 | -2.2623E-04 | 2.0858E-03 |
| image-side surface 62 | 0.0000E+00 | 0.0000E+00 | -7.5038E-02 | 9.8195E-03 | -6.6674E-04 |
| surface | $a_{10}$ | $a_{12}$ | $a_{14}$ | $a_{16}$ | |
| object-side surface 31 | 0.0000E+00 | 0.0000E+00 | 0.0000E+00 | 0.0000E+00 | |
| image-side surface 32 | 0.0000E+00 | 0.0000E+00 | 0.0000E+00 | 0.0000E+00 | |
| object-side surface 41 | 0.0000E+00 | 0.0000E+00 | 0.0000E+00 | 0.0000E+00 | |
| image-side surface 42 | 0.0000E+00 | 0.0000E+00 | 0.0000E+00 | 0.0000E+00 | |
| object-side surface 51 | 0.0000E+00 | 0.0000E+00 | 0.0000E+00 | 0.0000E+00 | |
| image-side surface 52 | 0.0000E+00 | 0.0000E+00 | 0.0000E+00 | 0.0000E+00 | |
| object-side surface 71 | 0.0000E+00 | 0.0000E+00 | 0.0000E+00 | 0.0000E+00 | |
| image-side surface 72 | 0.0000E+00 | 0.0000E+00 | 0.0000E+00 | 0.0000E+00 | |
| object-side surface 61 | -1.6668E-04 | 0.0000E+00 | 0.0000E+00 | 0.0000E+00 | |
| image-side surface 62 | 6.1080E-06 | 0.0000E+00 | 0.0000E+00 | 0.0000E+00 | |

FIG. 61

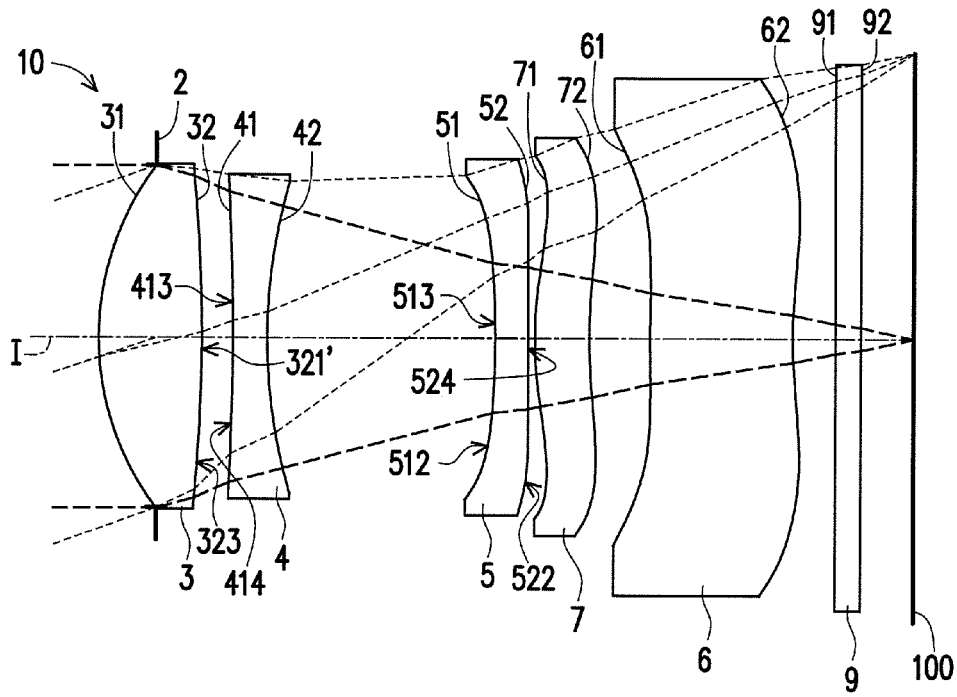
FIG. 62
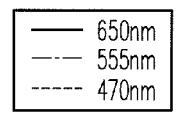
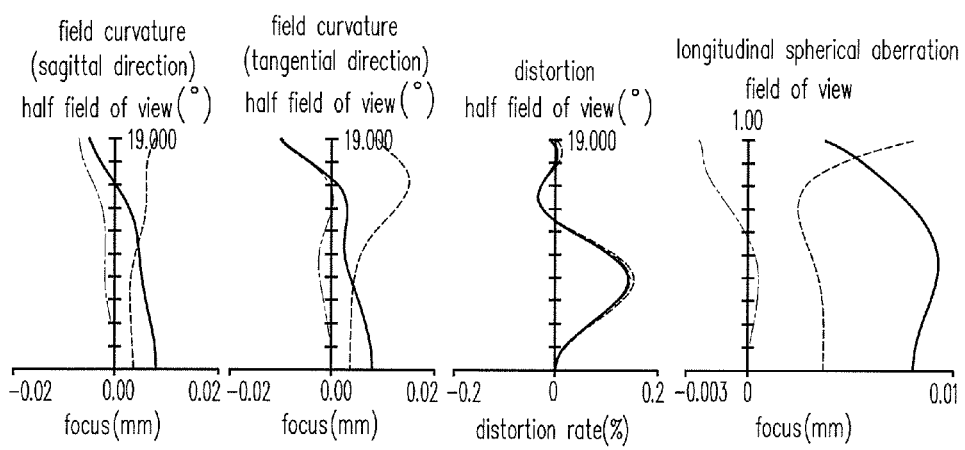
FIG. 63A  FIG. 63B  FIG. 63C  FIG. 63D

| fifteenth embodiment ||||||
|---|---|---|---|---|---|
| EFL= 7.202mm, HFOV= 22.612°, TTL= 7.189mm, $F_{NO}$= 2.398 ||||||
| lens element | surface | radius of curvature (mm) | thickness (mm) | refractive index | dispersion coefficient | focal length (mm) |
| object | | infinity | infinity | | | |
| aperture | | infinity | -0.512 | | | |
| first lens element 3 | object-side surface 31 | 2.387 | 0.901 | 1.545 | 55.987 | 3.696 |
| | image-side surface 32 | -11.335 | 0.274 | | | |
| second lens element4 | object-side surface 41 | -20.941 | 0.330 | 1.661 | 20.401 | -6.679 |
| | image-side surface 42 | 5.687 | 2.003 | | | |
| third lens element 5 | object-side surface 51 | -6.438 | 0.284 | 1.545 | 55.987 | -11.192 |
| | image-side surface 52 | 123.254 | 0.065 | | | |
| fifth lens element 7 | object-side surface 71 | 3.474 | 0.476 | 1.661 | 20.401 | 19.340 |
| | image-side surface 72 | 4.495 | 0.539 | | | |
| fourth lens element 6 | object-side surface 61 | 20.027 | 1.257 | 1.535 | 55.690 | -13.779 |
| | image-side surface62 | 5.282 | 0.377 | | | |
| filter 9 | object-side surface 91 | infinity | 0.210 | 1.517 | 64.167 | |
| | image-side surface 92 | infinity | 0.473 | | | |
| | image plane 100 | infinity | 0.000 | | | |

FIG. 64

| surface | K | $a_2$ | $a_4$ | $a_6$ | $a_8$ |
|---|---|---|---|---|---|
| object-side surface 31 | 0.0000E+00 | 0.0000E+00 | -1.2221E-03 | 2.8665E-04 | -7.2919E-05 |
| image-side surface 32 | 0.0000E+00 | 0.0000E+00 | 1.0792E-02 | -2.0159E-03 | 2.0973E-04 |
| object-side surface 41 | 0.0000E+00 | 0.0000E+00 | 8.6621E-03 | -3.7006E-03 | 7.0280E-04 |
| image-side surface 42 | 0.0000E+00 | 0.0000E+00 | 1.8261E-03 | -2.3334E-04 | -1.8913E-04 |
| object-side surface 51 | 1.4903E+01 | 0.0000E+00 | 1.9813E-02 | -2.1418E-02 | 3.4482E-03 |
| image-side surface 52 | 1.9019E+02 | 0.0000E+00 | 3.6618E-03 | -1.1848E-02 | 3.5032E-04 |
| object-side surface 71 | -5.9194E+00 | 0.0000E+00 | -3.5778E-02 | -1.7093E-04 | -1.3972E-03 |
| image-side surface 72 | 3.5586E+00 | 0.0000E+00 | -6.3150E-02 | 4.9562E-03 | -1.4983E-03 |
| object-side surface 61 | -4.8193E+01 | 0.0000E+00 | -6.4730E-02 | 8.8615E-03 | 7.8134E-04 |
| image-side surface 62 | 2.0052E+00 | 0.0000E+00 | -5.4504E-02 | 7.0459E-03 | -6.4076E-04 |
| surface | $a_{10}$ | $a_{12}$ | $a_{14}$ | $a_{16}$ | |
| object-side surface 31 | 5.3857E-06 | 0.0000E+00 | 0.0000E+00 | 0.0000E+00 | |
| image-side surface 32 | 1.1223E-06 | 0.0000E+00 | 0.0000E+00 | 0.0000E+00 | |
| object-side surface 41 | 6.3072E-06 | 0.0000E+00 | 0.0000E+00 | 0.0000E+00 | |
| image-side surface 42 | 2.8168E-04 | 0.0000E+00 | 0.0000E+00 | 0.0000E+00 | |
| object-side surface 51 | -6.4676E-04 | 0.0000E+00 | 0.0000E+00 | 0.0000E+00 | |
| image-side surface 52 | 3.9138E-04 | 0.0000E+00 | 0.0000E+00 | 0.0000E+00 | |
| object-side surface 71 | -7.3093E-05 | 0.0000E+00 | 0.0000E+00 | 0.0000E+00 | |
| image-side surface 72 | 6.8955E-05 | 0.0000E+00 | 0.0000E+00 | 0.0000E+00 | |
| object-side surface 61 | -3.0769E-04 | 2.5077E-05 | 0.0000E+00 | 0.0000E+00 | |
| image-side surface 62 | 1.8098E-05 | -4.2395E-07 | 0.0000E+00 | 0.0000E+00 | |

FIG. 65

| sixteenth embodiment ||||||
|---|---|---|---|---|---|
| EFL= 7.202mm, HFOV= 22.612°, TTL= 7.189mm, $F_{NO}$ = 2.398 ||||||
| lens element | surface | radius of curvature (mm) | thickness (mm) | refractive index | dispersion coefficient | focal length (mm) |
| object | | infinity | infinity | | | |
| aperture | | infinity | -0.512 | | | |
| first lens element 3 | object-side surface 31 | 2.387 | 0.901 | 1.545 | 55.987 | 3.696 |
| | image-side surface 32 | -11.335 | 0.274 | | | |
| second lens element 4 | object-side surface 41 | -20.941 | 0.330 | 1.661 | 20.401 | -6.679 |
| | image-side surface 42 | 5.687 | 2.003 | | | |
| third lens element 5 | object-side surface 51 | -6.438 | 0.284 | 1.545 | 55.987 | -11.192 |
| | image-side surface 52 | 123.254 | 0.065 | | | |
| fifth lens element 7 | object-side surface 71 | 3.474 | 0.476 | 1.661 | 20.401 | 19.340 |
| | image-side surface 72 | 4.495 | 0.539 | | | |
| fourth lens element 6 | object-side surface 61 | 20.027 | 1.257 | 1.535 | 55.690 | -13.779 |
| | image-side surface 62 | 5.282 | 0.377 | | | |
| filter 9 | object-side surface 91 | infinity | 0.210 | 1.517 | 64.167 | |
| | image-side surface 92 | infinity | 0.473 | | | |
| | image plane 100 | infinity | 0.000 | | | |

FIG. 68

| surface | K | $a_2$ | $a_4$ | $a_6$ | $a_8$ |
|---|---|---|---|---|---|
| object-side surface 31 | 0.0000E+00 | 0.0000E+00 | -1.2221E-03 | 2.8665E-04 | -7.2919E-05 |
| image-side surface 32 | 0.0000E+00 | 0.0000E+00 | 1.0792E-02 | -2.0159E-03 | 2.0973E-04 |
| object-side surface 41 | 0.0000E+00 | 0.0000E+00 | 8.6621E-03 | -3.7006E-03 | 7.0280E-04 |
| image-side surface 42 | 0.0000E+00 | 0.0000E+00 | 1.8261E-03 | -2.3334E-04 | -1.8913E-04 |
| object-side surface 51 | 1.4903E+01 | 0.0000E+00 | 1.9813E-02 | -2.1418E-02 | 3.4482E-03 |
| image-side surface 52 | 1.9019E+02 | 0.0000E+00 | 3.6618E-03 | -1.1848E-02 | 3.5032E-04 |
| object-side surface 71 | -5.9194E+00 | 0.0000E+00 | -3.5778E-02 | -1.7093E-04 | -1.3972E-03 |
| image-side surface 72 | 3.5586E+00 | 0.0000E+00 | -6.3150E-02 | 4.9562E-03 | -1.4983E-03 |
| object-side surface 61 | -4.8193E+01 | 0.0000E+00 | -6.4730E-02 | 8.8615E-03 | 7.8134E-04 |
| image-side surface 62 | 2.0052E+00 | 0.0000E+00 | -5.4504E-02 | 7.0459E-03 | -6.4076E-04 |
| surface | $a_{10}$ | $a_{12}$ | $a_{14}$ | $a_{16}$ | |
| object-side surface 31 | 5.3857E-06 | 0.0000E+00 | 0.0000E+00 | 0.0000E+00 | |
| image-side surface 32 | 1.1223E-06 | 0.0000E+00 | 0.0000E+00 | 0.0000E+00 | |
| object-side surface 41 | 6.3072E-06 | 0.0000E+00 | 0.0000E+00 | 0.0000E+00 | |
| image-side surface 42 | 2.8168E-04 | 0.0000E+00 | 0.0000E+00 | 0.0000E+00 | |
| object-side surface 51 | -6.4676E-04 | 0.0000E+00 | 0.0000E+00 | 0.0000E+00 | |
| image-side surface 52 | 3.9138E-04 | 0.0000E+00 | 0.0000E+00 | 0.0000E+00 | |
| object-side surface71 | -7.3093E-05 | 0.0000E+00 | 0.0000E+00 | 0.0000E+00 | |
| image-side surface 72 | 6.8955E-05 | 0.0000E+00 | 0.0000E+00 | 0.0000E+00 | |
| object-side surface 61 | -3.0769E-04 | 2.5077E-05 | 0.0000E+00 | 0.0000E+00 | |
| image-side surface 62 | 1.8098E-05 | -4.2395E-07 | 0.0000E+00 | 0.0000E+00 | |

FIG. 69

| seventeenth embodiment ||||||
|---|---|---|---|---|---|
| EFL= 7.244mm, HFOV= 21.812°, TTL= 7.190mm, $F_{NO}$= 2.943 ||||||
| lens element | surface | radius of curvature (mm) | thickness (mm) | refractive index | dispersion coefficient | focal length (mm) |
| object | | infinity | infinity | | | |
| first lens element 3 | object-side surface 31 | 2.204 | 1.093 | 1.545 | 55.987 | 3.542 |
| | image-side surface 32 | -13.099 | 0.071 | | | |
| aperture 2 | | 0.000 | 0.171 | | | |
| second lens element 4 | object-side surface 41 | 25.972 | 0.259 | 1.642 | 22.409 | -5.273 |
| | image-side surface 42 | 3.005 | 2.031 | | | |
| third lens element 5 | object-side surface 51 | 4.622 | 0.283 | 1.545 | 55.987 | -22.334 |
| | image-side surface 52 | 3.280 | 0.237 | | | |
| fifth lens element 7 | object-side surface 71 | 11.364 | 0.704 | 1.642 | 22.409 | 11.850 |
| | image-side surface 72 | -23.031 | 0.185 | | | |
| fourth lens element 6 | object-side surface 61 | -10.722 | 1.054 | 1.545 | 55.987 | -7.518 |
| | image-side surface 62 | 6.888 | 0.400 | | | |
| filter 9 | object-side surface 91 | infinity | 0.210 | 1.517 | 64.167 | |
| | image-side surface 92 | infinity | 0.492 | | | |
| | image plane 100 | infinity | 0.000 | | | |

FIG. 72

| surface | K | $a_2$ | $a_4$ | $a_6$ | $a_8$ |
|---|---|---|---|---|---|
| object-side surface 31 | 0.0000E+00 | 0.0000E+00 | -2.3856E-03 | -4.3401E-04 | -5.3726E-04 |
| image-side surface 32 | 0.0000E+00 | 0.0000E+00 | 5.8646E-03 | -1.0997E-03 | 3.6497E-04 |
| object-side surface 41 | 0.0000E+00 | 0.0000E+00 | 2.2108E-04 | 8.9062E-03 | -4.3447E-05 |
| image-side surface 42 | 0.0000E+00 | 0.0000E+00 | 5.6747E-03 | 1.1495E-02 | 3.2440E-03 |
| object-side surface 51 | 0.0000E+00 | 0.0000E+00 | -5.2551E-02 | 1.0189E-02 | -3.8863E-03 |
| image-side surface 52 | 0.0000E+00 | 0.0000E+00 | -6.2315E-02 | 1.1413E-02 | -3.0111E-03 |
| object-side surface 71 | 0.0000E+00 | 0.0000E+00 | -1.7003E-02 | -6.7912E-03 | 5.5830E-04 |
| image-side surface 72 | 0.0000E+00 | 0.0000E+00 | -1.6994E-02 | -4.5538E-03 | 3.4669E-04 |
| object-side surface 61 | 0.0000E+00 | 0.0000E+00 | -5.2791E-02 | 9.4072E-03 | 3.8890E-05 |
| image-side surface 62 | 0.0000E+00 | 0.0000E+00 | -4.7508E-02 | 8.4706E-03 | -8.5466E-04 |
| surface | $a_{10}$ | $a_{12}$ | $a_{14}$ | $a_{16}$ | |
| object-side surface 31 | 0.0000E+00 | 0.0000E+00 | 0.0000E+00 | 0.0000E+00 | |
| image-side surface 32 | 0.0000E+00 | 0.0000E+00 | 0.0000E+00 | 0.0000E+00 | |
| object-side surface 41 | 0.0000E+00 | 0.0000E+00 | 0.0000E+00 | 0.0000E+00 | |
| image-side surface 42 | 0.0000E+00 | 0.0000E+00 | 0.0000E+00 | 0.0000E+00 | |
| object-side surface 51 | 0.0000E+00 | 0.0000E+00 | 0.0000E+00 | 0.0000E+00 | |
| image-side surface 52 | 0.0000E+00 | 0.0000E+00 | 0.0000E+00 | 0.0000E+00 | |
| object-side surface 71 | 0.0000E+00 | 0.0000E+00 | 0.0000E+00 | 0.0000E+00 | |
| image-side surface 72 | 0.0000E+00 | 0.0000E+00 | 0.0000E+00 | 0.0000E+00 | |
| object-side surface 61 | -2.5372E-04 | 0.0000E+00 | 0.0000E+00 | 0.0000E+00 | |
| image-side surface 62 | 2.4076E-05 | 0.0000E+00 | 0.0000E+00 | 0.0000E+00 | |

FIG. 73

| necessary component | range lower limit | range upper limit | first embodiment | second embodiment | third embodiment | fourth embodiment | fifth embodiment | sixth embodiment | seventh embodiment | eighth embodiment | ninth embodiment |
|---|---|---|---|---|---|---|---|---|---|---|---|
| ALT | | | 2.172 | 2.222 | 2.894 | 2.736 | 2.932 | 2.833 | 3.639 | 2.406 | 2.946 |
| Gaa | | | 2.960 | 3.621 | 3.233 | 2.786 | 2.487 | 3.099 | 2.493 | 3.769 | 2.672 |
| BFL | | | 1.247 | 1.347 | 1.071 | 1.140 | 1.011 | 1.221 | 1.060 | 1.016 | 1.105 |
| TTL | | | 6.380 | 7.191 | 7.198 | 6.662 | 6.430 | 7.153 | 7.191 | 7.191 | 6.723 |
| TL | | | 5.133 | 5.843 | 6.127 | 5.522 | 5.419 | 5.932 | 6.131 | 6.175 | 5.618 |
| HFOV | 18.296 | 19.905 | 18.422 | 18.738 | 19.905 | 18.389 | 18.296 | 18.421 | 19.252 | 18.422 | 18.738 |
| TTL | 6.380 | 7.198 | 7.198 | 6.662 | 6.430 | 7.153 | 7.191 | 7.191 | 6.723 | 7.198 | 6.662 |
| T1+T2+T3/G12+G23 | 0.537 | 0.911 | 0.644 | 0.877 | 0.911 | 0.596 | 0.583 | 0.575 | 0.683 | 0.644 | 0.877 |
| T2/G34 | 0.154 | 3.065 | 0.764 | 1.372 | 1.510 | 0.315 | 3.065 | 0.582 | 0.645 | 0.764 | 1.372 |
| $F_{NO}$/T1 | 2.198 | 2.950 | 2.950 | 2.198 | 2.380 | 2.745 | 2.693 | 2.847 | 2.482 | 2.950 | 2.198 |
| EFL/G12+G23 | 2.252 | 3.503 | 2.572 | 2.700 | 2.845 | 3.073 | 2.992 | 2.252 | 2.982 | 2.572 | 2.700 |
| T1/T2 | 2.504 | 4.729 | 2.504 | 4.729 | 4.208 | 3.657 | 3.717 | 2.528 | 4.394 | 2.504 | 4.729 |
| T2+T3/T1 | 0.493 | 1.182 | 1.176 | 1.112 | 1.108 | 0.592 | 0.584 | 1.182 | 0.493 | 1.176 | 1.112 |
| EFL/$F_{NO}$ | 2.628 | 3.016 | 2.947 | 2.957 | 2.767 | 2.988 | 3.015 | 3.002 | 2.628 | 2.947 | 2.957 |
| G12+G23/T1+T2 | 1.782 | 2.720 | 2.415 | 1.987 | 1.870 | 2.096 | 2.139 | 2.720 | 1.782 | 2.415 | 1.987 |
| TTL/T2+T3 | 5.508 | 13.849 | 7.386 | 5.508 | 5.769 | 13.800 | 13.849 | 7.224 | 12.954 | 7.386 | 5.508 |
| $F_{NO}$/G12+G23 | 0.750 | 1.162 | 0.873 | 0.913 | 1.028 | 1.028 | 0.992 | 0.750 | 1.135 | 0.873 | 0.913 |
| TTL/T1+G12+T2 | 4.501 | 6.150 | 5.285 | 4.739 | 4.511 | 4.928 | 6.098 | 5.457 | 4.534 | 5.285 | 4.739 |
| G23/T2+T3 | 1.928 | 4.742 | 2.665 | 2.092 | 1.928 | 3.861 | 4.553 | 3.069 | 4.066 | 2.665 | 2.092 |
| EFL/G23 | 2.357 | 3.590 | 2.773 | 2.794 | 3.084 | 3.590 | 3.055 | 2.357 | 3.252 | 2.773 | 2.794 |
| $F_{NO}$/G23 | 0.785 | 1.238 | 0.941 | 0.945 | 1.114 | 1.201 | 1.013 | 0.785 | 1.238 | 0.941 | 0.945 |
| EFL/T1+T2 | 5.313 | 6.472 | 6.212 | 5.365 | 5.321 | 6.442 | 6.400 | 6.125 | 5.313 | 6.212 | 5.365 |
| EFL/T2+T3 | 5.845 | 13.951 | 7.390 | 5.845 | 5.945 | 13.860 | 13.912 | 7.232 | 13.224 | 7.390 | 5.845 |
| G12+G23/T2 | 8.462 | 11.635 | 8.462 | 11.381 | 9.739 | 9.762 | 10.091 | 9.596 | 9.611 | 8.462 | 11.381 |
| EFL/TTL | 1.001 | 1.108 | 1.001 | 1.061 | 1.030 | 1.004 | 1.005 | 1.001 | 1.021 | 1.001 | 1.061 |
| TL/G23 | 2.022 | 2.964 | 2.359 | 2.182 | 2.522 | 2.964 | 2.593 | 2.022 | 2.662 | 2.359 | 2.182 |

FIG. 74

| necessary component | range lower limit | range upper limit | first embodiment | second embodiment | third embodiment | fourth embodiment | fifth embodiment | sixth embodiment | seventh embodiment | eighth embodiment |
|---|---|---|---|---|---|---|---|---|---|---|
| ALT | | | 2.916 | 3.142 | 3.114 | 2.761 | 2.475 | 3.249 | 3.249 | 3.393 |
| Gaa | | | 3.231 | 2.972 | 3.021 | 3.379 | 3.677 | 2.881 | 2.881 | 2.695 |
| BFL | | | 1.045 | 1.076 | 1.056 | 1.049 | 1.039 | 1.060 | 1.060 | 1.102 |
| TTL | | | 7.192 | 7.190 | 7.191 | 7.190 | 7.191 | 7.190 | 7.190 | 7.190 |
| TL | | | 6.147 | 6.114 | 6.135 | 6.141 | 6.152 | 6.130 | 6.130 | 6.088 |
| HFOV | 21.813 | 22.634 | 22.611 | 22.610 | 22.634 | 22.633 | 22.489 | 22.613 | 22.613 | 21.813 |
| TTL | 7.190 | 7.192 | 7.192 | 7.190 | 7.191 | 7.190 | 7.191 | 7.190 | 7.190 | 7.190 |
| T1+T2+T3 /G12+G23 | 0.466 | 1.000 | 0.852 | 1.000 | 0.833 | 0.587 | 0.466 | 0.666 | 0.666 | 0.719 |
| T2/G35 | 0.378 | 5.100 | 0.378 | 1.044 | 1.427 | 1.114 | 2.606 | 5.100 | 5.100 | 1.091 |
| $F_{NO}$/T1 | 1.585 | 2.922 | 1.585 | 2.165 | 2.333 | 2.904 | 2.922 | 2.661 | 2.661 | 2.693 |
| EFL/G12+G23 | 2.513 | 3.508 | 3.235 | 3.504 | 3.508 | 2.951 | 2.513 | 3.163 | 3.163 | 3.187 |
| T1/T2 | 2.510 | 4.896 | 4.896 | 2.522 | 2.510 | 2.510 | 3.443 | 2.733 | 2.733 | 4.222 |
| T2+T3/T1 | 0.486 | 0.858 | 0.486 | 0.858 | 0.670 | 0.737 | 0.630 | 0.681 | 0.681 | 0.496 |
| EFL/$F_{NO}$ | 2.461 | 3.561 | 3.561 | 3.008 | 3.015 | 3.004 | 3.011 | 3.003 | 3.003 | 2.461 |
| G12+G23 /T1+T2 | 1.331 | 2.713 | 1.449 | 1.331 | 1.434 | 2.114 | 2.713 | 1.850 | 1.850 | 1.681 |
| TTL/T2+T3 | 7.564 | 13.882 | 11.550 | 7.564 | 10.438 | 11.818 | 13.882 | 11.707 | 11.707 | 13.272 |
| $F_{NO}$/G12+G23 | 0.835 | 1.295 | 0.909 | 1.165 | 1.163 | 0.982 | 0.835 | 1.053 | 1.053 | 1.295 |
| TTL/T1+ G12+T2 | 4.502 | 6.491 | 4.510 | 4.502 | 4.845 | 5.983 | 6.491 | 4.778 | 4.778 | 4.510 |
| G23/T2+T3 | 2.114 | 5.464 | 3.510 | 2.114 | 2.923 | 3.935 | 5.464 | 3.262 | 3.262 | 3.749 |
| EFL/G23 | 2.555 | 3.595 | 3.311 | 3.591 | 3.590 | 3.009 | 2.555 | 3.595 | 3.595 | 3.567 |
| $F_{NO}$/G23 | 0.849 | 1.449 | 0.930 | 1.194 | 1.191 | 1.002 | 0.849 | 1.197 | 1.197 | 1.449 |
| EFL/T1+T2 | 4.663 | 6.818 | 4.687 | 4.663 | 5.030 | 6.238 | 6.818 | 5.850 | 5.850 | 5.358 |
| EFL/T2+T3 | 7.592 | 13.960 | 11.620 | 7.592 | 10.492 | 11.839 | 13.960 | 11.727 | 11.727 | 13.373 |
| G12+G23/T2 | 4.687 | 12.055 | 8.542 | 4.687 | 5.033 | 7.420 | 12.055 | 6.906 | 6.906 | 8.780 |
| EFL/TTL | 1.002 | 1.008 | 1.006 | 1.004 | 1.005 | 1.002 | 1.006 | 1.002 | 1.002 | 1.008 |
| TL/G23 | 2.174 | 3.060 | 2.812 | 3.042 | 3.047 | 2.565 | 2.174 | 3.060 | 3.060 | 2.998 |

FIG. 75

OPTICAL IMAGING LENS

CROSS-REFERENCE TO RELATED APPLICATION

This application claims the priority benefit of China application serial no. 201610157261.3, filed on Mar. 18, 2016. The entirety of the above-mentioned patent application is hereby incorporated by reference herein and made a part of this specification.

BACKGROUND OF THE INVENTION

Field of the Invention

The invention relates to an optical lens and particularly relates to an optical imaging lens.

Description of Related Art

Consumer electronics are evolving so fast that the demand for lighter, thinner, and smaller products never stops growing. Therefore, the performance of key components, such as optical lenses, of electronic products needs to be improved constantly so as to meet the consumers' demand. Needless to say, the most important characteristics of an optical lens are the image quality and size. Simply scaling down a lens having good image quality is not enough for designing a miniaturized optical lens that has favorable image quality. The design involves not only material properties but also production-related issues such as assembly yield. In view of the above, the difficulty of manufacturing miniaturized lenses is significantly higher than that of manufacturing traditional lenses. Thus, how to manufacture an optical lens that meets the requirements of consumer electronics and has improved image quality remains a goal pursued by the industries, government, and researchers in this field.

SUMMARY OF THE INVENTION

The invention provides an optical imaging lens that has a favorable optical performance under the circumstances that a length of a lens system is reduced.

According to an embodiment of the invention, an optical imaging lens is provided, which includes a first lens element, a second lens element, a third lens element, and a fourth lens element that are arranged sequentially from an object side to an image side along an optical axis. Each of the first to the fourth lens elements has an object-side surface, which faces the object side and allows an imaging ray to pass through, and an image-side surface, which faces the image side and allows the imaging ray to pass through. The first lens element has positive refracting power. The object-side surface of the first lens element has a convex portion in a vicinity of the optical axis and a convex portion in a vicinity of a periphery. The second lens element has negative refracting power. The object-side surface of the third lens element has a concave portion in a vicinity of a periphery. The image-side surface of the fourth lens element has a convex portion in a vicinity of a periphery. The optical imaging lens satisfies: HFOV≤25°; TTL≤7.2 mm; and $(T1+T2+T3)/(G12+G23) \leq 2.0$, wherein HFOV is a half field of view of the optical imaging lens, TTL is a distance from the object-side surface of the first lens element to an image plane along the optical axis, T1 is a thickness of the first lens element along the optical axis, T2 is a thickness of the second lens element along the optical axis, T3 is a thickness of the third lens element along the optical axis, G12 is a distance from the image-side surface of the first lens element to the object-side surface of the second lens element along the optical axis, and G23 is a distance from the image-side surface of the second lens element to the object-side surface of the third lens element along the optical axis.

Based on the above, the optical imaging lens of the embodiments of the invention has the following effects: through design and arrangement of the convex/concave shapes on the object-side surfaces or image-side surfaces of the lens elements, the optical imaging lens still has an optical performance with suppressed aberration and renders favorable image quality under the circumstances that the system length is reduced.

To make the aforementioned and other features and advantages of the invention more comprehensible, several embodiments accompanied with figures are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

FIG. 3 is a schematic view showing a surface shape structure of a lens element according to the first example.

FIG. 4 is a schematic view showing a surface shape structure of a lens element according to the second example.

FIG. 5 is a schematic view showing a surface shape structure of a lens element according to the third example.

FIG. 8 provides detailed optical data of the optical imaging lens of the first embodiment of the invention.

FIG. 9 provides aspherical parameters of the optical imaging lens of the first embodiment of the invention.

FIG. 12 provides detailed optical data of the optical imaging lens of the second embodiment of the invention.

FIG. 13 provides aspherical parameters of the optical imaging lens of the second embodiment of the invention.

FIG. 16 provides detailed optical data of the optical imaging lens of the third embodiment of the invention.

FIG. 17 provides aspherical parameters of the optical imaging lens of the third embodiment of the invention.

FIG. 20 provides detailed optical data of the optical imaging lens of the fourth embodiment of the invention.

FIG. 21 provides aspherical parameters of the optical imaging lens of the fourth embodiment of the invention.

FIG. 24 provides detailed optical data of the optical imaging lens of the fifth embodiment of the invention.

FIG. 25 provides aspherical parameters of the optical imaging lens of the fifth embodiment of the invention.

FIG. 26 is a schematic view of an optical imaging lens according to the sixth embodiment of the invention.

FIG. 27A to FIG. 27D are schematic diagrams showing a longitudinal spherical aberration and other aberrations of the optical imaging lens of the sixth embodiment.

FIG. 28 provides detailed optical data of the optical imaging lens of the sixth embodiment of the invention.

FIG. 29 provides aspherical parameters of the optical imaging lens of the sixth embodiment of the invention.

FIG. 32 provides detailed optical data of the optical imaging lens of the seventh embodiment of the invention.

FIG. 33 provides aspherical parameters of the optical imaging lens of the seventh embodiment of the invention.

FIG. 36 provides detailed optical data of the optical imaging lens of the eighth embodiment of the invention.

FIG. 37 provides aspherical parameters of the optical imaging lens of the eighth embodiment of the invention.

FIG. 40 provides detailed optical data of the optical imaging lens of the ninth embodiment of the invention.

FIG. 41 provides aspherical parameters of the optical imaging lens of the ninth embodiment of the invention.

FIG. 44 provides detailed optical data of the optical imaging lens of the tenth embodiment of the invention.

FIG. 45 provides aspherical parameters of the optical imaging lens of the tenth embodiment of the invention.

FIG. 46 is a schematic view of an optical imaging lens according to the eleventh embodiment of the invention.

FIG. 47A to FIG. 47D are schematic diagrams showing a longitudinal spherical aberration and other aberrations of the optical imaging lens of the eleventh embodiment.

FIG. 48 provides detailed optical data of the optical imaging lens of the eleventh embodiment of the invention.

FIG. 49 provides aspherical parameters of the optical imaging lens of the eleventh embodiment of the invention.

FIG. 50 is a schematic view of an optical imaging lens according to the twelfth embodiment of the invention.

FIG. 51A to FIG. 51D are schematic diagrams showing a longitudinal spherical aberration and other aberrations of the optical imaging lens of the twelfth embodiment.

FIG. 52 provides detailed optical data of the optical imaging lens of the twelfth embodiment of the invention.

FIG. 53 provides aspherical parameters of the optical imaging lens of the twelfth embodiment of the invention.

FIG. 56 provides detailed optical data of the optical imaging lens of the thirteenth embodiment of the invention.

FIG. 57 provides aspherical parameters of the optical imaging lens of the thirteenth embodiment of the invention.

FIG. 60 provides detailed optical data of the optical imaging lens of the fourteenth embodiment of the invention.

FIG. 61 provides aspherical parameters of the optical imaging lens of the fourteenth embodiment of the invention.

FIG. 62 is a schematic view of an optical imaging lens according to the fifteenth embodiment of the invention.

FIG. 63A to FIG. 63D are schematic diagrams showing a longitudinal spherical aberration and other aberrations of the optical imaging lens of the fifteenth embodiment.

FIG. 64 provides detailed optical data of the optical imaging lens of the fifteenth embodiment of the invention.

FIG. 65 provides aspherical parameters of the optical imaging lens of the fifteenth embodiment of the invention.

FIG. 68 provides detailed optical data of the optical imaging lens of the sixteenth embodiment of the invention.

FIG. 69 provides aspherical parameters of the optical imaging lens of the sixteenth embodiment of the invention.

FIG. 72 provides detailed optical data of the optical imaging lens of the seventeenth embodiment of the invention.

FIG. 73 provides aspherical parameters of the optical imaging lens of the seventeenth embodiment of the invention.

FIG. 74 shows important parameters and the relationship thereof related to the optical imaging lenses of the first to the ninth embodiments of the invention.

FIG. 75 shows important parameters and the relationship thereof related to the optical imaging lenses of the tenth to the seventeenth embodiments of the invention.

DESCRIPTION OF THE EMBODIMENTS

In the present specification, the description "a lens element having positive refracting power (or negative refracting power)" means that the paraxial refracting power of the lens element in Gaussian optics is positive (or negative). The description "an object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted. The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figure 1:
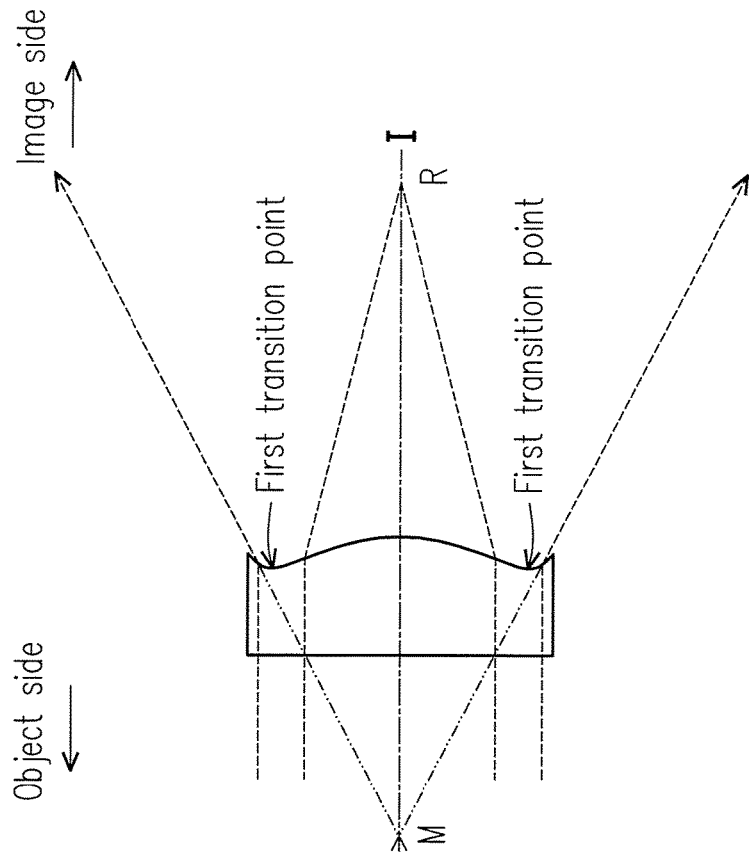
FIG. 1 is a schematic view showing a surface shape structure of a lens element.

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Figure 2:
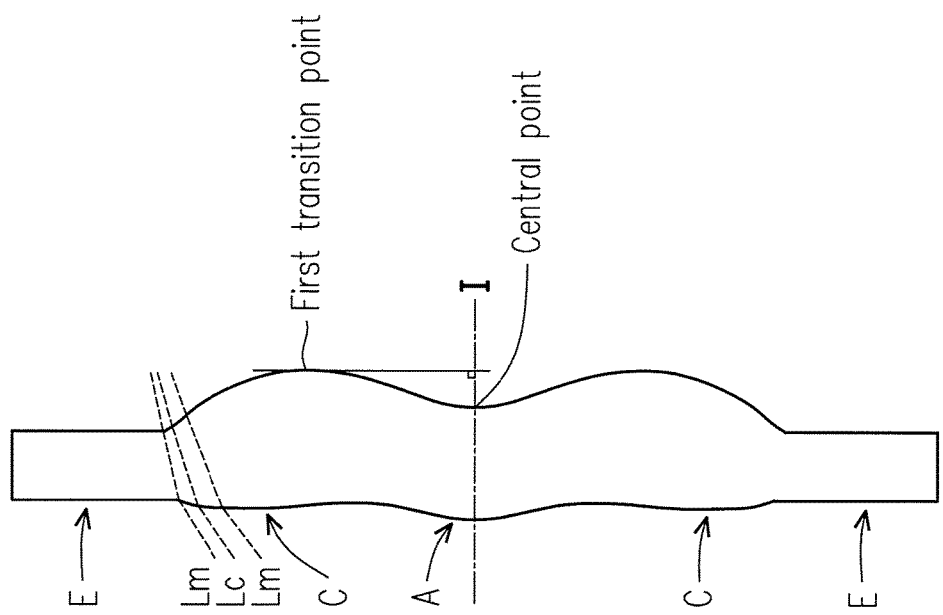
FIG. 2 is a schematic view showing a surface convex/concave structure and a focal point of a lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0-50% of the effective radius (radius of the clear aperture) of the surface, whereas the portion in a vicinity of a periphery of the lens element is defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0-50% of the effective radius (radius of the clear aperture) is determined as the portion in a vicinity of the optical axis, and the portion between 50-100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figure 6:
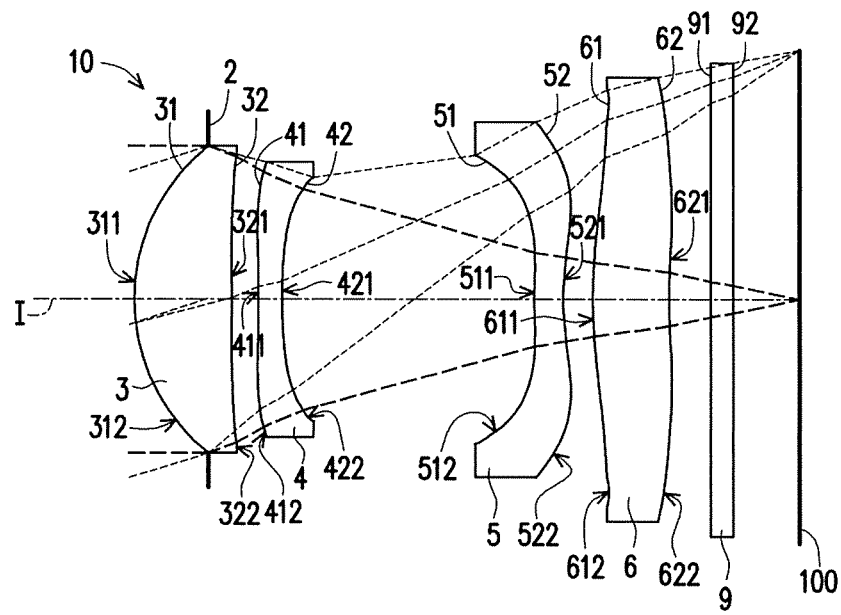
FIG. 6 is a schematic view of an optical imaging lens according to the first embodiment of the invention.

FIG. 6 is a schematic view of an optical imaging lens according to the first embodiment of the invention. FIG. 7A to FIG. 7D are schematic diagrams showing a longitudinal spherical aberration and other aberrations of the optical imaging lens of the first embodiment when a pupil radius is 1.4729 mm. First, referring to FIG. 6, an optical imaging lens 10 of the first embodiment of the invention includes a first lens element 3, a second lens element 4, a third lens element 5, a fourth lens element 6, and a filter 9 that are arranged sequentially along an optical axis I of the optical imaging lens 10 from an object side to an image side. The optical imaging lens 10 further includes an aperture 2. In this embodiment, the aperture 2 may be selectively located on an object-side surface 31 of the first lens element 3, but the invention is not limited thereto. When a ray emitted from an object to be captured enters the optical imaging lens 10 and passes through the aperture 2, the first lens element 3, the second lens element 4, the third lens element 5, the fourth lens element 6, and the filter 9, the ray forms an image on an image plane 100. The filter 9 is an IR cut filter, for example, for preventing an infrared ray of a certain wave band in the ray from reaching the image plane 100 to affect the image quality. It should be noted that the object side is a side that faces the object to be captured while the image side is a side that faces the image plane 100.

The first lens element 3, the second lens element 4, the third lens element 5, the fourth lens element 6, and the filter 9 respectively have object-side surfaces 31, 41, 51, 61, and 91 that face the object side and allow an imaging ray to pass through and image-side surfaces 32, 42, 52, 62, and 92 that face the image side and allow the imaging ray to pass through.

Moreover, in order to meet the demand for lighter products, the first lens element 3 through the fourth lens element 6 all have refracting power and are made of a plastic material. Nevertheless, the material of the first lens element 3 through the fourth lens element 6 is not limited thereto.

The first lens element 3 has positive refracting power. The object-side surface 31 of the first lens element 3 is a convex surface and has a convex portion 311 in a vicinity of the optical axis I and a convex portion 312 in a vicinity of a periphery. The image-side surface 32 of the first lens element 3 has a concave portion 321 in a vicinity of the optical axis I and a concave portion 322 in a vicinity of the periphery. In this embodiment, the object-side surface 31 and the image-side surface 32 of the first lens element 3 are both aspherical.

The second lens element 4 has negative refracting power. The object-side surface 41 of the second lens element 4 has a convex portion 411 in a vicinity of the optical axis I and a convex portion 412 in a vicinity of a periphery. The image-side surface 42 of the second lens element 4 has a concave portion 421 in a vicinity of the optical axis I and a concave portion 422 in a vicinity of the periphery. In this embodiment, the object-side surface 41 and the image-side surface 42 of the second lens element 4 are both aspherical.

The third lens element 5 has negative refracting power. The object-side surface 51 of the third lens element 5 has a convex portion 511 in a vicinity of the optical axis I and a concave portion 512 in a vicinity of a periphery. The image-side surface 52 of the third lens element 5 has a concave portion 521 in a vicinity of the optical axis I and a convex portion 522 in a vicinity of the periphery. In this embodiment, the object-side surface 51 and the image-side surface 52 of the third lens element 5 are both aspherical.

The fourth lens element 6 has positive refracting power. The object-side surface 61 of the fourth lens element 6 has a convex portion 611 in a vicinity of the optical axis I and a concave portion 612 in a vicinity of a periphery. The image-side surface 62 of the fourth lens element 6 has a concave portion 621 in a vicinity of the optical axis I and a convex portion 622 in a vicinity of the periphery. In this embodiment, the object-side surface 61 and the image-side surface 62 of the fourth lens element 6 are both aspherical.

Other detailed optical data of the first embodiment is shown in FIG. 8, and the optical imaging lens 10 of the first embodiment has an effective focal length EFL of 7.069 mm, a half field of view HFOV of 18.59°, and a f-number $F_{NO}$ of 2.384. A system length TTL of the optical imaging lens 10 is 6.380 mm and an image height is 2.4 mm. The system length TTL of the optical imaging lens 10 refers to a distance along the optical axis I from the object-side surface 31 of the first lens element 3 to the image plane 100.

In addition, in this embodiment, the object-side surfaces 31, 41, 51, and 61 and the image-side surfaces 32, 42, 52, and 62 of the first lens element 3, the second lens element 4, the third lens element 5, and the fourth lens element 6 (eight surfaces in total) are all aspherical. These aspherical surfaces are defined by the following equation:

$$Z(Y) = \frac{Y^2}{R} / \left( 1 + \sqrt{1 - (1+K)\frac{Y^2}{R^2}} \right) + \sum_{i=1}^{n} a_i \times Y^i \quad (1)$$

wherein:
Y: a distance between a point on an aspherical curve and the optical axis I;
Z: a depth of the aspheric surface (a perpendicular distance between the point on the aspheric surface that is spaced by the distance Y from the optical axis I and a tangent plane tangent to a vertex of the aspheric surface on the optical axis I);
R: a radius of curvature of the surface of the lens element close to the optical axis I;
K: a conic constant; and
$a_i$: $i^{th}$ aspheric coefficient.

The aspherical coefficients of the object-side surface 31 of the first lens element 3 through the image-side surface 62 of the fourth lens element 6 in the equation (1) are shown in FIG. 9. Specifically, the field number 31 of FIG. 9 indicates the aspherical coefficients of the object-side surface 31 of the first lens element 3, and so on.

Furthermore, a relationship between important parameters of the optical imaging lens 10 of the first embodiment is shown in FIG. 74, wherein:

T1 is a thickness of the first lens element 3 along the optical axis I;

T2 is a thickness of the second lens element 4 along the optical axis I;

T3 is a thickness of the third lens element 5 along the optical axis I;

T4 is a thickness of the fourth lens element 6 along the optical axis I;

TF is a thickness of the filter 9 along the optical axis I;

G12 is a distance from the image-side surface 32 of the first lens element 3 to the object-side surface 41 of the second lens element 4 along the optical axis I;

G23 is a distance from the image-side surface 42 of the second lens element 4 to the object-side surface 51 of the third lens element 5 along the optical axis I;

G34 is a distance from the image-side surface 52 of the third lens element 5 to the object-side surface 61 of the fourth lens element 6 along the optical axis I;

G4F is a distance from the image-side surface 62 of the fourth lens element 6 to the object-side surface 91 of the filter 9 along the optical axis I;

GFP is a distance from the image-side surface 92 of the filter 9 to the image plane 100 along the optical axis I;

Gaa is a total of air gaps respectively between the first lens element 3 through the fourth lens element 6 along the optical axis I, i.e., the total of G12, G23, and G34;

ALT is a total of the thicknesses of the first lens element 3, the second lens element 4, the third lens element 5, and the fourth lens element 6 along the optical axis I, i.e., the total of T1, T2, T3, and T4;

TTL is the distance from the object-side surface 31 of the first lens element 3 to the image plane 100 along the optical axis I;

TL is a distance from the object-side surface 31 of the third lens element 3 to the image-side surface 62 of the fourth lens element 6 along the optical axis I;

BFL is a distance from the image-side surface 62 of the fourth lens element 6 to the image plane 100 along the optical axis I;

EFL is the effective focal length of the optical imaging lens 10;

HFOV is the half field of view of the optical imaging lens 10;

TA is a distance from the aperture 2 to the object-side surface of the next adjacent lens element (e.g. the object-side surface 31 of the first lens element 3 in this embodiment) along the optical axis I; and $F_{NO}$ is the f-number of the optical imaging lens 10.

It is further defined that:

GFP is an air gap between the filter 9 and the image plane 100 along the optical axis I;

f1 is a focal length of the first lens element 3;

f2 is a focal length of the second lens element 4;

f3 is a focal length of the third lens element 5;

f4 is a focal length of the fourth lens element 6;

n1 is a refractive index of the first lens element 3;

n2 is a refractive index of the second lens element 4;

n3 is a refractive index of the third lens element 5;

n4 is a refractive index of the fourth lens element 6;

v1 is an Abbe number, which may also be called a dispersion coefficient, of the first lens element 3;

v2 is an Abbe number of the second lens element 4;

v3 is an Abbe number of the third lens element 5; and v4 is an Abbe number of the fourth lens element 6.

Figures 7A, 7B, 7C, 7D:
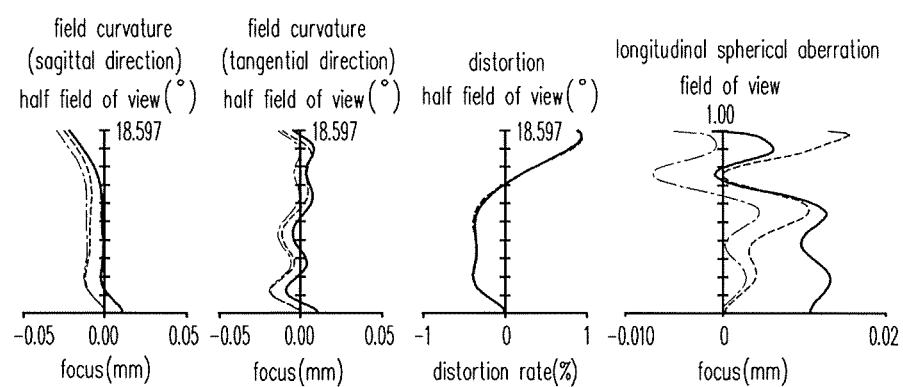
FIG. 7A to FIG. 7D are schematic diagrams showing a longitudinal spherical aberration and other aberrations of the optical imaging lens of the first embodiment.

Further, referring to FIG. 7A to FIG. 7D, the diagrams of FIG. 7A and FIG. 7B respectively show a field curvature in a sagittal direction and a field curvature in a tangential direction on the image plane 100 of the first embodiment, the diagram of FIG. 7C shows a distortion aberration on the image plane 100 of the first embodiment, and the diagram of FIG. 7D shows a longitudinal spherical aberration of the first embodiment.

Referring to FIG. 7A, in the diagram of a field curvature aberration in a sagittal direction of FIG. 7A, variations of the focal lengths of three representative wavelengths (i.e., red, green, and blue) in the whole field of view fall in a range of −0.03 mm to 0.015 mm; and referring to FIG. 7B, in the diagram of a field curvature in a tangential aberration of FIG. 7B, variations of the focal lengths of the three representative wavelengths (i.e., red, green, and blue) in the whole field of view fall in a range of −0.02 mm to 0.015 mm, which shows that the optical system of the first embodiment of the invention effectively eliminates aberration. Referring to FIG. 7C, the diagram of distortion aberration of FIG. 7C shows that the distortion aberration of the first embodiment is maintained in a range of −0.4% to 1%, which shows that the distortion aberration of the first embodiment meets the requirement of image quality of the optical system. Referring to FIG. 7D, in the diagram of the longitudinal spherical aberration of the first embodiment of FIG. 7D, curves formed by each wavelength are close to each other and are gathered in the middle, which represents that off-axis lights of different heights of each wavelength are gathered around imaging points, and according to a deviation range of the curve of each wavelength, it is learned that deviations of the imaging points of the off-axis lights of different heights are controlled within a range of −0.01 mm to 0.016 mm, so that the spherical aberration of the same wavelength is obviously ameliorated. Moreover, the distances between the three representative wavelengths are rather close, which represents that imaging positions of the lights with different wavelengths are rather close, so that a chromatic aberration is obviously ameliorated. Accordingly, under the circumstances that the system length is reduced to about 6.380 mm, the optical imaging lens of the first embodiment still provides better image quality than the conventional optical lens. Therefore, in the first embodiment, the lens length may be reduced and the capturing angle may be increased while favorable optical performance is maintained, so as to achieve the design of thinner products with an increased viewing angle.

Figure 10:
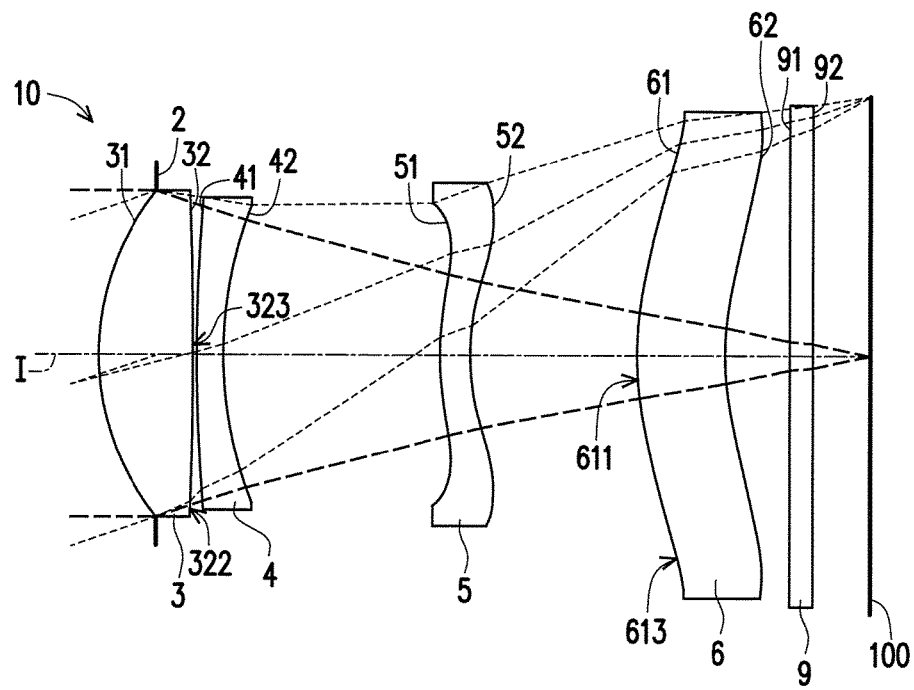
FIG. 10 is a schematic view of an optical imaging lens according to the second embodiment of the invention.

FIG. 10 is a schematic view of an optical imaging lens according to the second embodiment of the invention. FIG. 11A to FIG. 11D are schematic diagrams showing a longitudinal spherical aberration and other aberrations of the optical imaging lens of the second embodiment when the pupil radius is 1.5092 mm. First, referring to FIG. 10, the optical imaging lens 10 of the second embodiment of the invention is similar to the optical imaging lens 10 of the first embodiment. They only slightly differ in some optical data, aspherical coefficients, and parameters related to the first to the fourth lens elements 3-6. Moreover, the image-side surface 32 of the first lens element 3 has a convex portion 323 in the vicinity of the optical axis I, the fourth lens element 6 has negative refracting power, and the object-side surface 61 of the fourth lens element 6 has a convex portion 613 in the vicinity of the periphery. It should be noted that, for clarity, the reference numerals of some concave portions and convex portions the same as those of the first embodiment are omitted from FIG. 10.

Detailed optical data of the optical imaging lens 10 of the second embodiment is shown in FIG. 12, and in the second embodiment, the effective focal length EFL is 7.244 mm, the half field of view HFOV is 18.307°, and the f-number $F_{NO}$ is 2.402. The system length TTL of the optical imaging lens 10 of the second embodiment is 7.190 mm and the image height is 2.4 mm.

The aspherical coefficients of the object-side surface 31 of the first lens element 3 through the image-side surface 62 of the fourth lens element 6 in the equation (1) according to the second embodiment are shown in FIG. 13.

Furthermore, the relationship between important parameters of the optical imaging lens 10 of the second embodiment is shown in FIG. 74.

Figures 11A, 11B, 11C, 11D:
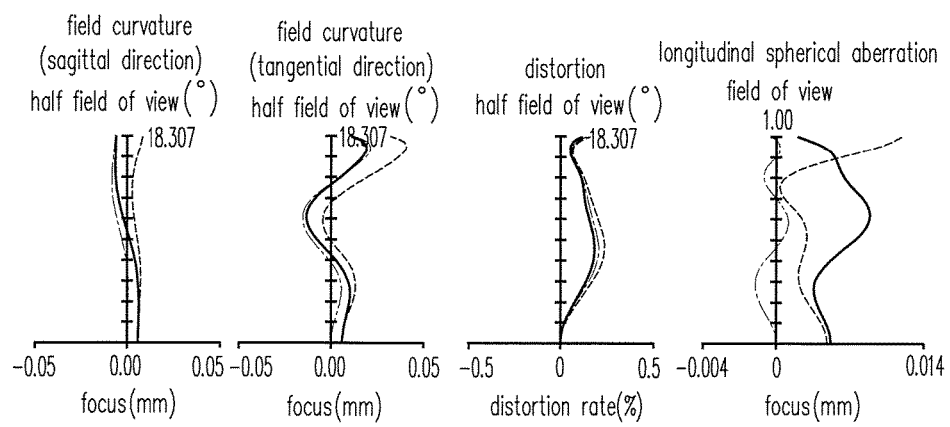
FIG. 11A to FIG. 11D are schematic diagrams showing a longitudinal spherical aberration and other aberrations of the optical imaging lens of the second embodiment.

Referring to FIG. 11A, in the diagram of a field curvature aberration in a sagittal direction of FIG. 11A, variations of the focal lengths of three representative wavelengths (i.e., red, green, and blue) in the whole field of view fall in a range of −0.01 mm to 0.01 mm. Referring to FIG. 11B, in the diagram of a field curvature aberration in a tangential direction of FIG. 11B, variations of the focal lengths of the three representative wavelengths (i.e., red, green, and blue) in the whole field of view fall in a range of −0.015 mm to 0.04 mm. Referring to FIG. 11C, the diagram of distortion aberration of FIG. 11C shows that the distortion aberration of the second embodiment is maintained in a range of 0% to 0.25%. Referring to FIG. 11D, in the diagram of longitudinal spherical aberration of the second embodiment of FIG. 11D, deviations of the imaging points of the off-axis rays at different heights are controlled in a range of −0.004 mm to 0.014 mm. Accordingly, the above shows that the optical imaging lens 10 of the second embodiment still renders better image quality than the conventional optical lens under the circumstances that the system length is reduced to about 7.190 mm.

It is known from the above description that, in comparison with the first embodiment, the second embodiment has the following advantages: the optical imaging lens 10 of the second embodiment has a greater f-number $F_{NO}$ than the first embodiment; the optical imaging lens 10 of the second embodiment has less field curvature aberration in the sagittal direction, distortion aberration, and longitudinal spherical aberration than the first embodiment; and the optical imaging lens 10 of the second embodiment is easier to manufacture and thus has higher yield than the first embodiment.

Figure 14:
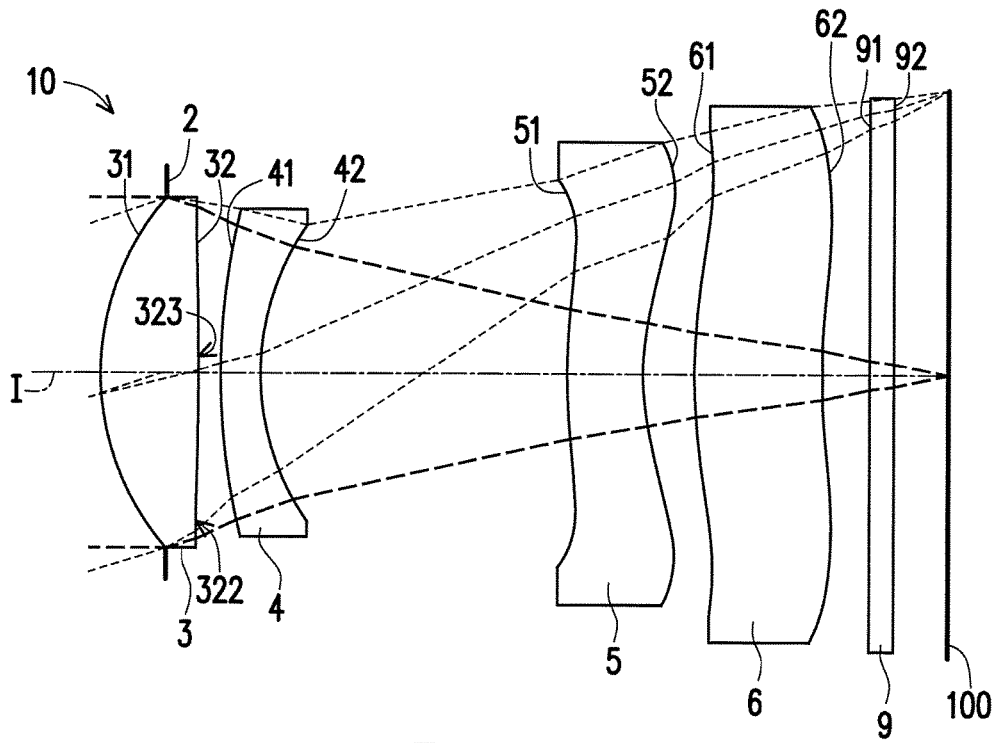
FIG. 14 is a schematic view of an optical imaging lens according to the third embodiment of the invention.

FIG. 14 is a schematic view of an optical imaging lens according to the third embodiment of the invention. FIG. 15A to FIG. 15D are schematic diagrams showing the longitudinal spherical aberration and other aberrations of the optical imaging lens of the third embodiment when the pupil radius is 1.4729 mm. First, referring to FIG. 14, the optical imaging lens 10 of the third embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has the convex portion 323 in the vicinity of the optical axis I. It should be noted that, for clarity, the reference numerals of some concave portions and convex portions the same as those of the first embodiment are omitted from FIG. 14.

Detailed optical data of the optical imaging lens 10 of the third embodiment is shown in FIG. 16, and in the third embodiment, the effective focal length EFL is 7.201 mm, the half field of view HFOV is 18.422°, and the f-number $F_{NO}$ is 2.444. The system length TTL of the optical imaging lens 10 of the third embodiment is 7.197 mm and the image height is 2.4 mm.

The aspherical coefficients of the object-side surface 31 of the first lens element 3 through the image-side surface 62 of the fourth lens element 6 in the equation (1) according to the third embodiment are shown in FIG. 17.

Furthermore, the relationship between important parameters of the optical imaging lens 10 of the third embodiment is shown in FIG. 74.

Figures 15A, 15B, 15C, 15D:
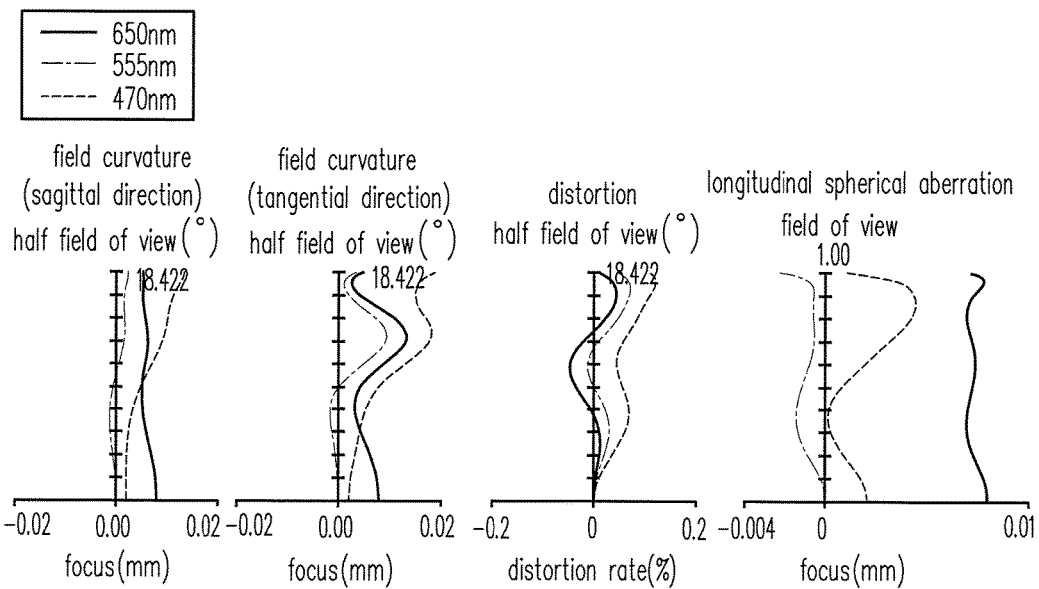
FIG. 15A to FIG. 15D are schematic diagrams showing a longitudinal spherical aberration and other aberrations of the optical imaging lens of the third embodiment.

Referring to FIG. 15A, in the diagram of a field curvature aberration in a sagittal direction of FIG. 15A, variations of the focal lengths of three representative wavelengths (i.e., red, green, and blue) in the whole field of view fall in a range of −0.002 mm to 0.014 mm. Referring to FIG. 15B, in the diagram of a field curvature aberration in a tangential direction of FIG. 15B, variations of the focal lengths of the three representative wavelengths (i.e., red, green, and blue) in the whole field of view fall in a range of −0.002 mm to 0.02 mm. Referring to FIG. 15C, the diagram of distortion aberration of FIG. 15C shows that the distortion aberration of the third embodiment is maintained in a range of −0.06% to 0.12%. Referring to FIG. 15D, in the diagram of longitudinal spherical aberration of the third embodiment of FIG. 15D, deviations of the imaging points of the off-axis rays at different heights are controlled in a range of −0.003 mm to 0.008 mm. Accordingly, the above shows that the optical imaging lens 10 of the third embodiment still renders better image quality than the conventional optical lens under the circumstances that the system length is reduced to about 7.197 mm.

It is known from the above description that, in comparison with the first embodiment, the third embodiment has the following advantages: the optical imaging lens 10 of the third embodiment has a greater f-number $F_{NO}$ than the first embodiment; the optical imaging lens 10 of the third embodiment has less field curvature aberration in the sagittal direction, distortion aberration, and longitudinal spherical aberration than the first embodiment; and the optical imaging lens 10 of the third embodiment is easier to manufacture and thus has higher yield than the first embodiment.

Figure 18:
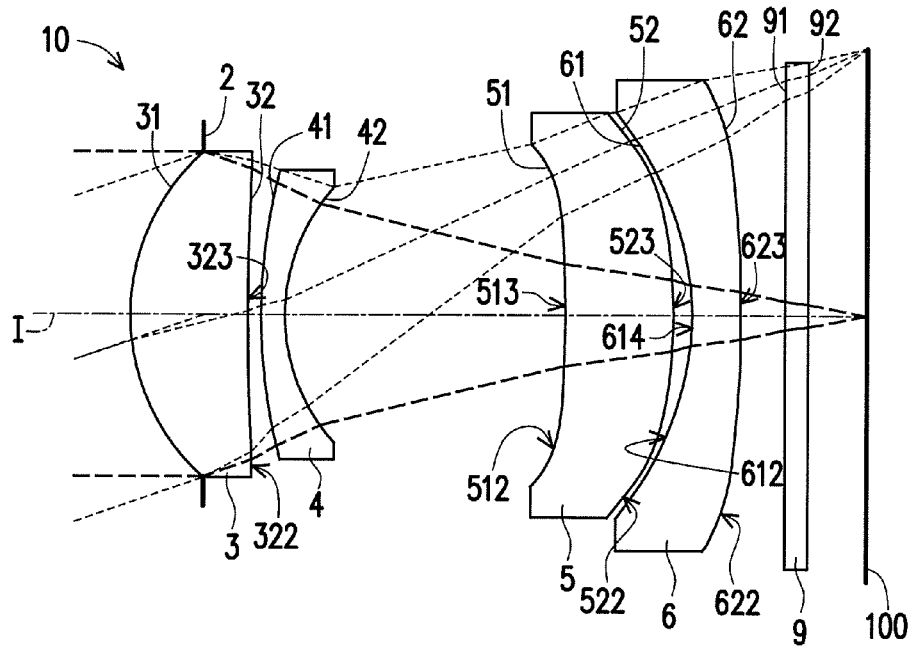
FIG. 18 is a schematic view of an optical imaging lens according to the fourth embodiment of the invention.

FIG. 18 is a schematic view of an optical imaging lens according to the fourth embodiment of the invention. FIG. 19A to FIG. 19D are schematic diagrams showing the longitudinal spherical aberration and other aberrations of the optical imaging lens of the fourth embodiment when the pupil radius is 1.5092 mm. First, referring to FIG. 18, the optical imaging lens 10 of the fourth embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has the convex portion 323 in the vicinity of the optical axis I, the third lens element 5 has positive refracting power, the object-side surface 51 of the third lens element 5 has a concave portion 513 in the vicinity of the optical axis I, the image-side surface 52 of the third lens element 5 has a convex portion 523 in the vicinity of the optical axis I, the fourth lens element 6 has negative refracting power, the object-side surface 61 of the fourth lens element 6 has a concave portion 614 in the vicinity of the optical axis I, and the image-side surface 62 of the fourth lens element 6 has a convex portion 623 in the vicinity of the optical axis I. It should be noted that, for clarity, reference numerals of some concave portions and convex portions the same as those of the first embodiment are omitted from FIG. 18.

Detailed optical data of the optical imaging lens 10 of the fourth embodiment is shown in FIG. 20, and in the fourth embodiment, the effective focal length EFL is 7.069 mm, the half field of view HFOV is 18.738°, and the f-number $F_{NO}$ is 2.390. The system length TTL of the optical imaging lens 10 of the fourth embodiment is 6.662 mm and the image height is 2.4 mm.

The aspherical coefficients of the object-side surface 31 of the first lens element 3 through the image-side surface 62 of the fourth lens element 6 in the equation (1) according to the fourth embodiment are shown in FIG. 21.

Furthermore, the relationship between important parameters of the optical imaging lens 10 of the fourth embodiment is shown in FIG. 74.

Figures 19A, 19B, 19C, 19D:
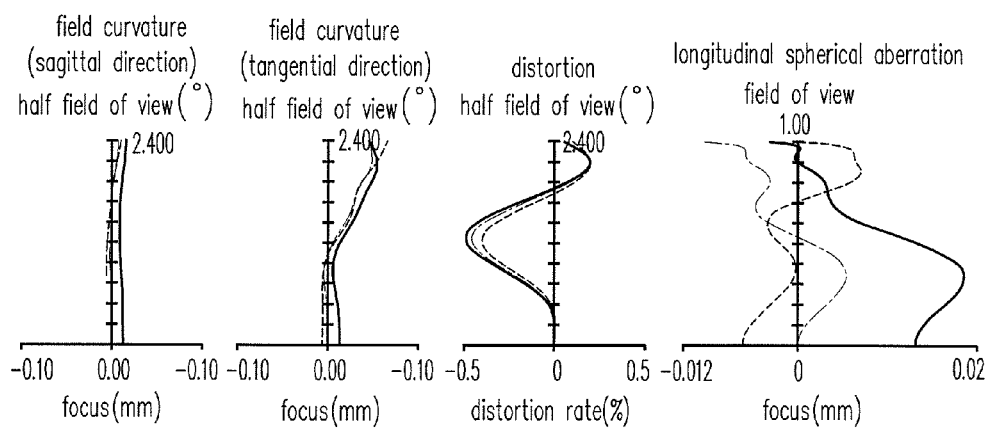
FIG. 19A to FIG. 19D are schematic diagrams showing a longitudinal spherical aberration and other aberrations of the optical imaging lens of the fourth embodiment.

Referring to FIG. 19A, in the diagram of a field curvature aberration in a sagittal direction of FIG. 19A, variations of the focal lengths of three representative wavelengths (i.e., red, green, and blue) in the whole field of view fall in a range of −0.01 mm to 0.02 mm. Referring to FIG. 19B, in the diagram of a field curvature aberration in a tangential direction of FIG. 19B, variations of the focal lengths of the three representative wavelengths (i.e., red, green, and blue) in the whole field of view fall in a range of −0.01 mm to 0.07 mm. Referring to FIG. 19C, in the diagram of distortion aberration of FIG. 19C shows that the distortion aberration of the fourth embodiment is maintained in a range of −0.5% to 0.2%. Referring to FIG. 19D, in the diagram of longitudinal spherical aberration of the fourth embodiment of FIG. 19D, deviations of the imaging points of the off-axis rays at different heights are controlled in a range of −0.012 mm to 0.02 mm. Accordingly, the above shows that the optical imaging lens 10 of the fourth embodiment has less distortion aberration than the first embodiment under the circumstances that the system length is reduced to about 6.662 mm.

It is known from the above description that, in comparison with the first embodiment, the fourth embodiment has the following advantages: the optical imaging lens 10 of the fourth embodiment has a greater f-number $F_{NO}$ than the first embodiment; the optical imaging lens 10 of the fourth embodiment has a greater half field of view than the first embodiment; the optical imaging lens 10 of the fourth embodiment has less distortion aberration than the first embodiment; and the optical imaging lens 10 of the fourth embodiment is easier to manufacture and thus has higher yield than the first embodiment.

Figure 22:
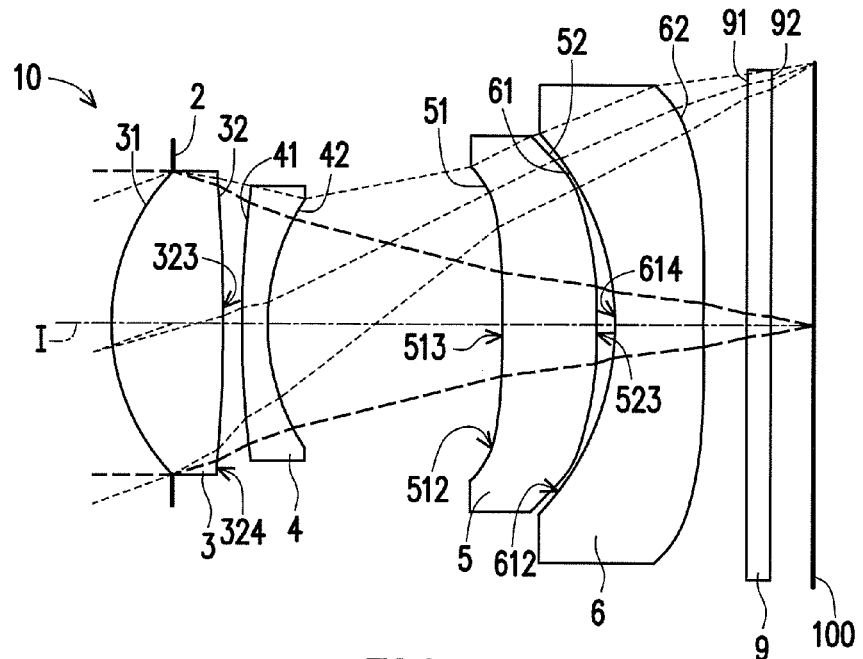
FIG. 22 is a schematic view of an optical imaging lens according to the fifth embodiment of the invention.

FIG. 22 is a schematic view of an optical imaging lens according to the fifth embodiment of the invention. FIG. 23A to FIG. 23D are schematic diagrams showing the longitudinal spherical aberration and other aberrations of the optical imaging lens of the fifth embodiment when the pupil radius is 1.3804 mm. First, referring to FIG. 22, the optical imaging lens 10 of the fifth embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has a convex portion 323 in the vicinity of the optical axis I and a convex portion 324 in the vicinity of the periphery, the third lens element 5 has positive refracting power, the object-side surface 51 of the third lens element 5 has a concave portion 513 in the vicinity of the optical axis I, the image-side surface 52 of the third lens element 5 has a convex portion 523 in the vicinity of the optical axis I, the fourth lens element 6 has negative refracting power, and the object-side surface 61 of the fourth lens element 6 has a concave portion 614 in the vicinity of the optical axis I. It should be noted that, for clarity, the reference numerals of some concave portions and convex portions the same as those of the first embodiment are omitted from FIG. 22.

Detailed optical data of the optical imaging lens 10 of the fifth embodiment is shown in FIG. 24, and in the fifth embodiment, the effective focal length EFL is 6.625 mm, the half field of view HFOV is 19.905°, and the f-number $F_{NO}$ is 2.394. The system length TTL of the optical imaging lens 10 of the fifth embodiment is 6.429 mm and the image height is 2.4 mm.

The aspherical coefficients of the object-side surface 31 of the first lens element 3 through the image-side surface 62 of the fourth lens element 6 in the equation (1) according to the fifth embodiment are shown in FIG. 25.

Furthermore, the relationship between important parameters of the optical imaging lens 10 of the fifth embodiment is shown in FIG. 74.

Figures 23A, 23B, 23C, 23D:
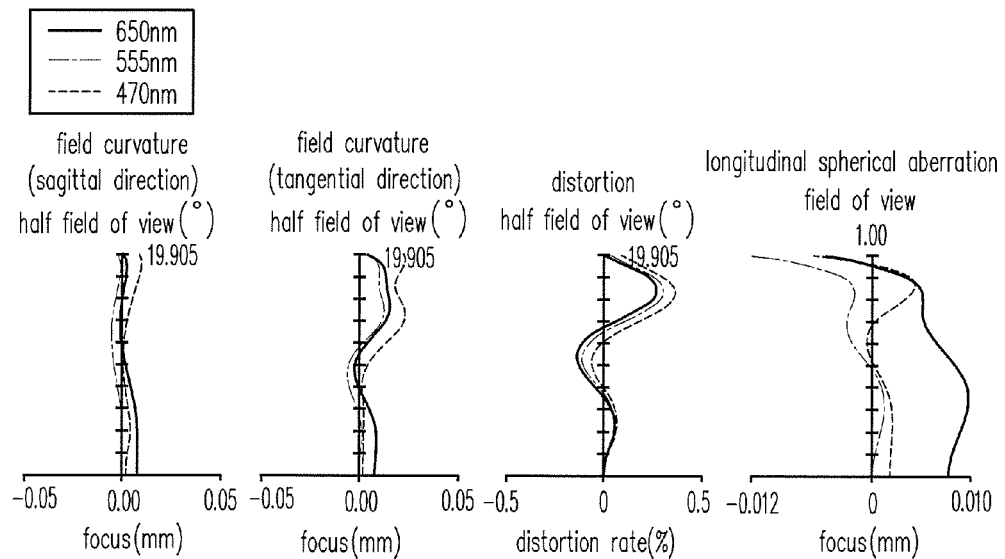
FIG. 23A to FIG. 23D are schematic diagrams showing a longitudinal spherical aberration and other aberrations of the optical imaging lens of the fifth embodiment.

Referring to FIG. 23A, in the diagram of a field curvature aberration in a sagittal direction of FIG. 23A, variations of the focal lengths of three representative wavelengths (i.e., red, green, and blue) in the whole field of view fall in a range of −0.01 mm to 0.01 mm. Referring to FIG. 23B, in the diagram of a field curvature aberration in a tangential direction of FIG. 23B, variations of the focal lengths of the three representative wavelengths (i.e., red, green, and blue) in the whole field of view fall in a range of −0.01 mm to 0.025 mm. Referring to FIG. 23C, the diagram of distortion aberration of FIG. 23C shows that the distortion aberration of the fifth embodiment is maintained in a range of −0.15% to 0.4%. Referring to FIG. 23D, in the diagram of longitudinal spherical aberration of the fifth embodiment of FIG. 23D, deviations of the imaging points of the off-axis rays at different heights are controlled in a range of −0.012 mm to 0.01 mm. Accordingly, the above shows that the optical imaging lens 10 of the fifth embodiment still renders better image quality than the conventional optical lens under the circumstances that the system length is reduced to about 6.429 mm.

It is known from the above description that the optical imaging lens 10 of the fifth embodiment has a greater f-number $F_{NO}$ than the first embodiment; the optical imaging lens 10 of the fifth embodiment has a greater half field of view HFOV than the first embodiment; the optical imaging lens 10 of the fifth embodiment has less field curvature aberration in a sagittal direction, distortion aberration, and longitudinal spherical aberration than the first embodiment; and the optical imaging lens 10 of the fifth embodiment is easier to manufacture and thus has higher yield than the first embodiment.

FIG. 26 is a schematic view of an optical imaging lens according to the sixth embodiment of the invention. FIG. 27A to FIG. 27D are schematic diagrams showing the longitudinal spherical aberration and other aberrations of the optical imaging lens of the sixth embodiment when the pupil radius is 1.4966 mm. First, referring to FIG. 26, the optical imaging lens 10 of the sixth embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has a convex portion 323 in the vicinity of the optical axis I and a convex portion 324 in the vicinity of the periphery, and the object-side surface 61 of the fourth lens element 6 has a convex portion 613 in the vicinity of the periphery. It should be noted that, for clarity, the reference numerals of some concave portions and convex portions the same as those of the first embodiment are omitted from FIG. 26.

Detailed optical data of the optical imaging lens 10 of the sixth embodiment is shown in FIG. 28, and in the sixth embodiment, the effective focal length EFL is 7.183 mm, the half field of view HFOV is 18.388°, and the f-number $F_{NO}$ is 2.403. The system length TTL of the optical imaging lens 10 of the sixth embodiment is 7.152 mm and the image height is 2.4 mm.

The aspherical coefficients of the object-side surface 31 of the first lens element 3 through the image-side surface 62 of the fourth lens element 6 in the equation (1) according to the sixth embodiment are shown in FIG. 29.

Furthermore, a relationship between important parameters of the optical imaging lens 10 of the sixth embodiment is shown in FIG. 74.

Referring to FIG. 27A, in the diagram of a field curvature aberration in a sagittal direction of FIG. 27A, variations of the focal lengths of three representative wavelengths (i.e., red, green, and blue) in the whole field of view fall in a range of −0.02 mm to 0.06 mm. Referring to FIG. 27B, in the diagram of afield curvature aberration in a tangential direction of FIG. 27B, variations of the focal lengths of the three representative wavelengths (i.e., red, green, and blue) in the whole field of view fall in a range of −0.01 mm to 0.03 mm. Referring to FIG. 27C, the diagram of distortion aberration of FIG. 27C shows that the distortion aberration of the sixth embodiment is maintained in a range of −0.4% to 0.6%. Referring to FIG. 27D, in the diagram of longitudinal spherical aberration of the sixth embodiment of FIG. 27D, deviations of the imaging points of the off-axis rays at different heights are controlled in a range of −0.003 mm to 0.01 mm. Accordingly, the above shows that the optical imaging lens 10 of the sixth embodiment has less distortion than the first embodiment under the circumstances that the system length is reduced to about 7.152 mm.

It is known from the above description that, in comparison with the first embodiment, the sixth embodiment has the following advantages: the optical imaging lens 10 of the sixth embodiment has a greater f-number $F_{NO}$ than the first embodiment; the optical imaging lens 10 of the sixth embodiment has less image distortion than the first embodiment; and the optical imaging lens 10 of the sixth embodiment is easier to manufacture and thus has higher yield than the first embodiment.

Figure 30:
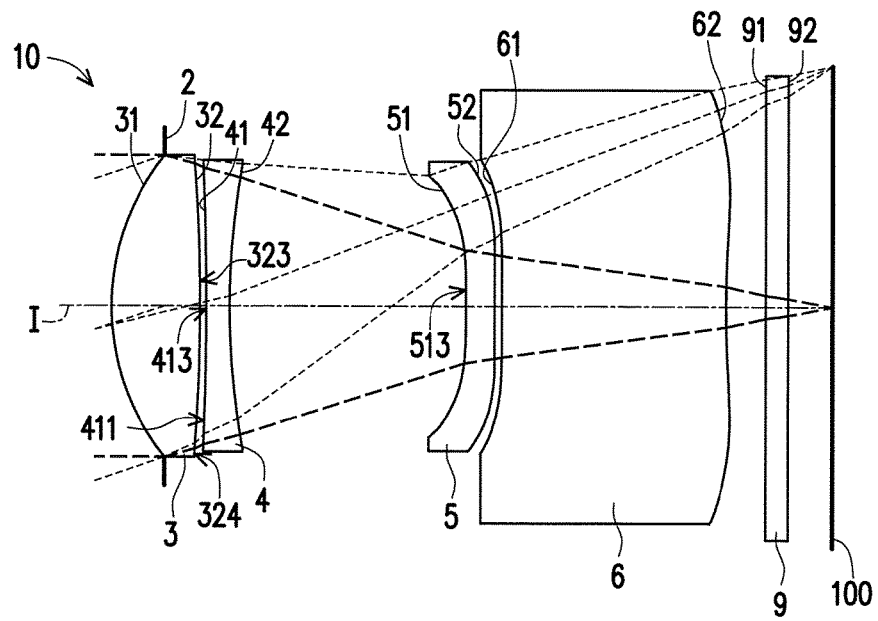
FIG. 30 is a schematic view of an optical imaging lens according to the seventh embodiment of the invention.

FIG. 30 is a schematic view of an optical imaging lens according to the seventh embodiment of the invention. FIG. 31A to FIG. 31D are schematic diagrams showing a longitudinal spherical aberration and other aberrations of the optical imaging lens of the seventh embodiment when the pupil radius is 1.5050 mm. First, referring to FIG. 30, the optical imaging lens 10 of the seventh embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has a convex portion 323 in the vicinity of the optical axis I and a convex portion 324 in the vicinity of the periphery, the object-side surface 41 of the second lens element 4 has a concave portion 413 in the vicinity of the optical axis I and a concave portion 414 in the vicinity of the periphery, the object-side surface 51 of the third lens element 5 has a concave portion 513 in the vicinity of the optical axis I, and the fourth lens element 6 has negative refracting power. It should be noted that, for clarity, the reference numerals of some concave portions and convex portions the same as those of the first embodiment are omitted from FIG. 30.

Detailed optical data of the optical imaging lens 10 of the seventh embodiment is shown in FIG. 32, and in the seventh embodiment, the effective focal length EFL is 7.223 mm, the half field of view HFOV is 18.296°, and the f-number $F_{NO}$ is 2.395. The system length TTL of the optical imaging lens 10 of the seventh embodiment is 7.191 mm and the image height is 2.4 mm.

The aspherical coefficients of the object-side surface 31 of the first lens element 3 through the image-side surface 62 of the fourth lens element 6 in the equation (1) according to the seventh embodiment are shown in FIG. 33.

Furthermore, a relationship between important parameters of the optical imaging lens 10 of the seventh embodiment is shown in FIG. 74.

Figures 31A, 31B, 31C, 31D:
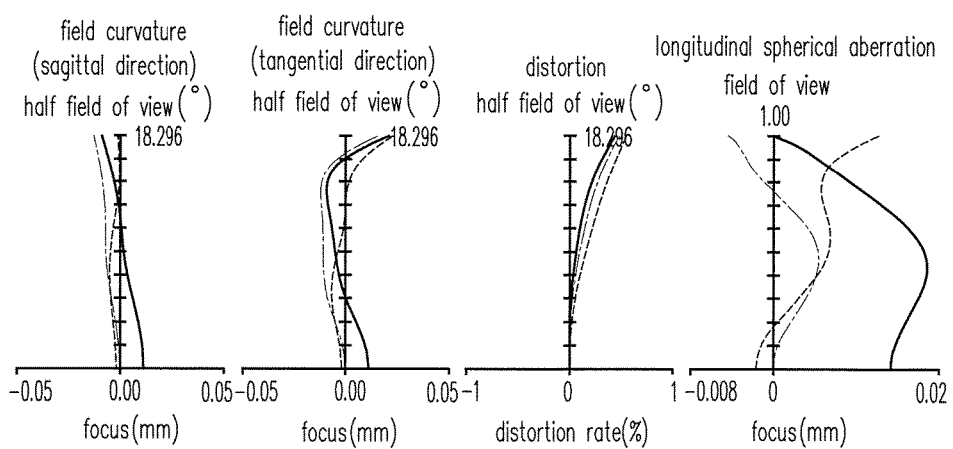
FIG. 31A to FIG. 31D are schematic diagrams showing a longitudinal spherical aberration and other aberrations of the optical imaging lens of the seventh embodiment.

Referring to FIG. 31A, in the diagram of a field curvature aberration in a sagittal direction of FIG. 31A, variations of the focal lengths of three representative wavelengths (i.e., red, green, and blue) in the whole field of view fall in a range of −0.015 mm to 0.012 mm. Referring to FIG. 31B, in the diagram of a field curvature aberration in a tangential direction of FIG. 31B, variations of the focal lengths of the three representative wavelengths (i.e., red, green, and blue) in the whole field of view fall in a range of −0.015 mm to 0.025 mm. Referring to FIG. 31C, the diagram of distortion aberration of FIG. 31C shows that the distortion aberration of the seventh embodiment is maintained in a range of 0% to 0.6%. Referring to FIG. 31D, in the diagram of longitudinal spherical aberration of the seventh embodiment of FIG. 31D, deviations of the imaging points of the off-axis rays at different heights are controlled in a range of −0.005 mm to 0.015 mm. Accordingly, the above shows that the optical imaging lens 10 of the seventh embodiment still renders better image quality than the conventional optical lens under the circumstances that the system length is reduced to about 7.191 mm.

It is known from the above description that, in comparison with the first embodiment, the seventh embodiment has the following advantages: the optical imaging lens 10 of the seventh embodiment has a greater f-number $F_{NO}$ than the first embodiment; the optical imaging lens 10 of the seventh embodiment has less field curvature aberration in the sagittal direction, distortion aberration, and longitudinal spherical aberration than the first embodiment; and the optical imaging lens 10 of the seventh embodiment is easier to manufacture and thus has higher yield than the first embodiment.

Figure 34:
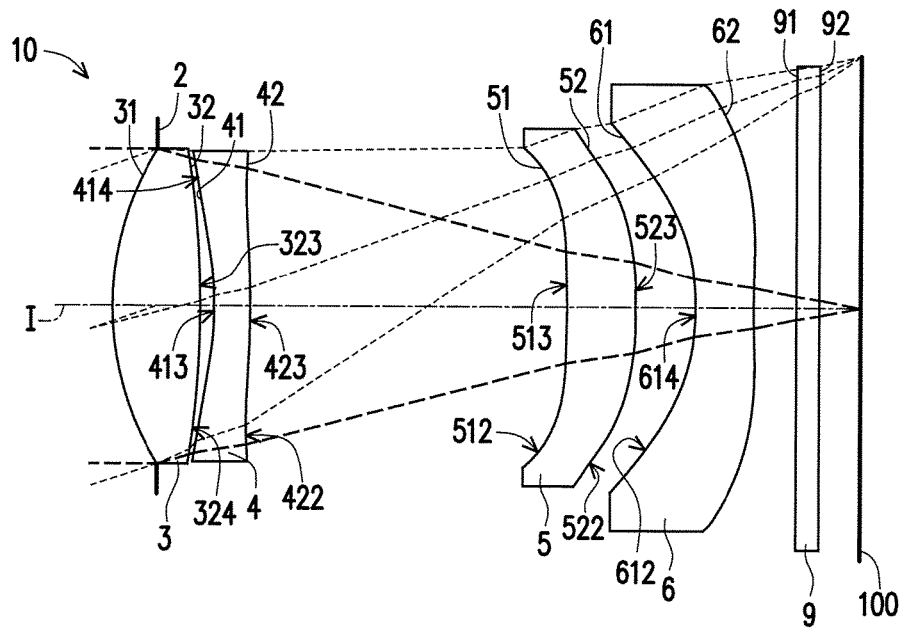
FIG. 34 is a schematic view of an optical imaging lens according to the eighth embodiment of the invention.

FIG. 34 is a schematic view of an optical imaging lens according to the eighth embodiment of the invention. FIG. 35A to FIG. 35D are schematic diagrams showing a longitudinal spherical aberration and other aberrations of the optical imaging lens of the eighth embodiment when the pupil radius is 1.4997 mm. First, referring to FIG. 34, the optical imaging lens 10 of the eighth embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has a convex portion 323 in the vicinity of the optical axis I and a convex portion 324 in the vicinity of the periphery, the object-side surface 41 of the second lens element 4 has a concave portion 413 in the vicinity of the optical axis I and a concave portion 414 in the vicinity of the periphery, the image-side surface 42 of the second lens element 4 has a convex portion 423 in the vicinity of the optical axis I, the third lens element 5 has positive refracting power, the object-side surface 51 of the third lens element 5 has a concave portion 513 in the vicinity of the optical axis I, the image-side surface 52 of the third lens element 5 has a convex portion 523 in the vicinity of the optical axis I, the fourth lens element 6 has negative refracting power, and the object-side surface 61 of the fourth lens element 6 has a concave portion 614 in the vicinity of the optical axis I. It should be noted that, for clarity, the reference numerals of some concave portions and convex portions the same as those of the first embodiment are omitted from FIG. 34.

Detailed optical data of the optical imaging lens 10 of the eighth embodiment is shown in FIG. 36, and in the eighth embodiment, the effective focal length EFL is 7.198 mm, the half field of view HFOV is 18.421°, and the f-number $F_{NO}$ is 2.397. The system length TTL of the optical imaging lens 10 of the eighth embodiment is 7.190 mm and the image height is 2.4 mm.

The aspherical coefficients of the object-side surface 31 of the first lens element 3 through the image-side surface 61 of the fourth lens element 6 in the equation (1) according to the eighth embodiment are shown in FIG. 37.

Furthermore, a relationship between important parameters of the optical imaging lens 10 of the eighth embodiment is shown in FIG. 74.

Figures 35A, 35B, 35C, 35D:
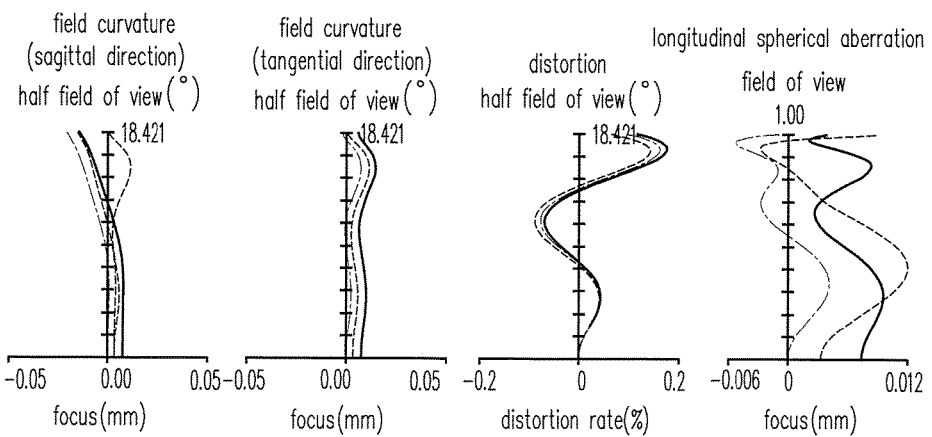
FIG. 35A to FIG. 35D are schematic diagrams showing a longitudinal spherical aberration and other aberrations of the optical imaging lens of the eighth embodiment.

Referring to FIG. 35A, in the diagram of a field curvature aberration in a sagittal direction of FIG. 35A, variations of the focal lengths of three representative wavelengths (i.e., red, green, and blue) in the whole field of view fall in a range of −0.025 mm to 0.01 mm. Referring to FIG. 35B, in the diagram of afield curvature aberration in a tangential direction of FIG. 35B, variations of the focal lengths of the three representative wavelengths (i.e., red, green, and blue) in the whole field of view fall in a range of −0.01 mm to 0.015 mm. Referring to FIG. 35C, the diagram of distortion aberration of FIG. 35C shows that the distortion aberration of the eighth embodiment is maintained in a range of −0.01% to 0.018%. Referring to FIG. 35D, in the diagram of longitudinal spherical aberration of the eighth embodiment of FIG. 35D, deviations of the imaging points of the off-axis rays at different heights are controlled in a range of −0.006 mm to 0.012 mm. Accordingly, the above shows that the optical imaging lens 10 of the eighth embodiment still renders better image quality than the conventional optical lens under the circumstances that the system length is reduced to about 7.190 mm.

It is known from the above description that, in comparison with the first embodiment, the eighth embodiment has the following advantages: the optical imaging lens 10 of the eighth embodiment has a greater f-number $F_{NO}$ than the first embodiment; the optical imaging lens 10 of the eighth embodiment has less field curvature aberration in a sagittal direction, distortion aberration, and longitudinal spherical aberration than the first embodiment; and the optical imaging lens 10 of the eighth embodiment is easier to manufacture and thus has higher yield than the first embodiment.

Figure 38:
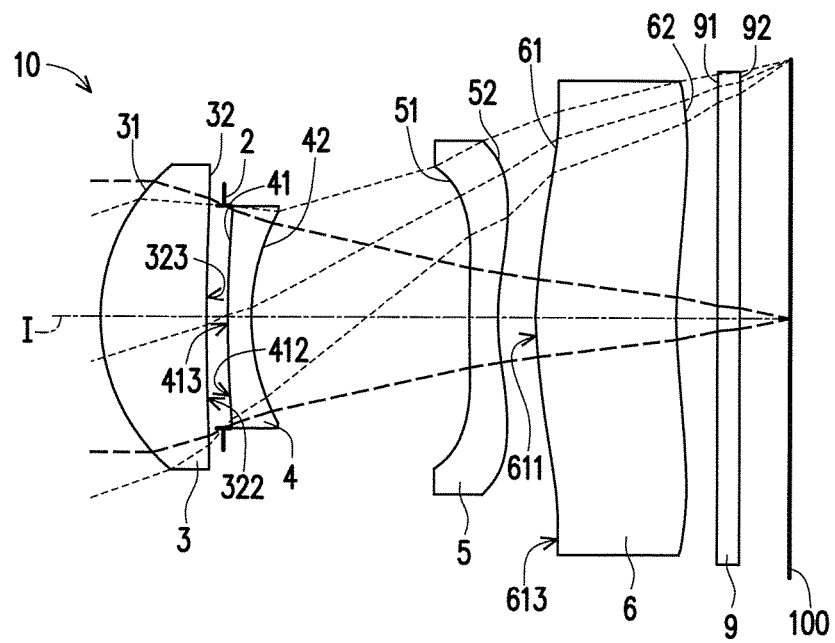
FIG. 38 is a schematic view of an optical imaging lens according to the ninth embodiment of the invention.

FIG. 38 is a schematic view of an optical imaging lens according to the ninth embodiment of the invention. FIG. 39A to FIG. 39D are schematic diagrams showing a longitudinal spherical aberration and other aberrations of the optical imaging lens of the ninth embodiment when the pupil radius is 1.4297 mm. First, referring to FIG. 38, the optical imaging lens 10 of the ninth embodiment of the invention is similar to the optical imaging lens 10 of the first embodiment. They only slightly differ in some optical data, aspherical coefficients, and parameters related to the lens elements 3-6. Moreover, the image-side surface 32 of the first lens element 3 has a convex portion 323 in the vicinity of the optical axis I, the object-side surface 41 of the second lens element 4 has a concave portion 413 in the vicinity of the optical axis I, the object-side surface 61 of the fourth lens element 6 has a convex portion 613 in the vicinity of the periphery, and the aperture 2 is located between the first lens element 3 and the second lens element 4. It should be noted that, for clarity, the reference numerals of some concave portions and convex portions the same as those of the first embodiment are omitted from FIG. 38.

Detailed optical data of the optical imaging lens 10 of the ninth embodiment is shown in FIG. 40, and in the ninth embodiment, the effective focal length EFL is 6.862 mm, the half field of view HFOV is 19.252°, and the f-number $F_{NO}$ is 2.611. The system length TTL of the optical imaging lens 10 of the ninth embodiment is 6.722 mm and the image height is 2.4 mm.

The aspherical coefficients of the object-side surface 31 of the first lens element 3 through the image-side surface 61 of the fourth lens element 6 in the equation (1) according to the ninth embodiment are shown in FIG. 41.

Furthermore, a relationship between important parameters of the optical imaging lens 10 of the ninth embodiment is shown in FIG. 74.

Figures 39A, 39B, 39C, 39D:
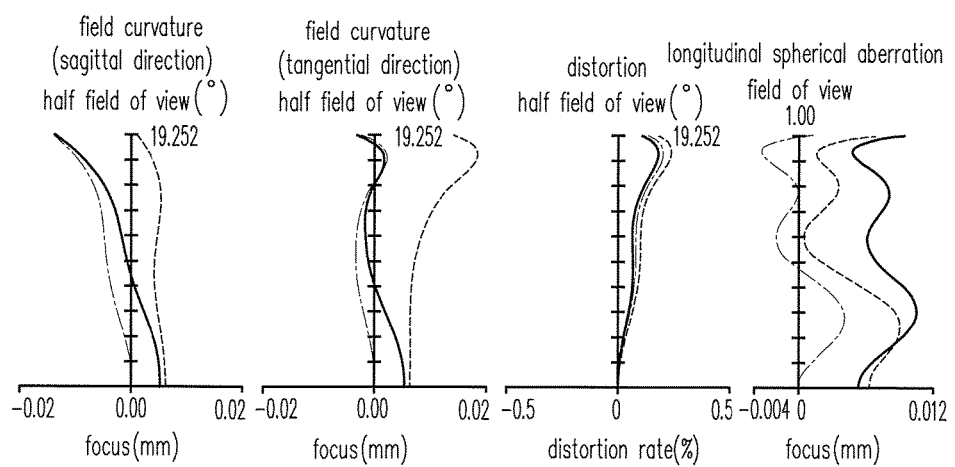
FIG. 39A to FIG. 39D are schematic diagrams showing a longitudinal spherical aberration and other aberrations of the optical imaging lens of the ninth embodiment.

Referring to FIG. 39A, in the diagram of a field curvature aberration in a sagittal direction of FIG. 39A, variations of the focal lengths of three representative wavelengths (i.e., red, green, and blue) in the whole field of view fall in a range of −0.01 mm to 0.08 mm. Referring to FIG. 39B, in the diagram of afield curvature aberration in a tangential direction of FIG. 39B, variations of the focal lengths of the three representative wavelengths (i.e., red, green, and blue) in the whole field of view fall in a range of −0.004 mm to 0.02 mm. Referring to FIG. 39C, the diagram of distortion aberration of FIG. 39C shows that the distortion aberration of the ninth embodiment is maintained in a range of 0% to 0.25%. Referring to FIG. 39D, in the diagram of longitudinal spherical aberration of the ninth embodiment of FIG. 39D, deviations of the imaging points of the off-axis rays at different heights are controlled in a range of −0.004 mm to 0.011 mm. Accordingly, the above shows that the optical imaging lens 10 of the ninth embodiment still renders better image quality than the conventional optical lens under the circumstances that the system length is reduced to about 6.722 mm.

It is known from the above description that, in comparison with the first embodiment, the ninth embodiment has the following advantages: the optical imaging lens 10 of the ninth embodiment has a greater f-number $F_{NO}$ than the first embodiment; the optical imaging lens 10 of the ninth embodiment has a greater half field of view HFOV than the first embodiment; the optical imaging lens 10 of the ninth embodiment has less distortion and longitudinal spherical aberration than the first embodiment; and the optical imaging lens 10 of the ninth embodiment is easier to manufacture and thus has higher yield than the first embodiment.

Figure 42:
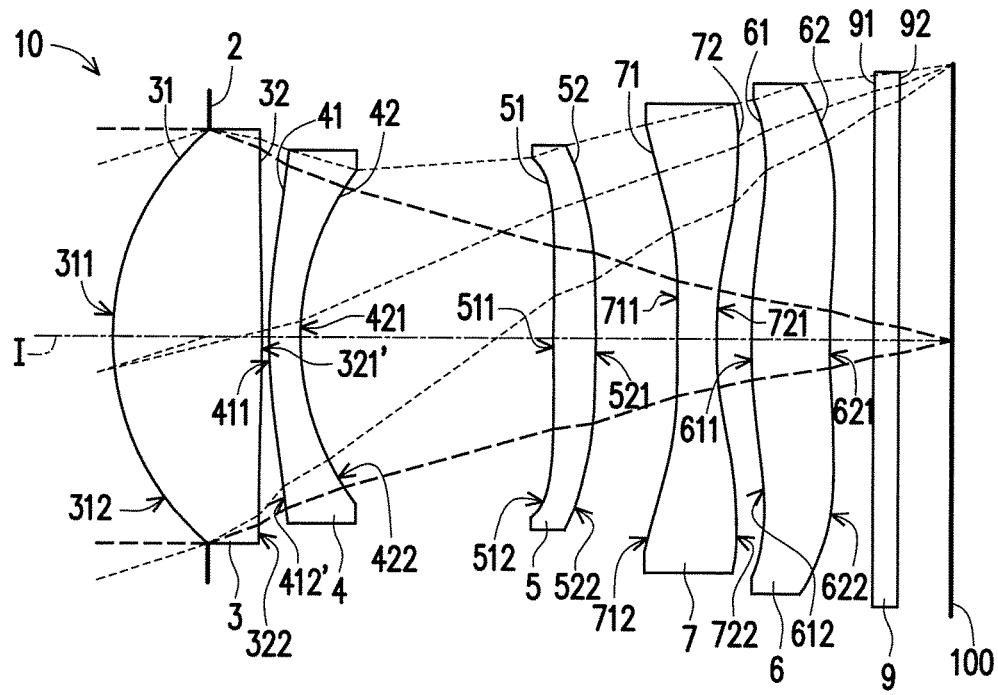
FIG. 42 is a schematic view of an optical imaging lens according to the tenth embodiment of the invention.

FIG. 42 is a schematic view of an optical imaging lens according to the tenth embodiment of the invention. FIG. 43A to FIG. 43D are schematic diagrams showing a longitudinal spherical aberration and other aberrations of the optical imaging lens of the tenth embodiment when the pupil radius is 1.7802 mm. First, referring to FIG. 42, an optical imaging lens 10 of the tenth embodiment of the invention includes a first lens element 3, a second lens element 4, a third lens element 5, a fifth lens element 7, a fourth lens element 6, and a filter 9 that are arranged sequentially along an optical axis I of the optical imaging lens 10 from an object side to an image side. The optical imaging lens 10 further includes an aperture 2. In this embodiment, the aperture 2 may be selectively located on an object-side surface 31 of the first lens element 3, but the invention is not limited thereto. When a ray emitted from an object to be captured enters the optical imaging lens 10 and passes through the aperture 2, the first lens element 3, the second lens element 4, the third lens element 5, the fifth lens element 7, the fourth lens element 6, and the filter 9, the ray forms an image on an image plane 100. The filter 9 is an IR cut filter, for example, for preventing an infrared ray of a certain wave band in the ray from reaching the image plane 100 to affect the image quality. It should be noted that the object side is a side that faces the object to be captured while the image side is a side that faces the image plane 100.

The first lens element 3, the second lens element 4, the third lens element 5, the fifth lens element 7, the fourth lens element 6, and the filter 9 respectively have object-side surfaces 31, 41, 51, 71, 61, and 91 that face the object side and allow an imaging ray to pass through and image-side surfaces 32, 42, 52, 72, 62, and 92 that face the image side and allow the imaging ray to pass through.

Moreover, in order to meet the demand for lighter products, the first lens element 3 through the fifth lens element 7 all have refracting power and are made of a plastic material. Nevertheless, the material of the first lens element 3 through the fifth lens element 7 is not limited thereto.

The first lens element 3 has positive refracting power. The object-side surface 31 of the first lens element 3 is a convex surface and has a convex portion 311 in a vicinity of the optical axis I and a convex portion 312 in a vicinity of a periphery. The image-side surface 32 of the first lens element 3 has a convex portion 321' in a vicinity of the optical axis I and a concave portion 322 in a vicinity of the periphery. In this embodiment, the object-side surface 31 and the image-side surface 32 of the first lens element 3 are both aspherical.

The second lens element 4 has negative refracting power. The object-side surface 41 of the second lens element 4 has a convex portion 411 in a vicinity of the optical axis I and a convex portion 412' in a vicinity of a periphery. The image-side surface 42 of the second lens element 4 has a concave portion 421 in a vicinity of the optical axis I and a concave portion 422 in a vicinity of the periphery. In this embodiment, the object-side surface 41 and the image-side surface 42 of the second lens element 4 are both aspherical.

The third lens element 5 has positive refracting power. The object-side surface 51 of the third lens element 5 has a convex portion 511 in a vicinity of the optical axis I and a concave portion 512 in a vicinity of a periphery. The image-side surface 52 of the third lens element 5 has a convex portion 521 in a vicinity of the optical axis I and a convex portion 522 in a vicinity of the periphery. In this embodiment, the object-side surface 51 and the image-side surface 52 of the third lens element 5 are both aspherical.

The fifth lens element 7 has negative refracting power. The object-side surface 71 of the fifth lens element 7 has a concave portion 711 in a vicinity of the optical axis I and a concave portion 712 in a vicinity of a periphery. The image-side surface 72 of the fifth lens element 7 has a concave portion 721 in a vicinity of the optical axis I and a convex portion 722 in a vicinity of the periphery. In this embodiment, the object-side surface 71 and the image-side surface 72 of the fifth lens element 7 are both aspherical.

The fourth lens element 6 has positive refracting power. The object-side surface 61 of the fourth lens element 6 has a convex portion 611 in a vicinity of the optical axis I and a concave portion 612 in a vicinity of a periphery. The image-side surface 62 of the fourth lens element 6 has a concave portion 621 in a vicinity of the optical axis I and a convex portion 622 in a vicinity of the periphery. In this embodiment, the object-side surface 61 and the image-side surface 62 of the fourth lens element 6 are both aspherical.

Other detailed optical data of the tenth embodiment is shown in FIG. 44, and the optical imaging lens 10 of the tenth embodiment has an effective focal length EFL of 7.235 mm, a half field of view HFOV of 22.611°, and a f-number $F_{NO}$ of 2.032. A system length TTL of the optical imaging lens 10 is 7.191 mm and an image height is 3.0 mm. The system length TTL of the optical imaging lens 10 refers to a distance along the optical axis I from the object-side surface 31 of the first lens element 3 to the image plane 100.

In addition, in this embodiment, the object-side surfaces 31, 41, 51, 71, and 61 and the image-side surfaces 32, 42, 52, 72, and 62 of the first lens element 3, the second lens element 4, the third lens element 5, the fifth lens element 7, and the fourth lens element 6 (ten surfaces in total) are all aspherical. These aspherical surfaces are defined by the aforementioned equation (1).

The aspherical coefficients of the object-side surface 31 of the first lens element 3 through the image-side surface 72 of the fifth lens element 7 in the equation (1) are shown in FIG. 45. Specifically, the field number 31 of FIG. 45 indicates the aspherical coefficients of the object-side surface 31 of the first lens element 3, and so on.

Furthermore, a relationship between important parameters of the optical imaging lens 10 of the tenth embodiment is shown in FIG. 75, wherein:

T1 is a thickness of the first lens element 3 along the optical axis I;
T2 is a thickness of the second lens element 4 along the optical axis I;
T3 is a thickness of the third lens element 5 along the optical axis I;
T4 is a thickness of the fourth lens element 6 along the optical axis I;
T5 is a thickness of the fifth lens element 7 along the optical axis I;
TF is a thickness of the filter 9 along the optical axis I;
G12 is a distance from the image-side surface 32 of the first lens element 3 to the object-side surface 41 of the second lens element 4 along the optical axis I;
G23 is a distance from the image-side surface 42 of the second lens element 4 to the object-side surface 51 of the third lens element 5 along the optical axis I;
G35 is a distance from the image-side surface 52 of the third lens element 5 to the object-side surface 71 of the fifth lens element 7 along the optical axis I;
G4F is a distance from the image-side surface 62 of the fourth lens element 6 to the object-side surface 91 of the filter 9 along the optical axis I;
GFP is a distance from the image-side surface 92 of the filter 9 to the image plane 100 along the optical axis I;
Gaa is a total of air gaps respectively between the first lens element 3 through the fourth lens element 6 along the optical axis I;
ALT is a total of the thicknesses of the first lens element 3, the second lens element 4, the third lens element 5, the fifth lens element 7, and the fourth lens element 6 along the optical axis I, i.e., the total of T1, T2, T3, T5, and T4;
TTL is the distance from the object-side surface 31 of the first lens element 3 to the image plane 100 along the optical axis I;
TL is a distance from the object-side surface 31 of the third lens element 3 to the image-side surface 62 of the fourth lens element 6 along the optical axis I;

BFL is a distance from the image-side surface 62 of the fourth lens element 6 to the image plane 100 along the optical axis I;

EFL is the effective focal length of the optical imaging lens 10;

HFOV is the half field of view of the optical imaging lens 10;

TA is a distance from the aperture 2 to the object-side surface of the next adjacent lens element (e.g. the object-side surface 31 of the first lens element 3 in this embodiment) along the optical axis I; and $F_{NO}$ is the f-number of the optical imaging lens 10.

It is further defined that:

GFP is an air gap between the filter 9 and the image plane 100 along the optical axis I;

f1 is a focal length of the first lens element 3;

f2 is a focal length of the second lens element 4;

f3 is a focal length of the third lens element 5;

f4 is a focal length of the fourth lens element 6;

f5 is a focal length of the fifth lens element 7;

n1 is a refractive index of the first lens element 3;

n2 is a refractive index of the second lens element 4;

n3 is a refractive index of the third lens element 5;

n4 is a refractive index of the fourth lens element 6;

n5 is a refractive index of the fifth lens element 7;

ν1 is an Abbe number, which may also be called a dispersion coefficient, of the first lens element 3;

ν2 is an Abbe number of the second lens element 4;

ν3 is an Abbe number of the third lens element 5;

ν4 is an Abbe number of the fourth lens element 6; and

ν5 is an Abbe number of the fifth lens element 7.

Figures 43A, 43B, 43C, 43D:
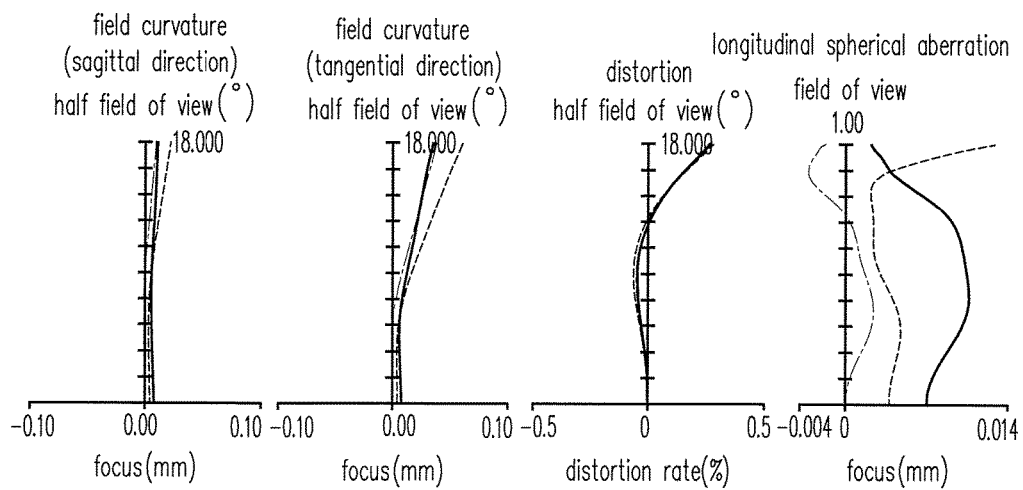
FIG. 43A to FIG. 43D are schematic diagrams showing a longitudinal spherical aberration and other aberrations of the optical imaging lens of the tenth embodiment.

Further, referring to FIG. 43A to FIG. 43D, the diagrams of FIG. 43A and FIG. 43B respectively show a field curvature in a sagittal direction and a field curvature in a tangential direction aberration on the image plane 100 of the tenth embodiment, the diagram of FIG. 43C shows a distortion aberration on the image plane 100 of the tenth embodiment, and the diagram of FIG. 43D shows a longitudinal spherical aberration of the tenth embodiment.

Referring to FIG. 43A, in the diagram of afield curvature aberration in a sagittal direction of FIG. 43A, variations of the focal lengths of three representative wavelengths (i.e., red, green, and blue) in the whole field of view fall in a range of −0.01 mm to 0.03 mm; and referring to FIG. 43B, in the diagram of afield curvature aberration in a tangential direction of FIG. 43B, variations of the focal lengths of the three representative wavelengths (i.e., red, green, and blue) in the whole field of view fall in a range of −0.01 mm to 0.08 mm, which shows that the optical system of the tenth embodiment of the invention effectively eliminates aberration. Referring to FIG. 43C, the diagram of distortion aberration of FIG. 43C shows that the distortion aberration of the tenth embodiment is maintained in a range of −0.1% to 0.3%, which shows that the distortion aberration of the tenth embodiment meets the requirement of image quality of the optical system. Referring to FIG. 43D, in the diagram of longitudinal spherical aberration of the tenth embodiment of FIG. 43D, the curves formed by the wavelengths are very close to one another and are close to the center, which shows that off-axis rays of each wavelength at different heights gather in a vicinity of the imaging point. According to the deviation of the curve of each wavelength, it is known that deviations of the imaging points of the off-axis rays at different heights are controlled in a range of −0.004 mm to 0.013 mm. Thus, the optical system of this embodiment indeed significantly improves spherical aberration. Moreover, the distances between the three representative wavelengths (i.e., red, green, and blue) are very short, which means that the imaging positions of rays of different wavelengths are fairly gathered, and therefore chromatic aberration is also improved significantly. Accordingly, under the circumstances that the system length is reduced to about 7.191 mm, the optical imaging lens of the tenth embodiment still provides better image quality than the conventional optical lens. Therefore, in the tenth embodiment, the lens length may be reduced and the capturing angle may be increased while favorable optical performance is maintained, so as to achieve the design of thinner products with an increased viewing angle.

FIG. 46 is a schematic view of an optical imaging lens according to the eleventh embodiment of the invention. FIG. 47A to FIG. 47D are schematic diagrams showing a longitudinal spherical aberration and other aberrations of the optical imaging lens of the eleventh embodiment when the pupil radius is 1.5034 mm. First, referring to FIG. 46, the optical imaging lens 10 of the eleventh embodiment of the invention is similar to the optical imaging lens 10 of the tenth embodiment. They only slightly differ in some optical data, aspherical coefficients, and parameters related to the lens elements 3-7. Moreover, the first lens element 3 has positive refracting power, the object-side surface 31 of the first lens element 3 has a convex portion 313 in the vicinity of the optical axis I and a convex portion 314 in the vicinity of the periphery, the second lens element 4 has negative refracting power, the object-side surface 51 of the third lens element 5 has a concave portion 513 in the vicinity of the periphery, the image-side surface 72 of the fifth lens element 7 has a convex portion 723 in the vicinity of the periphery, and the image-side surface 62 of the fourth lens element 6 has a convex portion 623 in the vicinity of the periphery. It should be noted that, for clarity, the reference numerals of some concave portions and convex portions the same as those of the first embodiment are omitted from FIG. 10.

Detailed optical data of the optical imaging lens 10 of the eleventh embodiment is shown in FIG. 48, and in the eleventh embodiment, the effective focal length EFL is 7.216 mm, the half field of view HFOV is 22.61°, and the f-number $F_{NO}$ is 2.399. The system length TTL of the optical imaging lens 10 of the eleventh embodiment is 7.190 mm and the image height is 3.0 mm.

The aspherical coefficients of the object-side surface 31 of the first lens element 3 through the image-side surface 72 of the fifth lens element 7 in the equation (1) according to the eleventh embodiment are shown in FIG. 49.

Furthermore, a relationship between important parameters of the optical imaging lens 10 of the eleventh embodiment is shown in FIG. 75.

Referring to FIG. 47A, in the diagram of a field curvature aberration in a sagittal direction of FIG. 47A, variations of the focal lengths of three representative wavelengths (i.e., red, green, and blue) in the whole field of view fall in a range of −0.005 mm to 0.015 mm. Referring to FIG. 47B, in the diagram of afield curvature aberration in a tangential direction of FIG. 47B, variations of the focal lengths of the three representative wavelengths (i.e., red, green, and blue) in the whole field of view fall in a range of 0 mm to 0.035 mm. Referring to FIG. 47C, the diagram of distortion aberration of FIG. 47C shows that the distortion aberration of the eleventh embodiment is maintained in a range of −0.2% to 0.3%. Referring to FIG. 47D, in the diagram of longitudinal spherical aberration of the eleventh embodiment of FIG. 47D, deviations of the imaging points of the off-axis rays at different heights are controlled in a range of −0.004 mm to 0.011 mm. Accordingly, the above shows that the optical imaging lens 10 of the eleventh embodiment still renders better image quality than the conventional optical lens under the circumstances that the system length is reduced to about 7.190 mm.

It is known from the above description that, in comparison with the tenth embodiment, the eleventh embodiment has the following advantages: the optical imaging lens 10 of the eleventh embodiment has a greater f-number $F_{NO}$ than the tenth embodiment; the optical imaging lens 10 of the eleventh embodiment has less field curvature aberration in a sagittal direction than the tenth embodiment; and the optical imaging lens 10 of the eleventh embodiment is easier to manufacture and thus has higher yield than the tenth embodiment.

FIG. 50 is a schematic view of an optical imaging lens according to the twelfth embodiment of the invention. FIG. 51A to FIG. 51D are schematic diagrams showing a longitudinal spherical aberration and other aberrations of the optical imaging lens of the twelfth embodiment when the pupil radius is 1.5058 mm. First, referring to FIG. 50, the optical imaging lens 10 of the twelfth embodiment of the invention is similar to the optical imaging lens 10 of the tenth embodiment. They only slightly differ in some optical data, aspherical coefficients, and parameters related to the lens elements 3-7. Moreover, the image-side surface 32 of the first lens element 3 has the convex portion 323 in the vicinity of the optical axis I, the object-side surface 41 of the second lens element 4 has a concave portion 413 in the vicinity of the optical axis I, the object-side surface 41 of the second lens element 4 has a concave portion 414 in the vicinity of the periphery, the third lens element 5 has negative refracting power, the image-side surface 52 of the third lens element 5 has a concave portion 524 in the vicinity of the optical axis I, the fifth lens element 7 has positive refracting power, the object-side surface 71 of the fifth lens element 7 has a convex portion 713 in the vicinity of the optical axis I, and the fourth lens element 6 has negative refracting power. It should be noted that, for clarity, the reference numerals of some concave portions and convex portions the same as those of the tenth embodiment are omitted from FIG. 50.

Detailed optical data of the optical imaging lens 10 of the twelfth embodiment is shown in FIG. 52, and in the twelfth embodiment, the effective focal length EFL is 7.227 mm, the half field of view HFOV is 22.634°, and the f-number $F_{NO}$ is 2.397. The system length TTL of the optical imaging lens 10 of the twelfth embodiment is 7.190 mm and the image height is 3.0 mm.

The aspherical coefficients of the object-side surface 31 of the first lens element 3 through the image-side surface 72 of the fifth lens element 7 in the equation (1) according to the twelfth embodiment are shown in FIG. 53.

Furthermore, a relationship between important parameters of the optical imaging lens 10 of the twelfth embodiment is shown in FIG. 75.

Referring to FIG. 51A, in the diagram of a field curvature aberration in a sagittal direction of FIG. 51A, variations of the focal lengths of three representative wavelengths (i.e., red, green, and blue) in the whole field of view fall in a range of −0.01 mm to 0.01 mm. Referring to FIG. 51B in the diagram of afield curvature aberration in a tangential direction of FIG. 51B, variations of the focal lengths of the three representative wavelengths (i.e., red, green, and blue) in the whole field of view fall in a range of −0.01 mm to 0.035 mm. Referring to FIG. 51C, the diagram of distortion aberration of FIG. 51C shows that the distortion aberration of the twelfth embodiment is maintained in a range of −0.2% to 0.5%. Referring to FIG. 51D, in the diagram of longitudinal spherical aberration of the twelfth embodiment of FIG. 51D, deviations of the imaging points of the off-axis rays at different heights are controlled in a range of −0.008 mm to 0.012 mm. Accordingly, the above shows that the optical imaging lens 10 of the twelfth embodiment still renders better image quality than the conventional optical lens under the circumstances that the system length is reduced to about 7.227 mm.

It is known from the above description that, in comparison with the tenth embodiment, the twelfth embodiment has the following advantages: the optical imaging lens 10 of the twelfth embodiment has a greater f-number $F_{NO}$ than the tenth embodiment; the optical imaging lens 10 of the twelfth embodiment has a greater half field of view HFOV than the tenth embodiment; the optical imaging lens 10 of the twelfth embodiment has less field curvature aberration in a sagittal direction and a tangential direction than the tenth embodiment; and the optical imaging lens 10 of the twelfth embodiment is easier to manufacture and thus has higher yield than the tenth embodiment.

Figure 54:
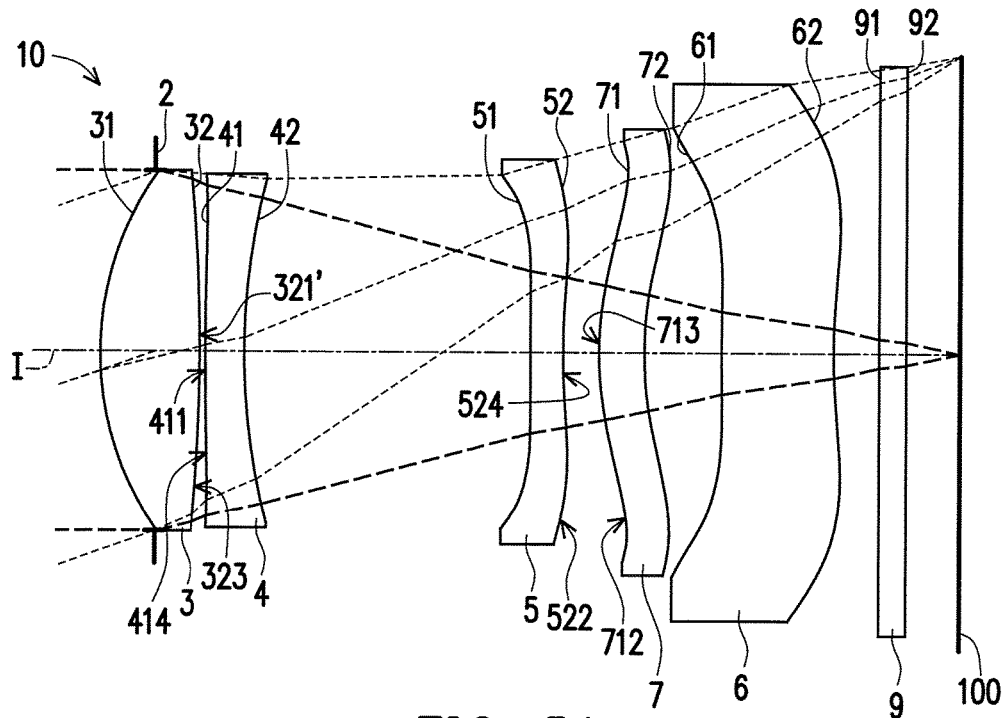
FIG. 54 is a schematic view of an optical imaging lens according to the thirteenth embodiment of the invention.

FIG. 54 is a schematic view of an optical imaging lens according to the thirteenth embodiment of the invention. FIG. 55A to FIG. 55D are schematic diagrams showing the longitudinal spherical aberration and other aberrations of the optical imaging lens of the thirteenth embodiment when the pupil radius is 1.5006 mm. First, referring to FIG. 54, the optical imaging lens 10 of the thirteenth embodiment of the invention is similar to the optical imaging lens 10 of the tenth embodiment. They only slightly differ in some optical data, aspherical coefficients, and parameters related to the lens elements 3-7. Moreover, the image-side surface 32 of the first lens element 3 has a convex portion 323 in the vicinity of the periphery, the object-side surface 41 of the second lens element 4 has a concave portion 414 in the vicinity of the periphery, the third lens element 5 has negative refracting power, the image-side surface 52 of the third lens element 5 has a concave portion 524 in the vicinity of the optical axis I, the fifth lens element 7 has positive refracting power, the object-side surface 71 of the fifth lens element 7 has a convex portion 713 in the vicinity of the optical axis I, and the fourth lens element 6 has negative refracting power. It should be noted that, for clarity, the reference numerals of some concave portions and convex portions the same as those of the tenth embodiment are omitted from FIG. 54.

Detailed optical data of the optical imaging lens 10 of the thirteenth embodiment is shown in FIG. 56, and in the thirteenth embodiment, the effective focal length EFL is 7.202 mm, the half field of view HFOV is 22.634°, and the f-number $F_{NO}$ is 2.397. The system length TTL of the optical imaging lens 10 of the thirteenth embodiment is 7.190 mm and the image height is 3.0 mm.

The aspherical coefficients of the object-side surface 31 of the first lens element 3 through the image-side surface 72 of the fifth lens element 7 in the equation (1) according to the thirteenth embodiment are shown in FIG. 57.

Furthermore, a relationship between important parameters of the optical imaging lens 10 of the thirteenth embodiment is shown in FIG. 75.

Figures 55A, 55B, 55C, 55D:
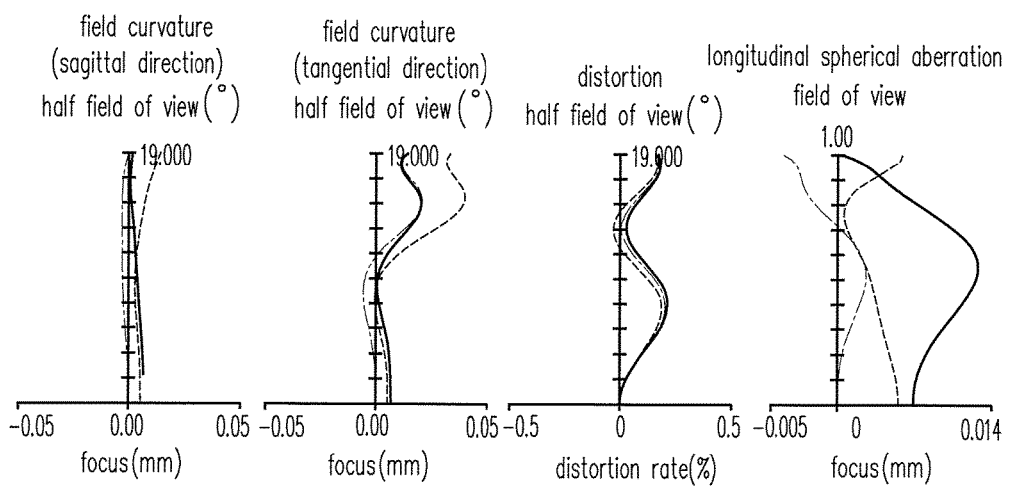
FIG. 55A to FIG. 55D are schematic diagrams showing a longitudinal spherical aberration and other aberrations of the optical imaging lens of the thirteenth embodiment.

Referring to FIG. 55A, in the diagram of a field curvature aberration in a sagittal direction of FIG. 55A, variations of the focal lengths of three representative wavelengths (i.e., red, green, and blue) in the whole field of view fall in a range of −0.01 mm to 0.015 mm. Referring to FIG. 55B, in the diagram of afield curvature aberration in a tangential direction of FIG. 55B, variations of the focal lengths of the three representative wavelengths (i.e., red, green, and blue) in the whole field of view fall in a range of −0.01 mm to 0.040 mm. Referring to FIG. 55C, the diagram of distortion aberration of FIG. 55C shows that the distortion aberration of the thirteenth embodiment is maintained in a range of −0.1% to 0.25%. Referring to FIG. 55D, in the diagram of longitudinal spherical aberration of the thirteenth embodiment of FIG. 55D, deviations of the imaging points of the off-axis rays at different heights are controlled in a range of −0.006 mm to 0.014 mm. Accordingly, the above shows that the optical imaging lens 10 of the thirteenth embodiment still renders better image quality than the conventional optical lens under the circumstances that the system length is reduced to about 7.190 mm.

It is known from the above description that, in comparison with the tenth embodiment, the thirteenth embodiment has the following advantages: the optical imaging lens 10 of the thirteenth embodiment has a greater f-number $F_{NO}$ than the tenth embodiment; the optical imaging lens 10 of the thirteenth embodiment has a greater half field of view HFOV than the tenth embodiment; the optical imaging lens 10 of the thirteenth embodiment has less field curvature aberration in the sagittal direction and the tangential direction than the tenth embodiment; and the optical imaging lens 10 of the thirteenth embodiment is easier to manufacture and thus has higher yield than the tenth embodiment.

Figure 58:
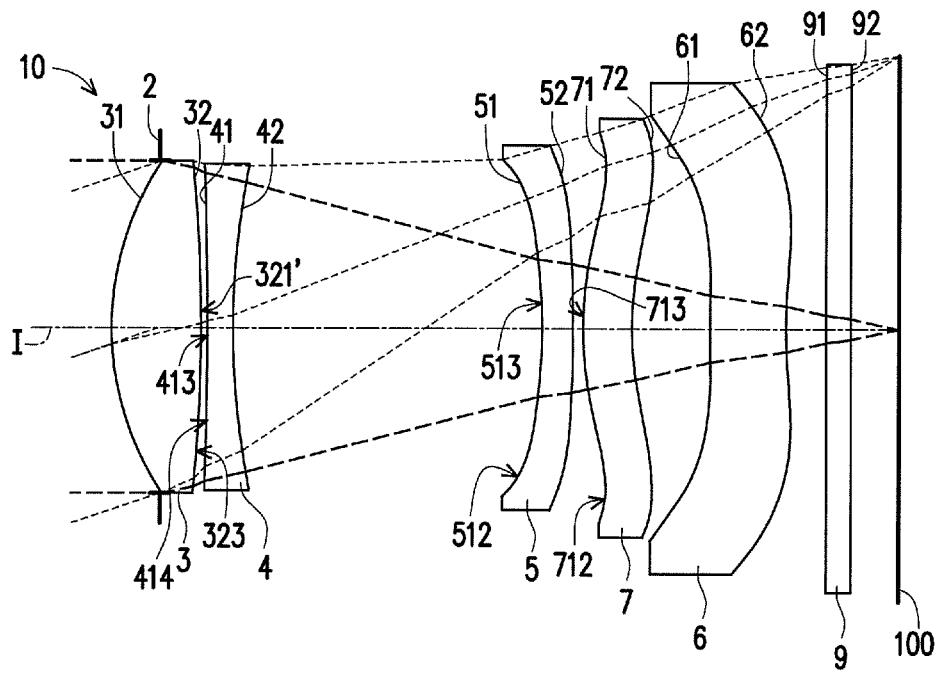
FIG. 58 is a schematic view of an optical imaging lens according to the fourteenth embodiment of the invention.

FIG. 58 is a schematic view of an optical imaging lens according to the fourteenth embodiment of the invention. FIG. 59A to FIG. 59D are schematic diagrams showing the longitudinal spherical aberration and other aberrations of the optical imaging lens of the fourteenth embodiment when the pupil radius is 1.5066 mm. First, referring to FIG. 58, the optical imaging lens 10 of the fourteenth embodiment of the invention is similar to the optical imaging lens 10 of the tenth embodiment. They only slightly differ in some optical data, aspherical coefficients, and parameters related to the lens elements 3-7. Moreover, the image-side surface 32 of the first lens element 3 has a convex portion 323 in the vicinity of the periphery, the object-side surface 41 of the second lens element 4 has a concave portion 413 in the vicinity of the optical axis I, the object-side surface 41 of the second lens element 4 has a concave portion 414 in the vicinity of the periphery, the third lens element 5 has negative refracting power, the object-side surface 51 of the third lens element 5 has a concave portion 513 in the vicinity of the optical axis I, the fifth lens element 7 has positive refracting power, the object-side surface 71 of the fifth lens element 7 has a convex portion 713 in the vicinity of the optical axis I, and the fourth lens element 6 has negative refracting power. It should be noted that, for clarity, the reference numerals of some concave portions and convex portions the same as those of the tenth embodiment are omitted from FIG. 58.

Detailed optical data of the optical imaging lens 10 of the fourteenth embodiment is shown in FIG. 60, and in the fourteenth embodiment, the effective focal length EFL is 7.231 mm, the half field of view HFOV is 22.488°, and the f-number $F_{NO}$ is 2.401. The system length TTL of the optical imaging lens 10 of the fourteenth embodiment is 7.190 mm and the image height is 3.0 mm.

The aspherical coefficients of the object-side surface 31 of the first lens element 3 through the image-side surface 72 of the fifth lens element 7 in the equation (1) according to the fourteenth embodiment are shown in FIG. 61.

Furthermore, the relationship between important parameters of the optical imaging lens 10 of the fourteenth embodiment is shown in FIG. 75.

Figures 59A, 59B, 59C, 59D:
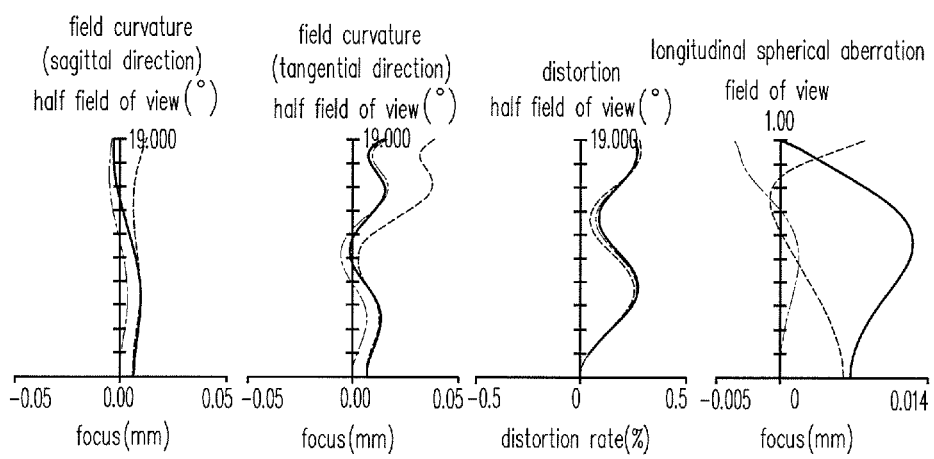
FIG. 59A to FIG. 59D are schematic diagrams showing a longitudinal spherical aberration and other aberrations of the optical imaging lens of the fourteenth embodiment.

Referring to FIG. 59A, in the diagram of a field curvature aberration in a sagittal direction of FIG. 59A, variations of the focal lengths of three representative wavelengths (i.e., red, green, and blue) in the whole field of view fall in a range of −0.01 mm to 0.015 mm. Referring to FIG. 59B, in the diagram of a field curvature aberration in a tangential direction of FIG. 59B, variations of the focal lengths of the three representative wavelengths (i.e., red, green, and blue) in the whole field of view fall in a range of −0.01 mm to 0.040 mm. Referring to FIG. 59C, the diagram of distortion aberration of FIG. 59C shows that the distortion aberration of the fourteenth embodiment is maintained in a range of 0% to 0.3%. Referring to FIG. 59D, in the diagram of longitudinal spherical aberration of the fourteenth embodiment of FIG. 59D, deviations of the imaging points of the off-axis rays at different heights are controlled in a range of −0.006 mm to 0.014 mm. Accordingly, the above shows that the optical imaging lens 10 of the fourteenth embodiment still renders better image quality than the conventional optical lens under the circumstances that the system length is reduced to about 7.190 mm.

It is known from the above description that, in comparison with the tenth embodiment, the fourteenth embodiment has the following advantages: the optical imaging lens 10 of the fourteenth embodiment has a greater f-number $F_{NO}$ than the tenth embodiment; the optical imaging lens 10 of the fourteenth embodiment has less field curvature aberration in the sagittal direction and a tangential direction than the tenth embodiment and less distortion aberration than the tenth embodiment; and the optical imaging lens 10 of the fourteenth embodiment is easier to manufacture and thus has higher yield than the tenth embodiment.

FIG. 62 is a schematic view of an optical imaging lens according to the fifteenth embodiment of the invention. FIG. 63A to FIG. 63D are schematic diagrams showing the longitudinal spherical aberration and other aberrations of the optical imaging lens of the fifteenth embodiment when the pupil radius is 1.5004 mm. First, referring to FIG. 62, the optical imaging lens 10 of the fifteenth embodiment of the invention is similar to the optical imaging lens 10 of the tenth embodiment. They only slightly differ in some optical data, aspherical coefficients, and parameters related to the lens elements 3-7. Moreover, the image-side surface 32 of the first lens element 3 has a convex portion 323 in the vicinity of the periphery, the object-side surface 41 of the second lens element 4 has a concave portion 413 in the vicinity of the optical axis I, the object-side surface 41 of the second lens element 4 has a concave portion 414 in the vicinity of the periphery, the third lens element 5 has negative refracting power, the object-side surface 51 of the third lens element 5 has a concave portion 513 in the vicinity of the optical axis I, the image-side surface 52 of the third lens element 5 has a concave portion 524 in the vicinity of the optical axis I, the fifth lens element 7 has positive refracting power, and the fourth lens element 6 has negative refracting power. It should be noted that, for clarity, the reference numerals of some concave portions and convex portions the same as those of the tenth embodiment are omitted from FIG. 62.

Detailed optical data of the optical imaging lens 10 of the fifteenth embodiment is shown in FIG. 64, and in the fifteenth embodiment, the effective focal length EFL is 7.202 mm, the half field of view HFOV is 22.612°, and the f-number $F_{NO}$ is 2.398. The system length TTL of the optical imaging lens 10 of the fifteenth embodiment is 7.189 mm and the image height is 3.0 mm.

The aspherical coefficients of the object-side surface 31 of the first lens element 3 through the image-side surface 72 of the fifth lens element 7 in the equation (1) according to the fifteenth embodiment are shown in FIG. 65.

Furthermore, the relationship between important parameters of the optical imaging lens 10 of the fifteenth embodiment is shown in FIG. 75.

Referring to FIG. 63A, in the diagram of a field curvature aberration in a sagittal direction of FIG. 63A, variations of the focal lengths of three representative wavelengths (i.e., red, green, and blue) in the whole field of view fall in a range of −0.008 mm to 0.008 mm. Referring to FIG. 63B, in the diagram of a field curvature aberration in a tangential direction of FIG. 63B, variations of the focal lengths of the three representative wavelengths (i.e., red, green, and blue) in the whole field of view fall in a range of −0.01 mm to 0.016 mm. Referring to FIG. 63C, the diagram of distortion aberration of FIG. 63C shows that the distortion aberration of the fifteenth embodiment is maintained in a range of −0.04% to 0.16%. Referring to FIG. 63D, in the diagram of longitudinal spherical aberration of the fifteenth embodiment of FIG. 63D, deviations of the imaging points of the off-axis rays at different heights are controlled in a range of −0.003 mm to 0.01 mm. Accordingly, the above shows that the optical imaging lens 10 of the fifteenth embodiment still renders better image quality than the conventional optical lens under the circumstances that the system length is reduced to about 7.189 mm.

It is known from the above description that, in comparison with the tenth embodiment, the fifteenth embodiment has the following advantages: the optical imaging lens 10 of the fifteenth embodiment has a shorter system length TTL than the tenth embodiment; the optical imaging lens 10 of the fifteenth embodiment has a greater f-number $F_{NO}$ than the tenth embodiment; the optical imaging lens 10 of the fifteenth embodiment has less field curvature aberration in the sagittal direction and the tangential direction, distortion aberration, and longitudinal spherical aberration than the tenth embodiment; and the optical imaging lens 10 of the fifteenth embodiment is easier to manufacture and thus has higher yield than the tenth embodiment.

Figure 66:
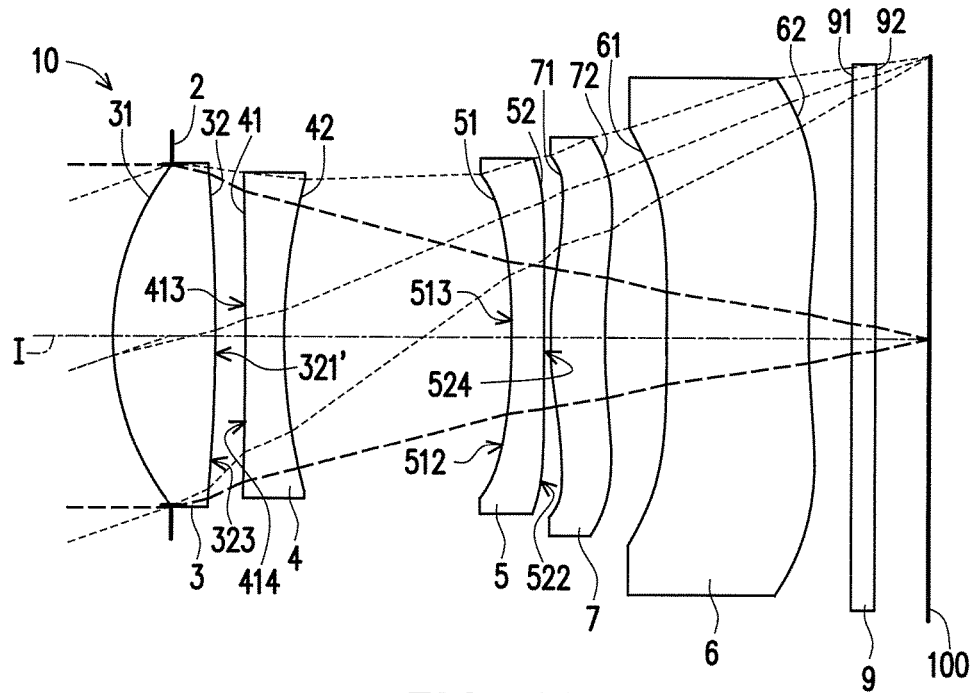
FIG. 66 is a schematic view of an optical imaging lens according to the sixteenth embodiment of the invention.

FIG. 66 is a schematic view of an optical imaging lens according to the sixteenth embodiment of the invention. FIG. 67A to FIG. 67D are schematic diagrams showing the longitudinal spherical aberration and other aberrations of the optical imaging lens of the sixteenth embodiment when the pupil radius is 1.5004 mm. First, referring to FIG. 66, the optical imaging lens 10 of the sixteenth embodiment of the invention is similar to the optical imaging lens 10 of the tenth embodiment. They only slightly differ in some optical data, aspherical coefficients, and parameters related to the lens elements 3-7. Moreover, the image-side surface 32 of the first lens element 3 has a convex portion 323 in the vicinity of the periphery, the object-side surface 41 of the second lens element 4 has a concave portion 413 in the vicinity of the optical axis I, the object-side surface 41 of the second lens element 4 has a concave portion 414 in the vicinity of the periphery, the third lens element 5 has negative refracting power, the object-side surface 51 of the third lens element 5 has a concave portion 513 in the vicinity of the optical axis I, the image-side surface 52 of the third lens element 5 has a concave portion 524 in the vicinity of the optical axis I, the fifth lens element 7 has positive refracting power, and the fourth lens element 6 has negative refracting power. It should be noted that, for clarity, the reference numerals of some concave portions and convex portions the same as those of the tenth embodiment are omitted from FIG. 66.

Detailed optical data of the optical imaging lens 10 of the sixteenth embodiment is shown in FIG. 68, and in the sixteenth embodiment, the effective focal length EFL is 7.202 mm, the half field of view HFOV is 22.612°, and the f-number $F_{NO}$ is 2.398. The system length TTL of the optical imaging lens 10 of the sixteenth embodiment is 7.189 mm and the image height is 3.0 mm.

The aspherical coefficients of the object-side surface 31 of the first lens element 3 through the image-side surface 72 of the fifth lens element 7 in the equation (1) according to the sixteenth embodiment are shown in FIG. 68.

Furthermore, a relationship between important parameters of the optical imaging lens 10 of the sixteenth embodiment is shown in FIG. 75.

Figures 67A, 67B, 67C, 67D:
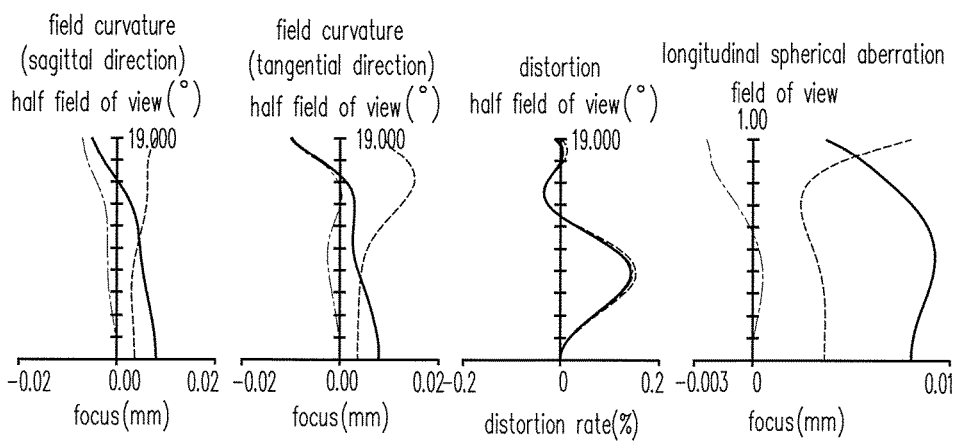
FIG. 67A to FIG. 67D are schematic diagrams showing a longitudinal spherical aberration and other aberrations of the optical imaging lens of the sixteenth embodiment.

Referring to FIG. 67A, in the diagram of a field curvature aberration in a sagittal direction of FIG. 67A, variations of the focal lengths of three representative wavelengths (i.e., red, green, and blue) in the whole field of view fall in a range of −0.008 mm to 0.008 mm. Referring to FIG. 67B, in the diagram of a field curvature aberration in a tangential direction of FIG. 67B, variations of the focal lengths of the three representative wavelengths (i.e., red, green, and blue) in the whole field of view fall in a range of −0.01 mm to 0.016 mm. Referring to FIG. 67C, the diagram of distortion aberration of FIG. 67C shows that the distortion aberration of the sixteenth embodiment is maintained in a range of −0.04% to 0.16%. Referring to FIG. 67D, in the diagram of longitudinal spherical aberration of the sixteenth embodiment of FIG. 67D, deviations of the imaging points of the off-axis rays at different heights are controlled in a range of −0.003 mm to 0.01 mm. Accordingly, the above shows that the optical imaging lens 10 of the sixteenth embodiment still renders better image quality than the conventional optical lens under the circumstances that the system length is reduced to about 7.189 mm.

It is known from the above description that, in comparison with the tenth embodiment, the sixteenth embodiment has the following advantages: the optical imaging lens 10 of the sixteenth embodiment has a shorter system length TTL than the tenth embodiment; the optical imaging lens 10 of the sixteenth embodiment has a greater f-number $F_{NO}$ than the tenth embodiment; the optical imaging lens 10 of the sixteenth embodiment has less field curvature aberration in the sagittal direction and the tangential direction, distortion aberration, and longitudinal spherical aberration than the tenth embodiment; and the optical imaging lens 10 of the sixteenth embodiment is easier to manufacture and thus has higher yield than the tenth embodiment.

Figure 70:
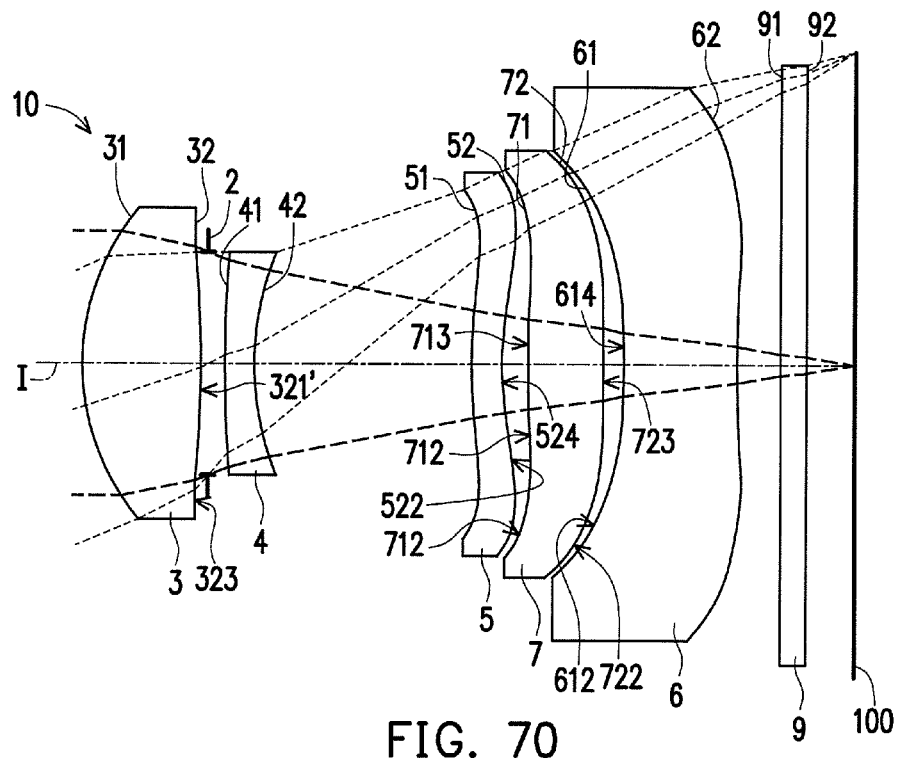
FIG. 70 is a schematic view of an optical imaging lens according to the seventeenth embodiment of the invention.

FIG. 70 is a schematic view of an optical imaging lens according to the seventeenth embodiment of the invention. FIG. 71A to FIG. 71D are schematic diagrams showing the longitudinal spherical aberration and other aberrations of the optical imaging lens of the seventeenth embodiment when the pupil radius is 1.2937 mm. First, referring to FIG. 70, the optical imaging lens 10 of the seventeenth embodiment of the invention is similar to the optical imaging lens 10 of the tenth embodiment. They only slightly differ in some optical data, aspherical coefficients, and parameters related to the lens elements 3-7. Moreover, the image-side surface 32 of the first lens element 3 has a convex portion 323 in the vicinity of the periphery, the third lens element 5 has negative refracting power, the image-side surface 52 of the third lens element 5 has a concave portion 524 in the vicinity of the optical axis I, the fifth lens element 7 has positive refracting power, the object-side surface 71 of the fifth lens element 7 has a convex portion 713 in the vicinity of the optical axis I, the image-side surface 72 of the fifth lens element 7 has a convex portion 723 in the vicinity of the optical axis I, the fourth lens element 6 has negative refracting power, the object-side surface 61 of the fourth lens element 6 has a concave portion 614 in the vicinity of the optical axis I, and the aperture 2 is located between the first lens element 3 and the second lens element 4. It should be noted that, for clarity, the reference numerals of some concave portions and convex portions the same as those of the tenth embodiment are omitted from FIG. 66.

Detailed optical data of the optical imaging lens 10 of the seventeenth embodiment is shown in FIG. 72, and in the seventeenth embodiment, the effective focal length EFL is 7.244 mm, the half field of view HFOV is 21.812°, and the f-number $F_{NO}$ is 2.943. The system length TTL of the optical imaging lens 10 of the seventeenth embodiment is 7.190 mm and the image height is 2.4 mm.

The aspherical coefficients of the object-side surface 31 of the first lens element 3 through the image-side surface 72 of the fifth lens element 7 in the equation (1) according to the seventeenth embodiment are shown in FIG. 73.

Furthermore, a relationship between important parameters of the optical imaging lens 10 of the seventeenth embodiment is shown in FIG. 75.

Figures 71A, 71B, 71C, 71D:
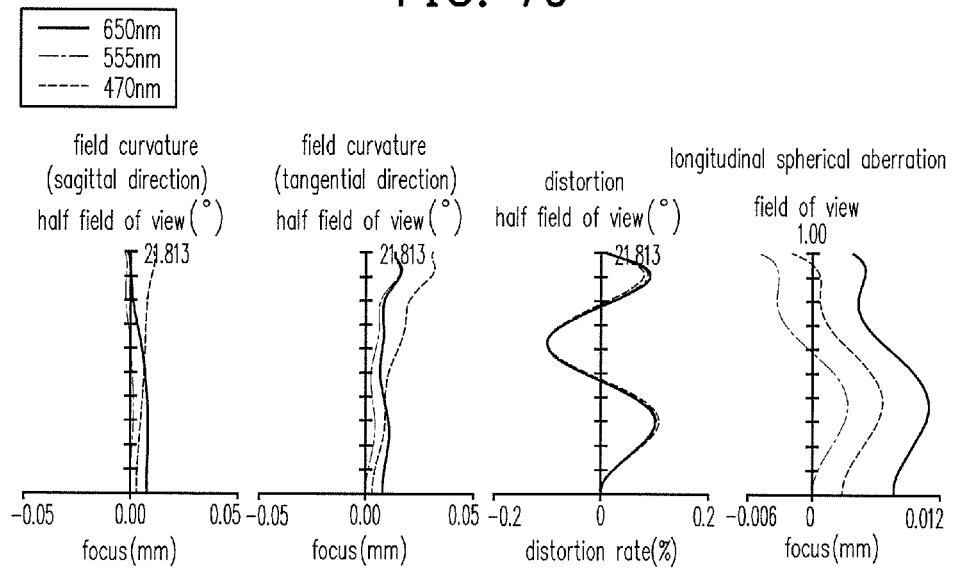
FIG. 71A to FIG. 71D are schematic diagrams showing a longitudinal spherical aberration and other aberrations of the optical imaging lens of the seventeenth embodiment.

Referring to FIG. 71A, in the diagram of a field curvature aberration in a sagittal direction of FIG. 71A, variations of the focal lengths of three representative wavelengths (i.e., red, green, and blue) in the whole field of view fall in a range of −0.01 mm to 0.015 mm. Referring to FIG. 71B, in the diagram of a field curvature aberration in a tangential direction of FIG. 71B, variations of the focal lengths of the three representative wavelengths (i.e., red, green, and blue) in the whole field of view fall in a range of 0 mm to 0.035 mm. Referring to FIG. 71C, the diagram of distortion aberration of FIG. 71C shows that the distortion aberration of the seventeenth embodiment is maintained in a range of −0.12% to 0.12%. Referring to FIG. 71D, in the diagram of longitudinal spherical aberration of the seventeenth embodiment of FIG. 71D, deviations of the imaging points of the off-axis rays at different heights are controlled in a range of −0.12 mm to 0.124 mm. Accordingly, the above shows that the optical imaging lens 10 of the seventeenth embodiment still renders better image quality than the conventional optical lens under the circumstances that the system length is reduced to about 7.190 mm.

It is known from the above description that, in comparison with the tenth embodiment, the seventeenth embodiment has the following advantages: the optical imaging lens 10 of the seventeenth embodiment has a greater f-number $F_{NO}$ than the tenth embodiment; the optical imaging lens 10 of the seventeenth embodiment renders better image quality than the tenth embodiment when the aperture 2 of the seventeenth embodiment is located differently from the tenth embodiment; the optical imaging lens 10 of the seventeenth embodiment has less field curvature aberration in the sagittal direction and the tangential direction and distortion aberration than the tenth embodiment; and the optical imaging lens 10 of the seventeenth embodiment is easier to manufacture and thus has higher yield than the tenth embodiment.

Further, referring to FIG. 74, which is a table of the optical parameters of the first to the ninth embodiments described above, if the relationship between the optical parameters of the optical imaging lens 10 of the embodiments of the invention satisfies at least one of the following conditions, the optical imaging lens has favorable optical performance and is technically feasible and the length is effectively reduced:

I. If the optical imaging lens of the embodiments of the invention satisfies any of the following conditions, it means that, while the denominator remains unchanged, the length of the numerator may be relatively reduced to achieve the effect of reducing the size of the lens: HFOV≤25°; TTL≤7.2 mm; (T1+T2+T3)/(G12+G23)≤2.0; T2/G34≤6.20; $F_{NO}$/T1≤3.50; EFL/(G12+G23)≤7.20; (T2+T3)/T1≤1.20; $F_{NO}$/(G12+G23)≤2.50; EFL/G23≤3.60; $F_{NO}$/G23≤3.00; TL/G23 ≤4.50. If any of the following conditions is further satisfied, better image quality is achieved: 18.296°≤HFOV≤19.905°; 6.380 mm≤TTL≤7.198 mm; 0.537≤(T1+T2+T3)/(G12+G23)≤0.911; 0.154≤T2/G34≤3.065; 2.198≤$F_{NO}$/T1≤2.950; 2.252≤EFL/(G12+G23)≤3.503; 0.493≤(T2+T3)/T1≤1.182; 0.750≤$F_{NO}$/(G12+G23)≤1.162; 2.357≤EFL/G23≤3.590; 0.785≤$F_{NO}$/G23≤1.238; 2.022≤TL/G23≤2.964.

II. If the optical imaging lens of the invention satisfies any of the following conditions, it means that the optical imaging lens has a better configuration and renders favorable image quality without compromising a proper yield: T1/T2≥2.50; EFL/$F_{NO}$≥1.80; (G12+G23)/(T1+T2)≥0.70; TTL/(T2+T3)≥5.50; TTL/(T1+G12+T2)≥4.50; G23/(T2+T3)≥1.20; EFL/(T1+T2)≥4.50; EFL/(T2+T3)≥5.20; (G12+G23)/T2≥3.20; EFL/TTL≥1.00. If any of the following conditions is further satisfied, the optical imaging lens has a proper size: 2.504≤T1/T2≤4.729; 2.628≤EFL/$F_{NO}$≤3.016; 1.782≤(G12+G23)/(T1+T2)≤2.720; 5.508≤TTL/(T2+T3)≤13.849; 4.501≤TTL/(T1+G12+T2)≤6.150; 1.928≤G23/(T2+T3)≤4.742; 5.313≤EFL/(T1+T2)≤6.472; 5.845≤EFL/(T2+T3)≤13.951; 8.462≤(G12+G23)/T2≤11.635; 1.001≤EFL/TTL≤1.108.

Further, referring to FIG. 75, which is a table of the optical parameters of the tenth to the seventeenth embodiments described above, if the relationship between the optical parameters of the optical imaging lens 10 of the embodiments of the invention satisfies at least one of the following conditions, the optical imaging lens has favorable optical performance and is technically feasible and the length is effectively reduced:

I. If the optical imaging lens of the embodiments of the invention satisfies any of the following conditions, it means that, while the denominator remains unchanged, the length of the numerator may be relatively reduced to achieve the effect of reducing the size of the lens: HFOV≤25°; TTL≤7.2 mm; (T1+T2+T3)/(G12+G23)≤2.0; T2/G34≤6.20; $F_{NO}$/T1≤3.50; EFL/(G12+G23)≤7.20; (T2+T3)/T1≤1.20; $F_{NO}$/(G12+G23)≤2.50; EFL/G23≤3.60; $F_{NO}$/G23≤3.00; TL/G23≤4.50. If any of the following conditions is further satisfied, better image quality is achieved: 21.813°≤HFOV≤22.634°; 7.190 mm≤TTL≤7.192 mm; 0.466≤(T1+T2+T3)/(G12+G23)≤1.000; 0.378≤T2/G34≤5.100; 1.585≤$F_{NO}$/T1≤2.922; 2.513≤EFL/(G12+G23)≤3.508; 0.486≤(T2+T3)/T1≤0.858; 0.835≤$F_{NO}$/(G12+G23)≤1.295; 2.555≤EFL/G23≤3.595; 0.849≤$F_{NO}$/G23≤1.449; 2.174≤TL/G23≤3.060.

II. If the optical imaging lens of the invention satisfies any of the following conditions, it means that the optical imaging lens has a better configuration and renders favorable image quality without compromising a proper yield: T1/T2≥2.50; EFL/$F_{NO}$≥1.80; (G12+G23)/(T1+T2)≥0.70; TTL/(T2+T3)≥5.50; TTL/(T1+G12+T2)≥4.50; G23/(T2+T3)≥1.20; EFL/(T1+T2)≥4.50; EFL/(T2+T3)≥5.20; (G12+G23)/T2≥3.20; EFL/TTL≥1.00. If any of the following conditions is further satisfied, the optical imaging lens has a proper size: 2.510≤T1/T2≤4.896; 2.461≤EFL/$F_{NO}$≤3.561; 1.331≤(G12+G23)/(T1+T2)≤2.713; 7.564≤TTL/(T2+T3)≤13.882;

$4.502 \leq TTL/(T1+G12+T2) \leq 6.491$; $2.114 \leq G23/(T2+T3) \leq 5.464$; $4.663 \leq EFL/(T1+T2) \leq 6.818$; $7.592 \leq EFL/(T2+T3) \leq 13.960$; $4.687 \leq (G12+G23)/T2 \leq 12.055$; $1.002 \leq EFL/TTL \leq 1.008$.

Nevertheless, in view of the unpredictability of optical system design, under the configuration of the embodiments of the invention, the length of the lens may be reduced, the usable aperture may be increased, the viewing angle may be widened, the image quality may be enhanced, or the assembly yield may be improved if the aforementioned conditions are satisfied, such that the conventional issues may be resolved.

In conclusion of the above, the optical imaging lens 10 of the embodiments of the invention has the following effects and advantages.

According to the embodiments of the invention, the longitudinal spherical aberration, astigmatism aberration, and distortion are all complied with usage specifications. In addition, the off-axis rays of the three representative wavelengths (i.e., red, green, and blue) at different heights all gather in the vicinity of the imaging points. According to the deviation of each curve, it is known that deviations of the imaging points of the off-axis rays at different heights are under control, such that spherical aberration, aberration, and distortion are suppressed properly. The data of the image quality also shows that the distances between the three representative wavelengths (i.e., red, green, and blue) are fairly close, which indicates that rays of different wavelengths are gathered and dispersion is suppressed properly under all conditions. To sum up, in the invention, excellent image quality is achieved through design and arrangement of the lens elements.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. An optical imaging lens, comprising a first lens element, a second lens element, a third lens element, and a fourth lens element, wherein each of the first to the fourth lens elements comprises an object-side surface, which faces the object side and allows an imaging ray to pass through, and an image-side surface, which faces an image side and allows the imaging ray to pass through, and wherein the first lens element is arranged to be a lens element having refracting power in a first order from the object side to the image side, the second lens element is arranged to be a lens element having refracting power in a second order from the object side to the image side, the third lens element is arranged to be a lens element having refracting power in a third order from the object side to the image side, and the fourth lens element is arranged to be a lens element having refracting power in a last order from the object side to the image side;

the first lens element has positive refracting power, and the object-side surface of the first lens element has a convex portion in a vicinity of the optical axis and a convex portion in a vicinity of a periphery;
the second lens element has negative refracting power;
the object-side surface of the third lens element has a concave portion in a vicinity of a periphery;
the fourth lens element has negative refracting power, and the image-side surface of the fourth lens element has a convex portion in a vicinity of a periphery;

wherein the optical imaging lens satisfies:

$HFOV \leq 25°$;

$TTL \leq 7.2$ mm;

$(T1+T2+T3)/(G12+G23) \leq 2.0$; and $TTL/(T1+G12+T2) \geq 4.50$, wherein HFOV is a half field of view of the optical imaging lens, TTL is a distance from the object-side surface of the first lens element to an image plane along the optical axis, T1 is a thickness of the first lens element along the optical axis, T2 is a thickness of the second lens element along the optical axis, T3 is a thickness of the third lens element along the optical axis, G12 is a distance from the image-side surface of the first lens element to the object-side surface of the second lens element along the optical axis, and G23 is a distance from the image-side surface of the second lens element to the object-side surface of the third lens element along the optical axis.

2. The optical imaging lens according to claim 1, wherein the optical imaging lens further satisfies: $T2/G34 \leq 6.20$, wherein G34 is a distance from the image-side surface of the third lens element to the object-side surface of the fourth lens element along the optical axis.

3. The optical imaging lens according to claim 2, wherein the optical imaging lens further satisfies: $F_{NO}/T1 \leq 3.50$/mm, wherein $F_{NO}$ is an f-number of the optical imaging lens.

4. The optical imaging lens according to claim 1, wherein the optical imaging lens further satisfies: $EFL/(G12+G23) \leq 7.20$, wherein EFL is an effective focal length of the optical imaging lens.

5. The optical imaging lens according to claim 4, wherein the optical imaging lens further satisfies: $2.50 \leq T1/T2$.

6. The optical imaging lens according to claim 1, wherein the optical imaging lens further satisfies: $(T2+T3)/T1 \leq 1.20$.

7. The optical imaging lens according to claim 6, wherein the optical imaging lens further satisfies: $EFL/F_{NO} \geq 1.80$ mm, wherein EFL is the effective focal length of the optical imaging lens and $F_{NO}$ is the f-number of the optical imaging lens.

8. The optical imaging lens according to claim 1, wherein the optical imaging lens further satisfies: $(G12+G23)/(T1+T2) \geq 0.70$.

9. The optical imaging lens according to claim 8, wherein the optical imaging lens further satisfies: $TTL/(T2+T3) \geq 5.50$.

10. The optical imaging lens according to claim 1, wherein the optical imaging lens further satisfies: $F_{NO}/(G12+G23) \leq 2.50$/mm, wherein $F_{NO}$ is the f-number of the optical imaging lens.

11. The optical imaging lens according to claim 1, wherein the optical imaging lens further satisfies: $G23/(T2+T3) \geq 1.20$.

12. The optical imaging lens according to claim 11, wherein the optical imaging lens further satisfies: $EFL/G23 \leq 3.60$, wherein EFL is the effective focal length of the optical imaging lens.

13. The optical imaging lens according to claim 1, wherein the optical imaging lens further satisfies: $F_{NO}/G23 \leq 3.00$/mm, wherein $F_{NO}$ is the f-number of the optical imaging lens.

14. The optical imaging lens according to claim 13, wherein the optical imaging lens further satisfies: $EFL/(T1+T2) \geq 4.50$, wherein EFL is the effective focal length of the optical imaging lens.

15. The optical imaging lens according to claim 1, wherein the optical imaging lens further satisfies: $EFL/(T2+T3) \geq 5.20$, wherein EFL is the effective focal length of the optical imaging lens.

16. The optical imaging lens according to claim 15, wherein the optical imaging lens further satisfies: $(G12+G23)/T2 \geq 3.20$.

17. The optical imaging lens according to claim 1, wherein the optical imaging lens further satisfies: $EFL/TTL \geq 1.00$, wherein EFL is the effective focal length of the optical imaging lens.

18. The optical imaging lens according to claim 1, wherein the optical imaging lens further satisfies: $TL/G23 \leq 4.50$, wherein TL is a distance from the object-side surface of the first lens element to the image-side surface of the fourth lens element along the optical axis.

19. The optical imaging lens according to claim 1, wherein the optical imaging lens further comprises:
   an aperture located on the object-side surface of the first lens element or between the first lens element and the second lens element.

* * * * *